(12) United States Patent
Litman et al.

(10) Patent No.: US 12,533,281 B2
(45) Date of Patent: Jan. 27, 2026

(54) ROBOTIC MASSAGE END EFFECTOR

(71) Applicant: Aescape, Inc., New York, NY (US)

(72) Inventors: Eric A. Litman, Brooklyn, NY (US); Nicholas Akiona, New York, NY (US); Kathleen Lockhart, Bow, NH (US); Bruce Chabanksy, Kalamata (GR)

(73) Assignee: Aescape, Inc., New York, NY (US)

( * ) Notice: Subject to any disclaimer, the term of this patent is extended or adjusted under 35 U.S.C. 154(b) by 0 days.

(21) Appl. No.: 18/368,411

(22) Filed: Sep. 14, 2023

(65) Prior Publication Data
US 2024/0307251 A1 Sep. 19, 2024

Related U.S. Application Data

(63) Continuation-in-part of application No. 18/184,825, filed on Mar. 16, 2023, now Pat. No. 12,214,509.

(51) Int. Cl.
A61H 7/00 (2006.01)
B25J 11/00 (2006.01)

(52) U.S. Cl.
CPC ............ *A61H 7/004* (2013.01); *B25J 11/008* (2013.01); *A61H 2201/0207* (2013.01); *A61H 2201/1659* (2013.01); *A61H 2201/1685* (2013.01); *A61H 2201/169* (2013.01); *A61H 2201/5007* (2013.01); *A61H 2201/5058* (2013.01); *A61H 2205/081* (2013.01)

(58) Field of Classification Search
CPC .................. A61H 7/004; A61H 39/02; A61H 2201/5002; A61H 2201/5035; A61H 2201/5007; A61H 2201/1659; A61H 2201/169; A61H 2201/1685; A61H 2201/1683; A61H 2201/1692; A61H 2201/1695; B25J 9/1682; B25J 9/1633; B25J 11/008; B25J 15/08; B25J 15/0019; B25J 15/04; B25J 15/045
See application file for complete search history.

(56) References Cited

U.S. PATENT DOCUMENTS

| 11,285,074 | B2 | 3/2022 | Qiu |
| 11,338,443 | B2 | 5/2022 | Eyssautier |
| 2001/0014781 | A1 | 8/2001 | Nissim |
| 2013/0106128 | A1* | 5/2013 | Yamasaki ............ B25J 15/0009 294/213 |

(Continued)

FOREIGN PATENT DOCUMENTS

| CN | 115870952 | 3/2023 |
| CN | 115972202 | 4/2023 |

OTHER PUBLICATIONS

"Compression Stretch Massage Techniques (51 Minutes)", uploaded by MassageNerd on YouTube, dated Jun. 11, 2011, https://www.youtube.com/watch?v=YQEOtouQkRk (Year: 2011).

(Continued)

*Primary Examiner* — Colin W Stuart
*Assistant Examiner* — Douglas Y Sul
(74) *Attorney, Agent, or Firm* — Van Pelt, Yi & James LLP

(57) ABSTRACT

A massage robot arm end effector includes a mounting interface that is attachable to a robot arm. It further includes a surface distal from the mounting interface having a variable curvature that comprises a plurality of interaction regions. The surface is paired with a garment worn by a subject.

16 Claims, 26 Drawing Sheets

(56) References Cited

U.S. PATENT DOCUMENTS

| | | | |
|---|---|---|---|
| 2014/0378878 A1* | 12/2014 | Sharma | A61H 5/00 |
| | | | 601/84 |
| 2016/0175185 A1* | 6/2016 | Buchner Santos | A61H 23/006 |
| | | | 601/113 |
| 2017/0079871 A1* | 3/2017 | Zhang | G16H 40/63 |
| 2017/0105895 A1* | 4/2017 | Sardinas | A63B 21/0724 |
| 2017/0266077 A1 | 9/2017 | Mackin | |
| 2019/0160684 A1 | 5/2019 | Gu | |
| 2019/0184574 A1* | 6/2019 | Chen | A61H 1/02 |
| 2020/0108497 A1* | 4/2020 | Miyazaki | B25J 19/0033 |
| 2020/0126297 A1* | 4/2020 | Tian | G06T 7/75 |
| 2020/0155410 A1* | 5/2020 | Smith, Jr. | A61H 7/001 |
| 2020/0276719 A1* | 9/2020 | Buind | B25J 19/0025 |
| 2022/0234210 A1* | 7/2022 | Inada | B25J 11/008 |
| 2022/0313536 A1 | 10/2022 | Cooper | |
| 2022/0336080 A1 | 10/2022 | Monteverde | |
| 2022/0414291 A1 | 12/2022 | Eyssautier | |

OTHER PUBLICATIONS

"Deep Tissue Massage Technique: The 'Mother Hand'", uploaded by Massage Sloth on YouTube, dated Apr. 26, 2017, https://www.youtube.com/watch?v=i9dUy8dGb-0&t (Year: 2017).
Wang et al., Constraint-based Correspondence Matching for Stereo-based Interactive Robotic Massage Machine, J Intell Robot Syst 72, 2013, pp. 179-196.

* cited by examiner

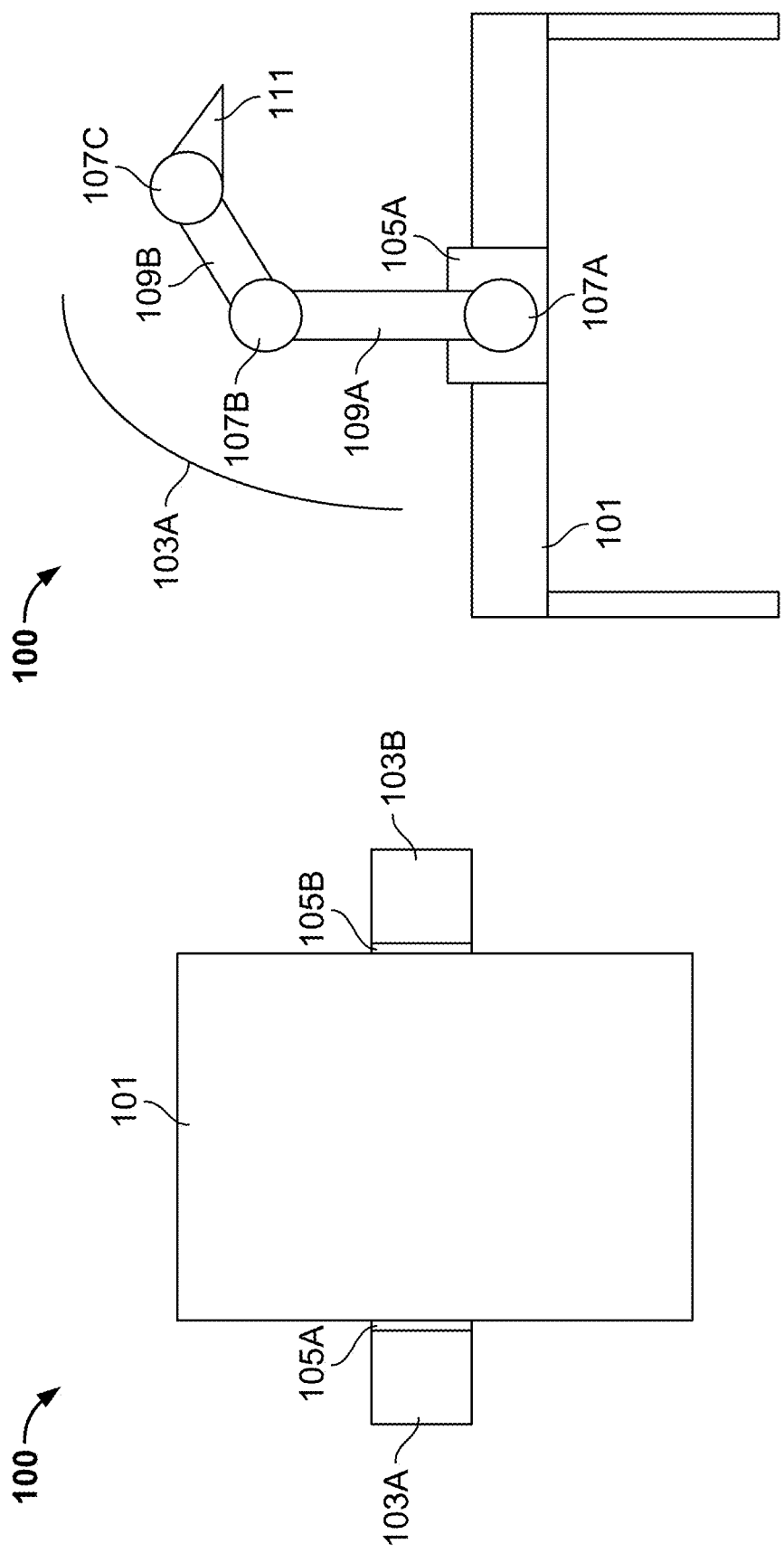

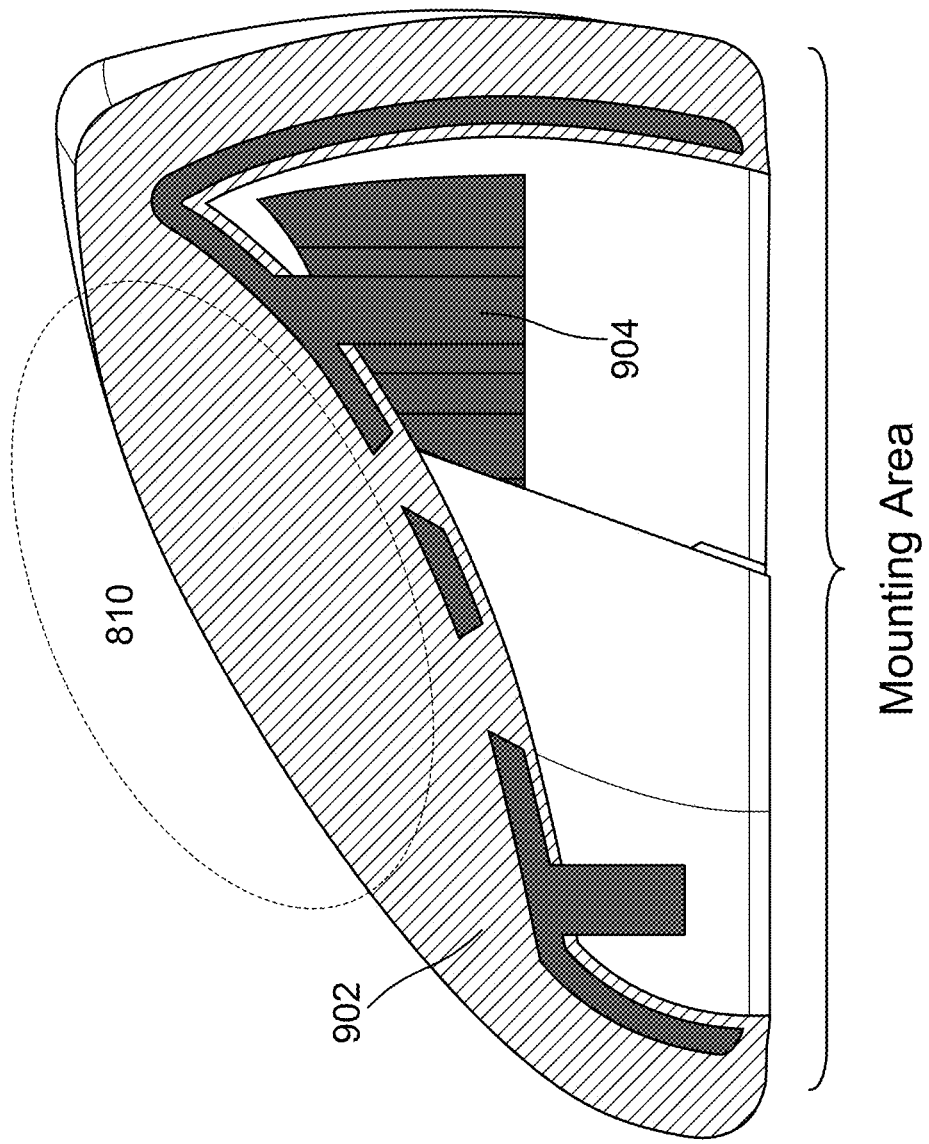

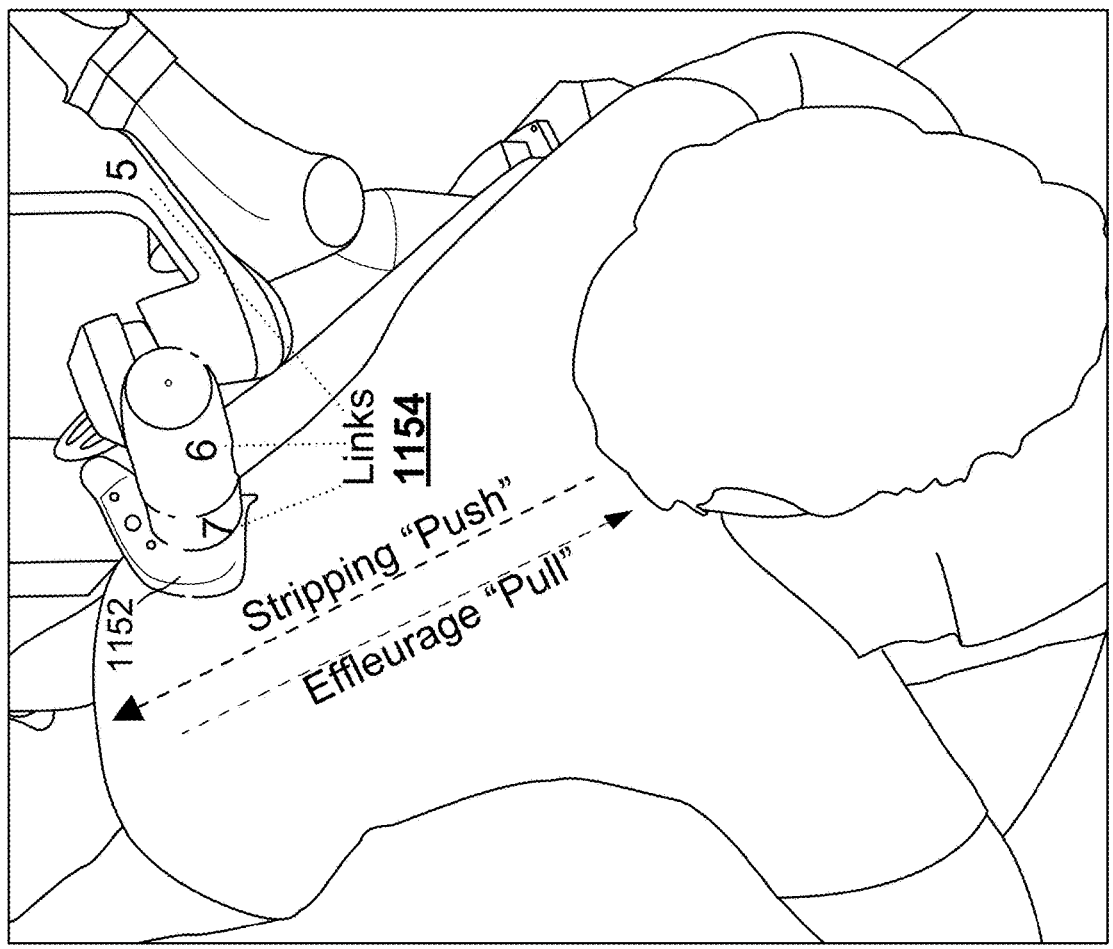

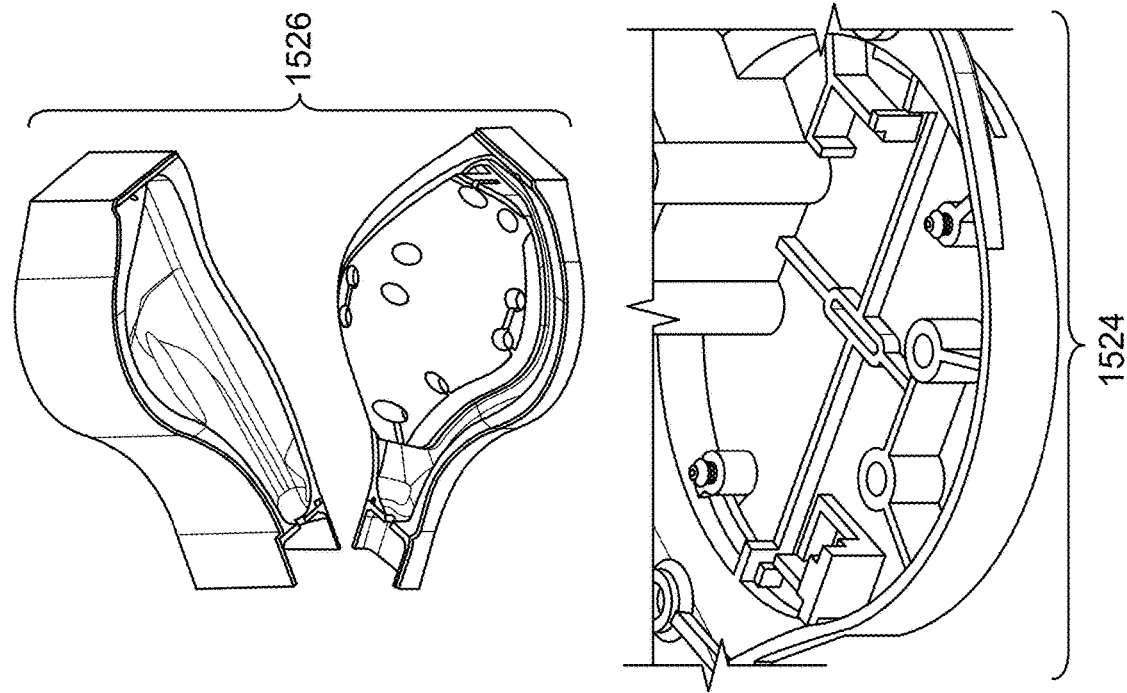
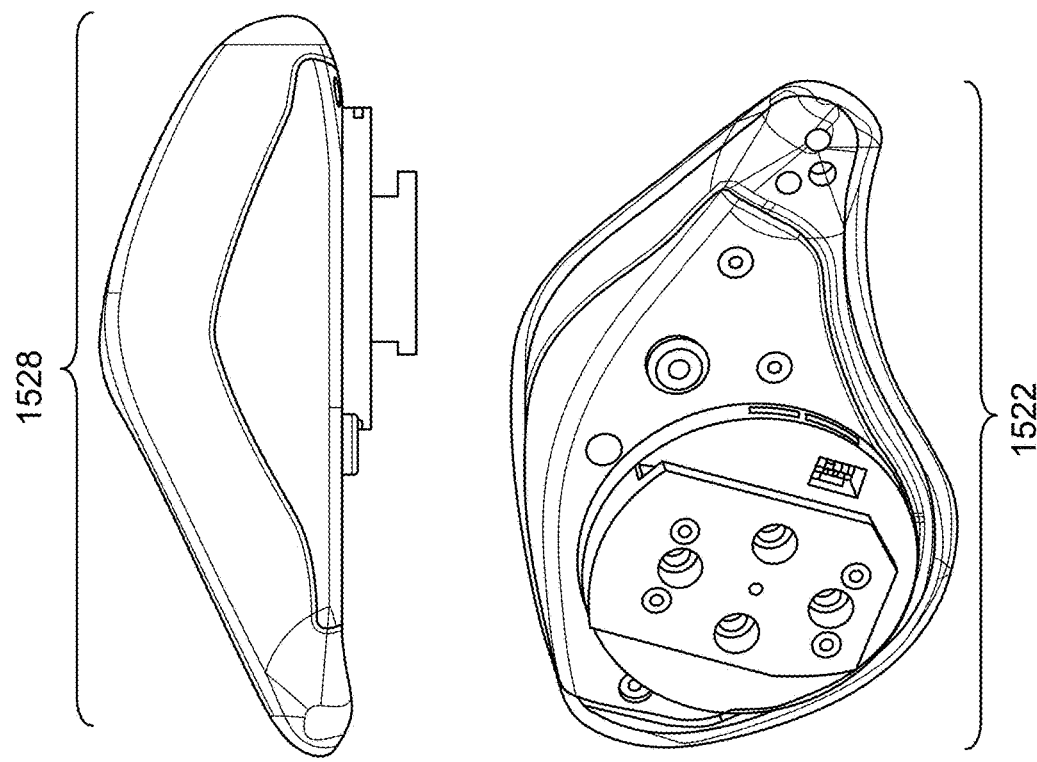
FIG.15B

ROBOTIC MASSAGE END EFFECTOR

CROSS REFERENCE TO OTHER APPLICATIONS

This application is a continuation in part of U.S. patent application Ser. No. 18/184,825 entitled ROBOT SYSTEM TO PERFORM COORDINATED BODY WORK filed Mar. 16, 2023, which is incorporated herein by reference for all purposes.

BACKGROUND OF THE INVENTION

Massages that can be performed by robots and without humans can be desirable in some instances. Known systems, however, can use complex movements and coordination to ensure that a high-quality massage is being performed. As such, known robot systems suffer from a limited set of performable massage techniques.

BRIEF DESCRIPTION OF THE DRAWINGS

Various embodiments of the invention are disclosed in the following detailed description and the accompanying drawings.

FIGS. 1A-1B show top and side views, respectively, of a robot system that can be used to perform a massage, according to an embodiment.

FIG. 9A illustrates an embodiment of exterior material thickness of an end effector.

FIG. 11B illustrates an embodiment of implementing robotic strokes using an end effector.

FIG. 15B illustrates embodiments of end effector exits.

DETAILED DESCRIPTION

Figure 2A:
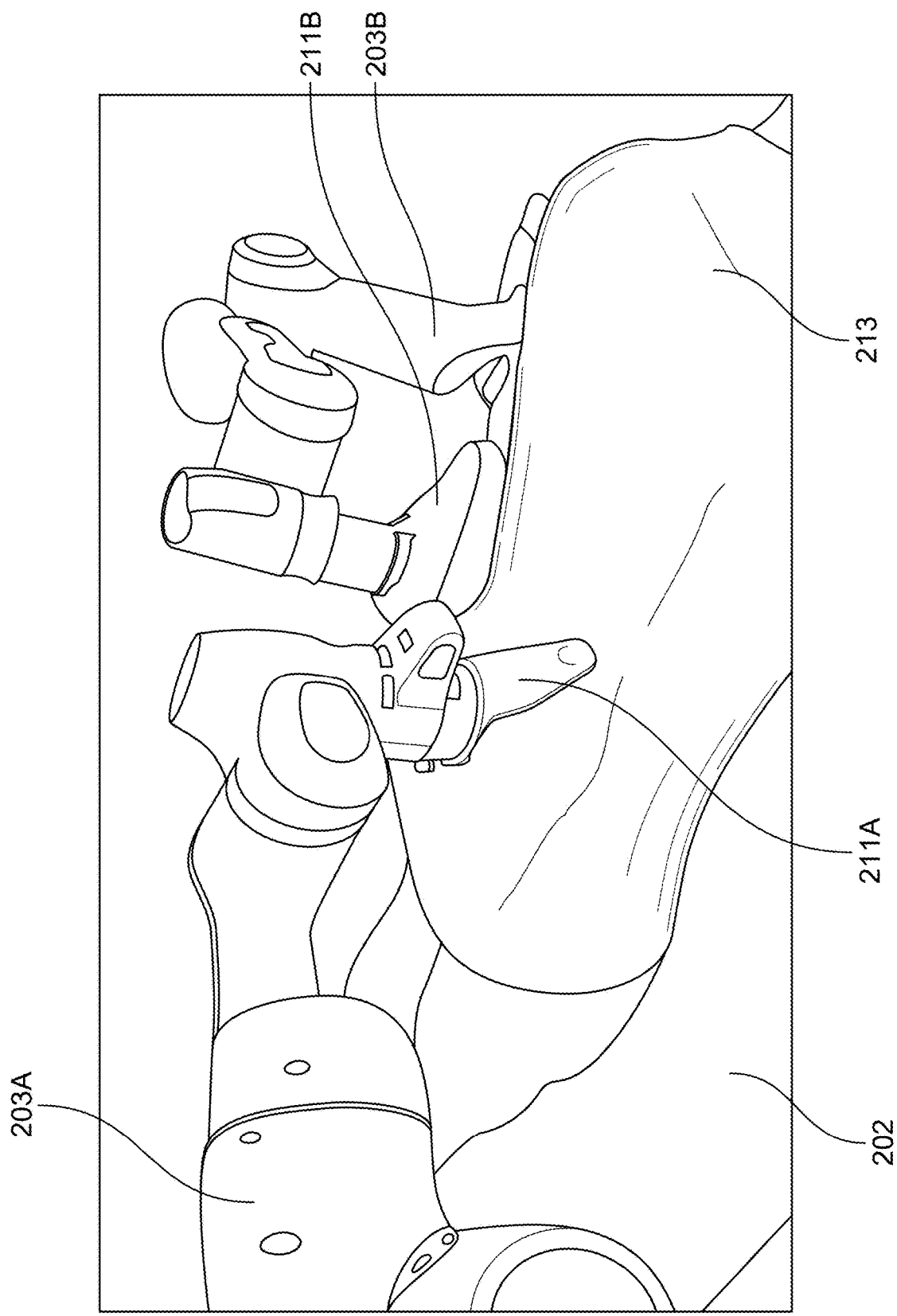
FIGS. 2A-2B show example illustrations of portions of a robot system including two robotic arms, according to an embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In an embodiment, an apparatus includes a support structure configured to support an object. The apparatus further includes a first robotic arm coupled to the support structure. The first robotic arm includes a first end effector having a first shape. The apparatus further includes a second robotic arm coupled to the support structure. The second robotic arm is separate from the first robotic arm and has a second shape that mirrors the first shape when observed from a common perspective. At least one of the first end effector or the second end effector is asymmetric about at least one two-dimensional plane that is perpendicular to an end effector plane of the at least one of the first end effector or the second end effector. The apparatus further includes at least one processor operatively coupled to the first robotic arm and the second robotic arm. The at least one processor is configured to perform coordinated body work on the object using the first robotic arm and the second robotic arm.

In an embodiment, a non-transitory, processor-readable medium stores code representing instructions executable by a processor to receive a signal representing an instruction to perform a massage. The non-transitory, processor-readable medium further stores code to send at least one signal to cause at least one of a first robotic arm of a robot system or a second robotic arm of the robot system to perform the massage on an object. The robot system includes a support structure. The robot system further includes the first robotic arm. The first robotic arm is coupled to the support structure and includes a first end effector with a first shape. The robot system further includes a second robotic arm coupled to the support structure. The second robotic arm is separate from the first robotic arm and includes a second end effector having a second shape that mirrors the first shape when observed from a common perspective. At least one of the first end effector or the second end effector is asymmetric about at least one two-dimensional plane that is perpendicular to an end effector plane of the at least one of the first end effector or the second end effector.

In an embodiment, a method includes receiving, via at least one processor of a robotic system, a signal representing an instruction to perform a massage. The method further includes sending, via the at least one processor, at least one signal to cause a robotic arm of the robot system to perform the massage on an object. The robot system includes a support structure and the robotic arm. The robotic arm is coupled to the support structure and includes an end effector that is asymmetric about at least one two-dimensional plane that is perpendicular to an end effector plane of the end effector.

In some implementations, a robot system can be used to perform coordinated body work. In some instances, coordinated body work refers to rubbing, tapping, kneading, and/or the like a body (e.g., human, animal, etc.) in a coordinated fashion (e.g., a massage). The robot system can include a support structure for an object, such as a support structure for a human, animal, mechanical device, and/or the like to lay. The robot system can also include any number (e.g., one, two, three, four, etc.) of robotic arms (e.g., coupled to the support structure) for performing the coordinated body work on the object. The robotic arms can each include an end effector that makes contact with the object to perform the coordinated body work. The robotic arms can perform any type of coordinated body work, such as an effleurage, petrissage, friction, tapotement, vibration, and/or the like.

FIGS. 1A and 1B show top and side views, respectively, of a robot system 100 that can be used to perform a massage, according to an embodiment. FIG. 1A shows a support structure 101, couplers 105A, 105B, and robotic arms 103A, 103B. The support structure can support an object, such as a human, animal, and/or the like. In some instances, the support structure is a bed (e.g., a massage bed), table, or other suitable platform.

The robotic arms 103A and 103B are each coupled to the support structure 101 via couplers 105A and 105B, respectively. In some instances, robotic arm 103A is separate (e.g., physically separate) from robotic arm 103B. For example, robotic arm 103A is coupled to a first side (e.g., left side) of support structure 101, and robotic arm 103B is coupled to a second side (e.g., right side) of support structure 101 that is different than the first side.

As shown in FIG. 1B, the robotic arm 103A includes an end effector 111, links 109A, 109B, and joints 107A, 107B, 107C. Joints 107A, 107B, and 107C act as pivot points for the robotic arm 103A. One or more of the joints 107A, 107B, 107C can include one or more brakes. In some implementations, when a brake is enabled, the joint for that brake will be locked/will not pivot or otherwise be repositioned (e.g., electronically and/or mechanically prevented from moving in one or more ways), and when the brake is disabled, the joint for that brake will be unlocked/able to pivot or to otherwise be repositioned. In some implementations, when a brake is enabled, the joint for that brake will not be locked/will pivot or otherwise be repositioned, and when the brake is disabled, the joint for that brake will be locked/not able to pivot or otherwise be repositioned. The joints 107A, 107B, 107C can be configured to allow for rotary movement around any number of axes (e.g., one, two, three, etc.).

The joints 107A, 107B, and 107C are interconnected via the links 109A, 109B. Joint 107A is coupled to coupler 105A, and joint 107C is coupled to end effector 111 (e.g., via an attachment not shown in FIGS. 1A and 1B). Together, the joints 107A, 107B, 107C and links 109A, 109B enable the end effector 111 to make contact with an object and perform coordinated work.

The end effector 111 can be any type of end effector, such as a gripper, a roller, a suction cup, a powered tool, a massage tool, and/or the like. In some implementations, an end effector refers to an implement sized, shaped, and engineered to contact a body with a desired force, touch feel, and/or the like. In some implementations, the end effector 111 is shaped for performing a massage technique, such as pinning, rolling, stretching, grabbing, gliding, kneading, and/or the like. In some instances, the end effector 111 has an irregular shape and/or is asymmetric about at least one two-dimensional plane (e.g., an end effector plane, a two-dimensional plane that passes through a center of at least one mounting flange of the end effector 111, etc.) of the end effector 111. In some instances, the end effector 111 is asymmetric about one or more two-dimensional planes from a plurality of two-dimensional planes intersecting the end effector 111.

Although not shown in FIG. 1B, robotic arm 103B can have a structure similar to that of robotic arm 103A. For example, robotic arm 103B can include a plurality of joints interconnected with a plurality of brakes (e.g., similar to joints 107A, 107B, 107C and links 109A, 109B), and an end effector (e.g., similar to end effector 111). In some instances, robotic arms 103A and 103B have substantially the same end effector (accounting for slight variations that can occur due to manufacturing and use).

Although FIG. 1B shows robotic arm 103A as including three joints and two links, in other implementations, any number of joints and links can be used (e.g., six joints and five links, seven joints and six links, etc.). Additional details related to a robotic device that can be used to implement one or more coordinated body works discussed herein are discussed in U.S. patent application Ser. No. 17/959,777, filed Oct. 4, 2022 and titled "METHOD AND SYSTEM FOR ELECTROMECHANICAL SAFETY FOR ROBOTIC MANIPULATORS," the contents of which are incorporated herein by reference in their entirety.

Although not shown in FIGS. 1A and 1B, in some instances, the robot system 100 includes a fixed base. The fixed base can be fixed, permanently attached, or removably attached to a base structure, support structure, massage table, floor, wall, ceiling, movable carriage, or other structure. The fixed base can be attached to a rail system, block, or other structure movably attached to a rail/translation system, allowing the robot system 100 to be moved along the side of a table, chair, wall, floor, or other structure.

Although not shown in FIGS. 1A and 1, in some instances, the support structure 101 includes at least one track. Coupler 105A, coupler 105B, robotic arm 103A and/or robotic arm 103B can be coupled to the at least one track, allowing coupler 105A, coupler 105B, robotic arm 103A and/or robotic arm 103B to slide along support structure 101. In some instances, the support structure 101 includes a first track along a first side (e.g., left side) of the support structure 101 and a second track along a second side (e.g., right side) of the support structure 101.

For example, robotic arm 103A and/or coupler 105A can be attached to the first track, enabling robotic arm 103A and/or coupler 105A to slide along the first track, and robotic arm 103B and/or coupler 105B can be attached to the second track, enabling robotic arm 103B and/or coupler 105B to slide along the second track. In some instances, the first track is not mechanically connected to the second track, enabling each of the robotics arms 103A and 103B to operate independently. In some instances, the first rack is mechanically connected to the second track.

Although not shown in FIGS. 1A and 1B, the robot system 100 can include a processor. The processor can be, for example, a hardware based integrated circuit (IC) or any other suitable processing device configured to run and/or execute a set of instructions or code. For example, the processor can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor can be configured to execute, perform, or cause performance of any of the methods and/or portions of methods discussed herein. The processor can be housed at any one or more components of the robot system 100, or somewhere different than the robot system 100. Signals sent by the processor can be communicated to one or more components of the robot system 100 (e.g., via a system bus), such as robotic arm 103A, robotic arm 103B, a joint, and link, and/or the like. In some instances, the processor is communicably coupled (e.g., via one or more wired and/or wireless networks) to robotic arm 103A and/or 103B.

Although not shown in FIGS. 1A and 1B, the robot system 100 can include a memory. The memory can be, for example, a random-access memory (RAM), a memory buffer, a hard drive, a read-only memory (ROM), an erasable programmable read-only memory (EPROM), and/or the like. The memory can be configured to store data used by the processor to perform the techniques discussed herein. In some instances, the memory can store, for example, one or more software programs and/or code that can include instructions to cause the processor to perform one or more processes, functions, and/or the like. In some embodiments, the memory can include extendible storage units that can be added and used incrementally. In some implementations, the memory can be a portable memory (for example, a flash drive, a portable hard disk, and/or the like) that can be operatively coupled to the controller. In some instances, the memory can be remotely operatively coupled with the robot system 100. For example, a remote database device (not shown in FIGS. 1A and 1B) can serve as a memory and be operatively coupled to the robot system 100. The memory is operatively coupled to the processor.

Figure 2B:
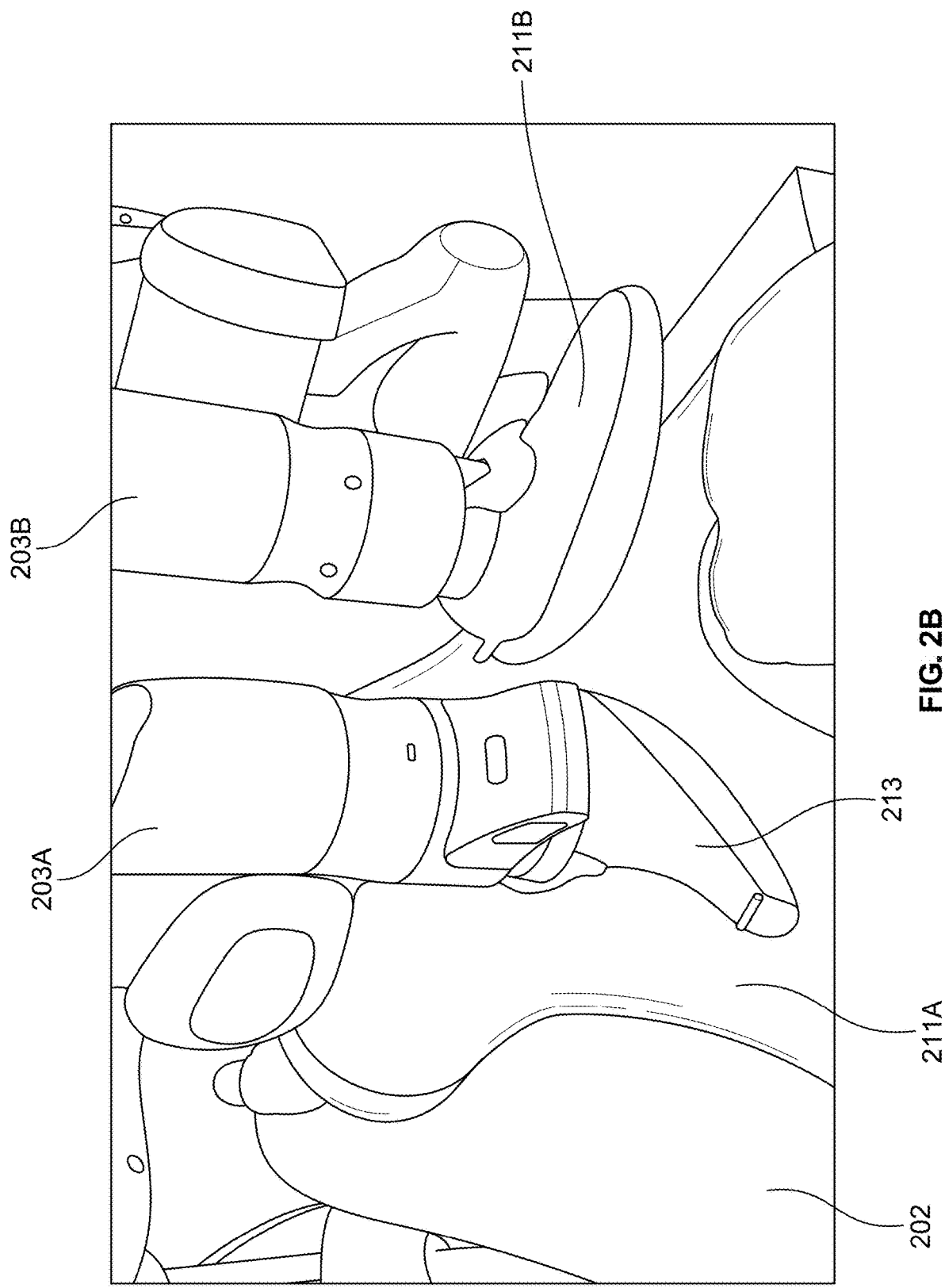

FIGS. 2A and 2B show example illustrations of portions of a robot system including two robotic arms, according to an embodiment. FIGS. 2A and 2B include robotics arms 203A and 203B. The robotic arms 203A and 203B include end effectors 211A and 211B, respectively, that can make contact with an object 213 on a support structure 202 to perform a massage.

Figure 3A:
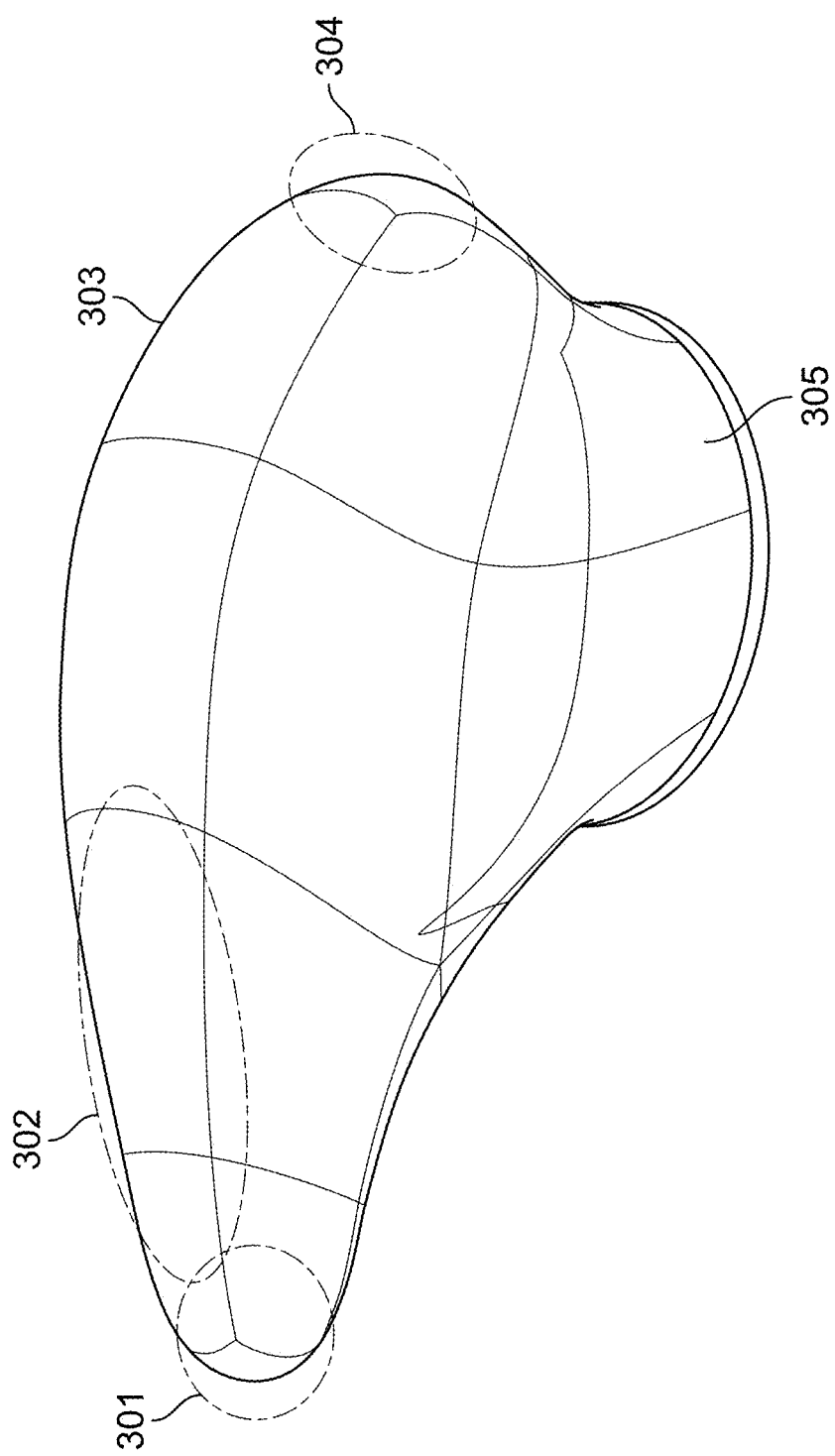
FIGS. 3A-3C show various perspective views of an end effector, according to an embodiment.
Figure 3B:
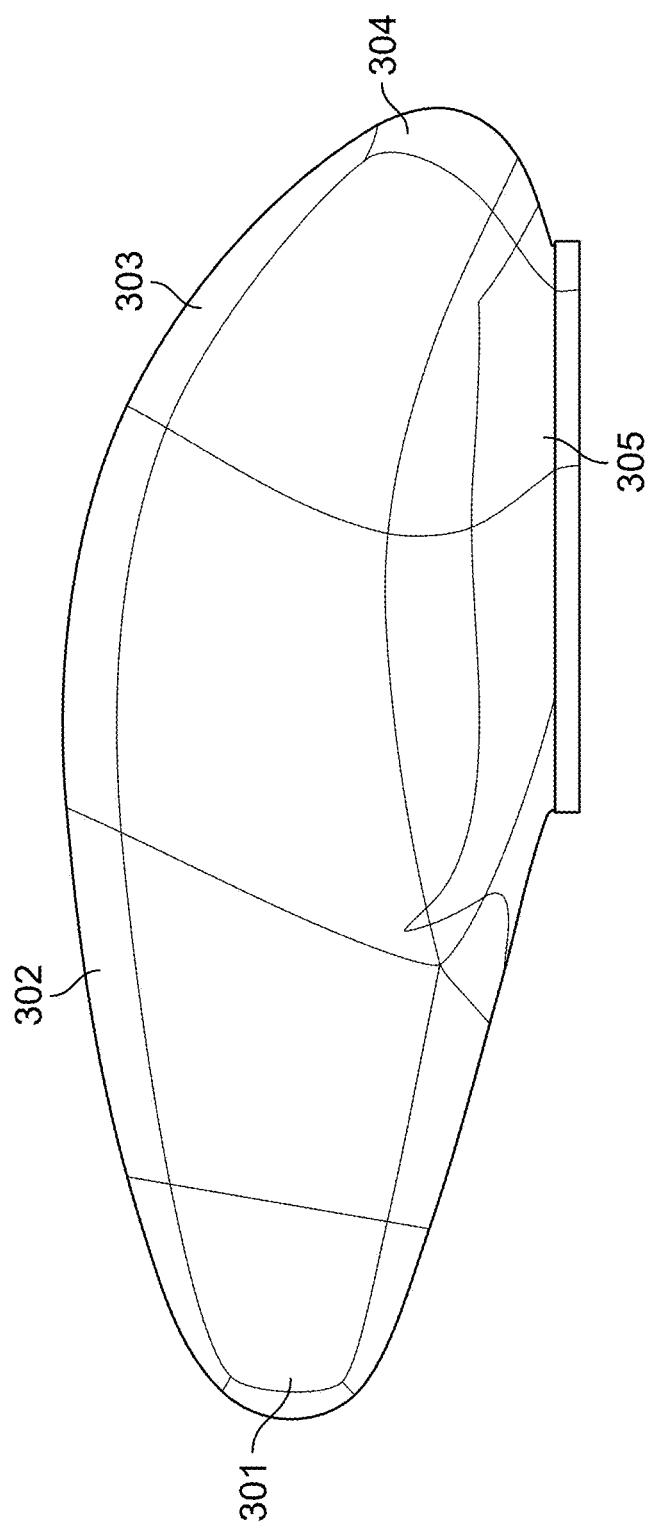
Figure 3C:
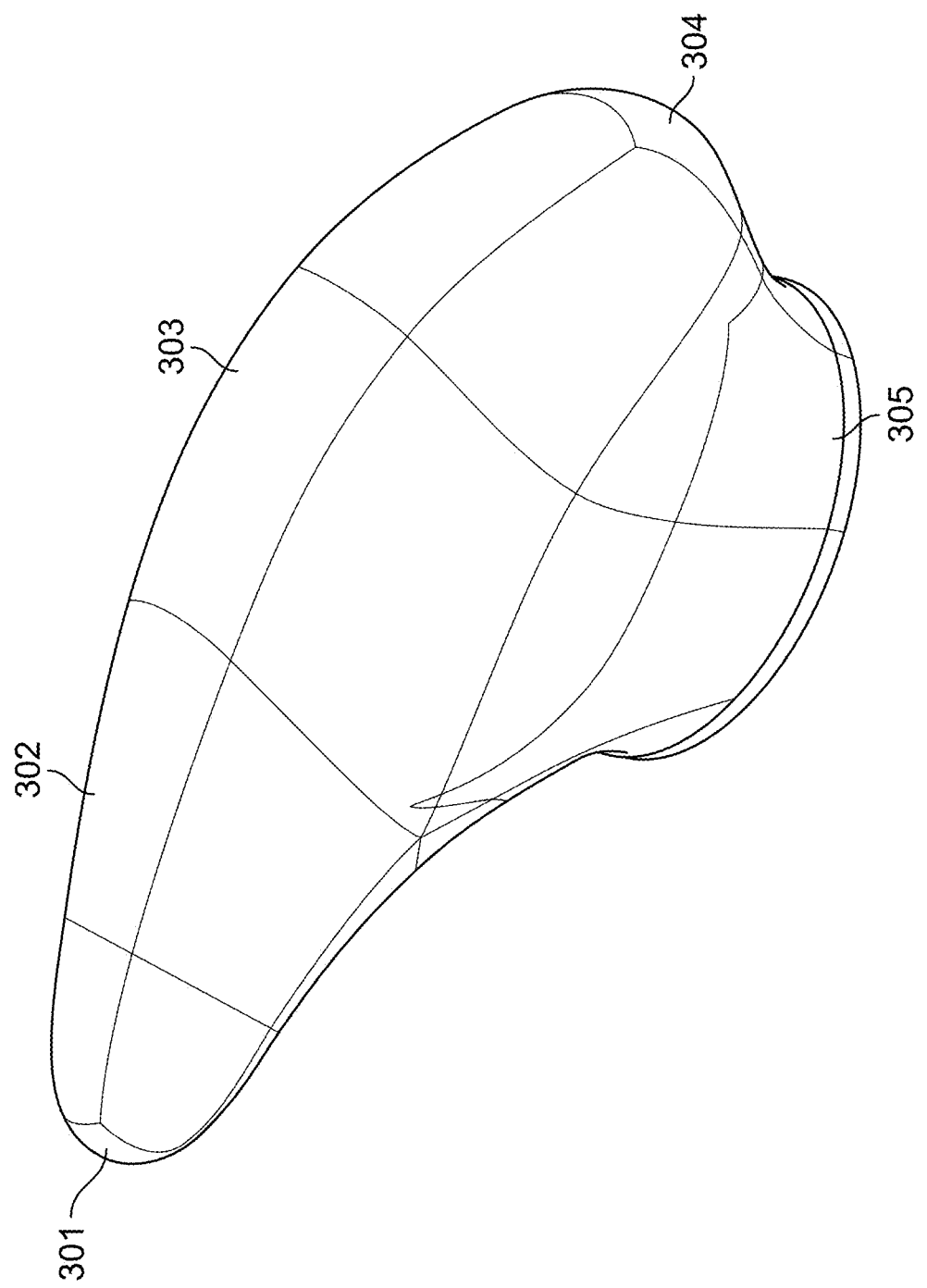

FIGS. 3A-3C show various perspective views of an end effector (e.g., end effector 111), according to an embodiment. The end effector can include multiple different contact surfaces that are distinct from one another, and that can be used for different purposes/modalities. These contact surfaces can have various shapes and/or properties, e.g., for applying different pressures to an object during coordinated body work. For example, as shown in each of the different views from FIGS. 3A-3C, the end effector can include a portion 301 having a first contact surface (e.g., for focused work), a portion 302 having a second contact surface (e.g., for stripping) different from the first contact surface, a portion 303 having a third contact surface (e.g., for compressions and/or effleurage) different from the first and second contact surfaces, and a portion 304 having a fourth contact surface (e.g., for high force stripping) different from the first, second, and third contact surfaces. The end effector can also include an end effector flange 305 (e.g., to function as coupler for a joint such as joint 107C in FIG. 1B). The end effector can be made of any material, such as rubber, plastic, silicone, nitrile, vinyl, neoprene, and/or the like.

As used herein, an end effector "having a shape" can refer to the end effector having a shape that is substantially consistent/uniform across at least a portion thereof, and does not necessarily refer to an overall shape of the end effector as a whole. In other words, the end effector, in some embodiments, may be said to "have" multiple different shapes, each shape being associated with a different portion of the end effector. In other embodiments, an end effector can have a substantially consistent/uniform shape globally (e.g., the end effector may have an overall oval shape, an overall ellipsoid shape, etc.).

Figure 4:
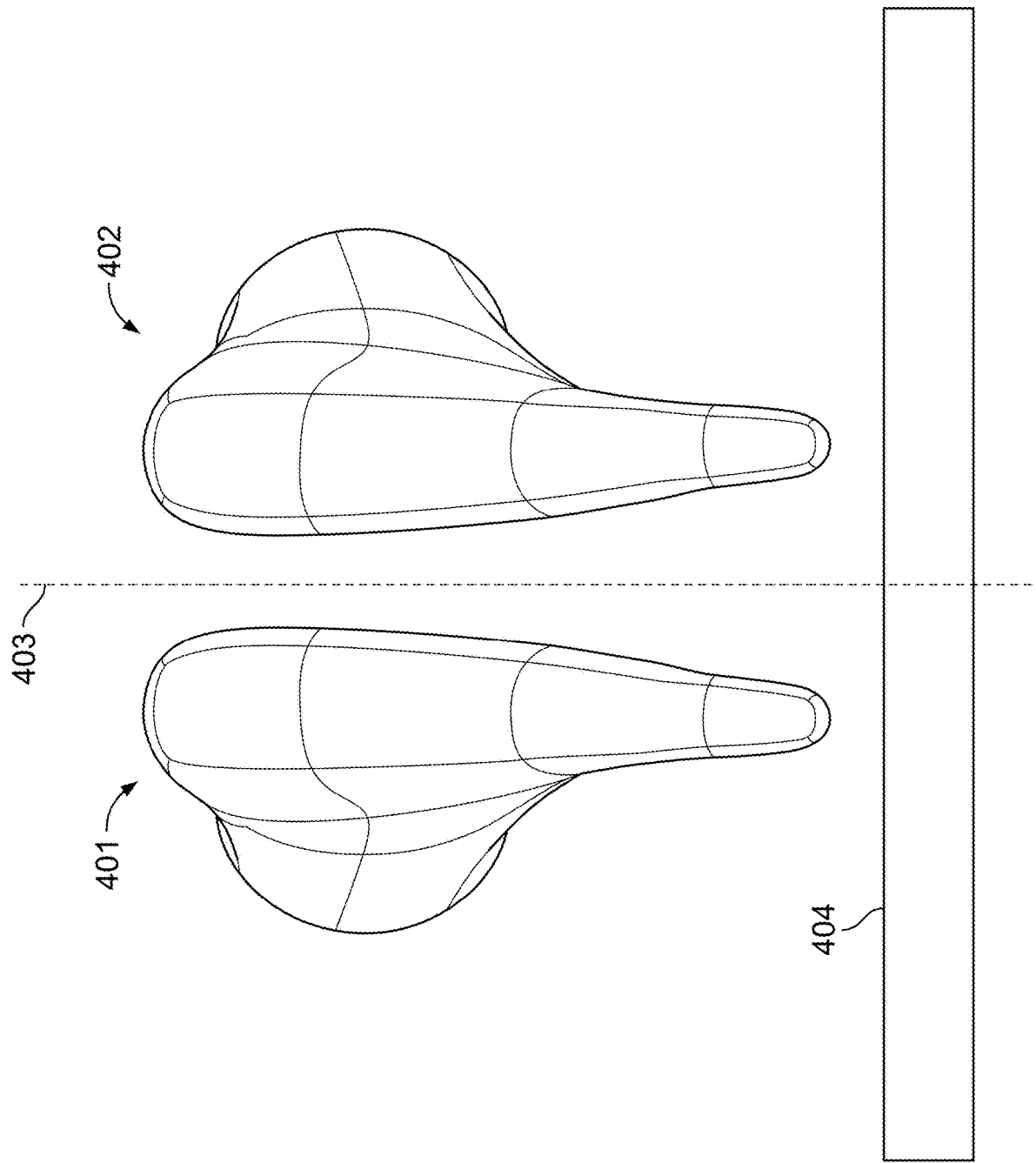
FIG. 4 shows end effectors mirrored across a plane perpendicular to a table, according to an embodiment.

In some implementations, an end effector of a first robotic arm (e.g., robotic arm 103A) and an end effector of a second robotic arm (e.g., robotic arm 103B) are mirrored across a plane, such as a plane perpendicular to a support structure (e.g., support structure 101). For example, FIG. 4 shows end effector 401 and end effector 402 mirrored across a plane 403 perpendicular to a table 404, according to an embodiment.

Figure 5:
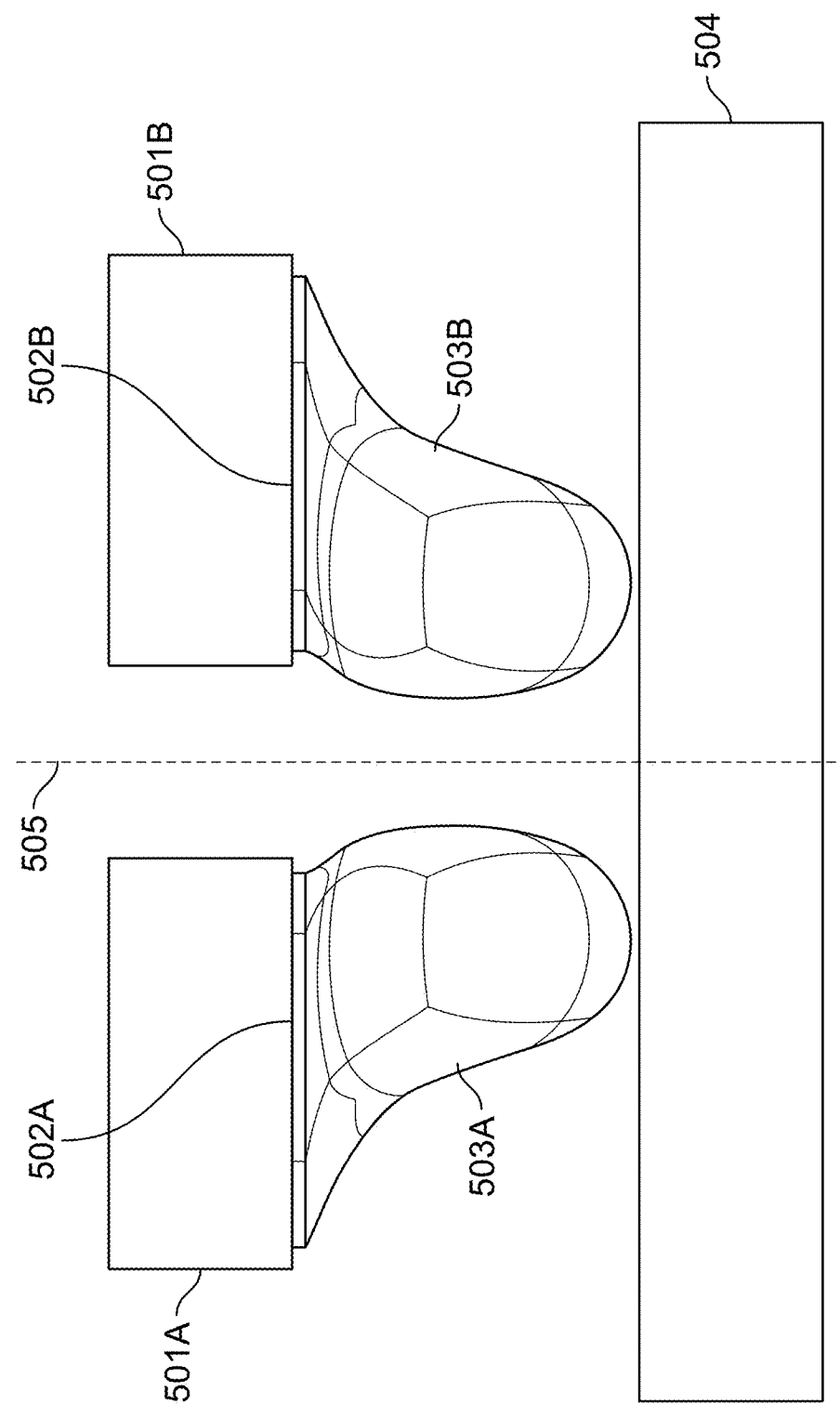
FIG. 5 shows end effectors coupled to links of robotic arms via end effector flanges, according to an embodiment.

In some implementations, mirrored, asymmetrical end effectors allow for the close symmetrical contact between the left and right sides of an object without them or the robot arms they are mounted on colliding. For example, FIG. 5 shows an end effector 503A coupled to the last link 501A of a robotic arm via an end effector flange 502A, and an end effector 503B coupled to the last link 501B of a robotic arm via an end effector flange 502B. In some implementations, the end effectors 503A, 503B can be mirrored across a plane 505 perpendicular to a structure 504 (e.g., a body that is being massaged and/or a table or other support structure).

Figure 6B:
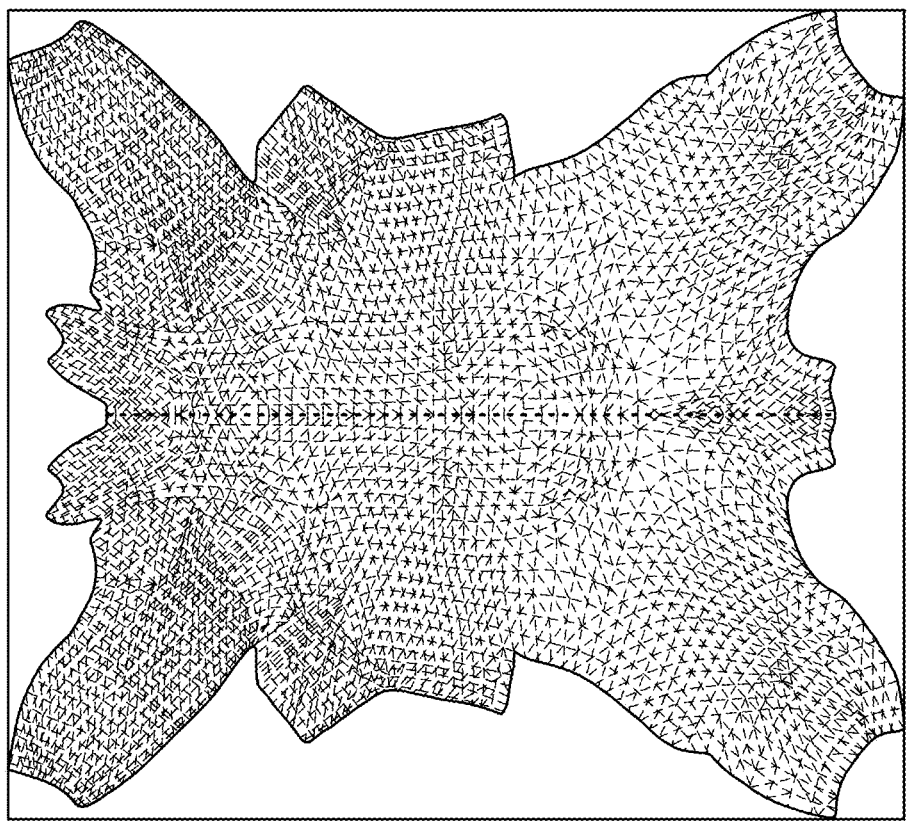
FIGS. 6A-6B show an example of a three-dimensional (3D) structural representation of a human body, and a two-dimensional (2D) texture map of the human body, respectively, according to an embodiment.
Figure 6A:
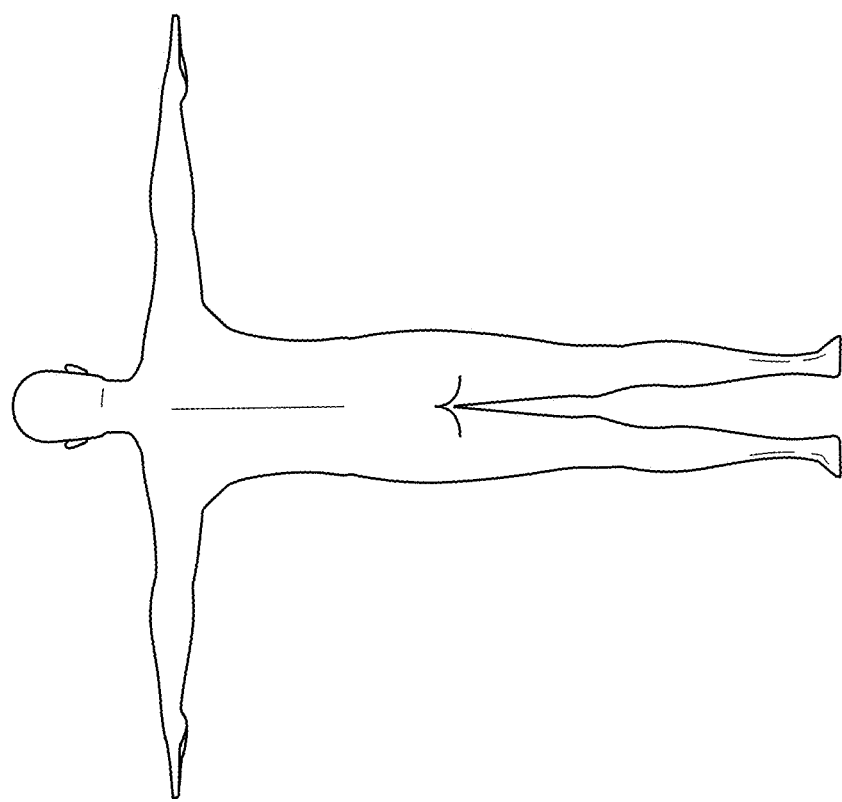

In some implementations, strokes (e.g., of end effectors) can be mirrored using a two-dimensional (2D) texture map or a representation of a three-dimensional (3D) surface (e.g., of a human body). FIG. 6A shows an example of a 3D structural representation of a human body, and FIG. 6B shows a 2D texture map of the human body. In some instances, the 3D structural representation can be captured using, for example, a body scan. In some implementations, the 2D texture map can be generated based on the 3D structural representation. For example, the 3D structural representation can be mesh unwrapped into UV space, allowing for mirroring directly related to the surface of the skin, and the spine and/or center of the body can be represented in the 2D texture map and/or in the 3D structural representation (e.g., using a line, spline, and/or the like), to facilitate mirroring between, for example, the left and right sides of the body. Note, however, that mirroring can occur around/about any arbitrary line or curve in UV space or any coordinate frame or plane in cartesian space. In some instances, symmetrical and/or mirrored strokes can be performed by multiple end effectors using the 3D structural representation and/or the 2D texture map as a reference frame.

A robot system (e.g., robot system 100) can be used to perform coordinated body work, such as a coordinated massage. Although discussions herein mention massages as an example, other types of coordinated works can also be performed, such as assembling a mechanical device, performing a medical procedure, and/or the like. In some implementations, a processor of the robot system can send an electronic signal (e.g., to robotic arms 103A and/or 103B) to cause a robotic arm(s) (e.g., to robotic arms 103A and/or 103B) to perform the coordinated body work.

Pin and Stretch Technique

In some implementations, the coordinated body work can include a pin and stretch technique. For example, a first end effector of a first robotic arm can pin a first region (e.g., lower back) of a body, and a second end effector of a second robotic can apply a pressure to stretch a second region (e.g., upper back) of the body away from the first region of the body. In some instances, the pin and stretch technique can stretch/elongate a muscle(s) of a body by applying at least two points of contact with forces that includes components acting in opposing directions. The first and second end effectors can be both moving, or one of the first or second end effector can be moving while the other is substantially fixed. In some instances, pin and stretch can be performed using more than two end effectors/points of contact.

In some instances, the first end effector applies pressure on the left glute of a human, and the second end effector applies a pressure on the right upper back (or vice versa) to stretch a muscle(s) and the forces along (versus normal to) the body that are directly in line with a muscle(s). In some instances, the first and second end effectors apply pressure on the same side of the body at two different locations on an erector muscle. The tangential directions of force can largely correspond to opposite directions along the erector muscle.

In some instances, a first end effector engages a relative position on the body to keep an anchor point or muscle taut as the second end effector applies force in the opposing direction. In some instances, the first end effector applies some downward force to the muscle, then moves slightly in a direction opposite the second end effector to help elongate the muscle/body from first end effector.

In some instances, a first end effector of a first robotic arm (e.g., robotic arm 103A) can apply a first pressure to a first location of an object during a predefined period of time, while a second end effector of a second robotic arm (e.g., robotic arm 103B) can apply a second pressure to a second location of the object (e.g., different than the first location) during the predefined period of time such that at least a portion of the first pressure opposes at least a portion of the second pressure within a common plane. In some instances, the first and second end effectors make contact with the object to apply the first and second pressures via a region of the first and second end effector (e.g., region 304 of FIGS. 3A-3C).

Mother Hand Technique

In some implementations, the coordinated body work can include a mother hand technique. In some instances, a first end effector is used to perform therapeutic work on a body, while the second end effector is used to provide a stabilizing and/or calming element. For example, while a first end effector is used to perform a stroke on the body, the second end effector is used to apply some nominal force (e.g., less than the pressure provided by the first end effector at the same time) at a position on the body. The pressure on the body provided by one end effector can be low relative to the pressure on the body provided by the other end effector (e.g., less than, at least 10% less than, at least 25% less than, at least 50% less than, at least 75% less than, at least 90% less than, and/or the like).

In some implementations, a substantially (e.g., within 1%, within 5%, within 10%, etc.) singular force or pressure is provided by the mother hand. In others, the force provided by the mother hand can vary/be pulsating (e.g., periodically, sporadically, in relation to the stroke being performed, etc.). For example, the pressure or force provided by the mother hand can increase while the other end effector/robotic arm is moving and/or returning to the start position of a stroke, similar to how a therapist might be leaning some of his/her weight onto the patient and need to rest more weight on the mother hand when relieving pressure on a retract/return stroke.

In some implementations, the position of the mother hand may also move slightly (e.g., within a singular region and/or less than an inch) over the course of the stroke or during a retract of the other end effector I robotic arm between multiple passes of a stroke. The slight position and force adjustments of the mother hand during a therapeutic stroke can distract the user from some of the more intense work and make them feel more comfortable.

In some instances, a first end effector of a first robotic arm (e.g., robotic arm 103A) can perform a first contacted motion across a first region of an object (e.g., human) while applying a first set of pressures to the object, while a second end effector of a second robotic arm (e.g., robotic arm 103B) can perform a second contacted motion across a second region of the object (e.g., different than the first region) while applying a second set of pressures. Each pressure from the second set of pressures can be greater than an associated co-occurring pressure from the first set of pressures. Said differently, a pressure provided by a portion of the first contacted motion at a time can be less than the pressure provided by the portion of the second contacted motion occurring at the same time. In some instances, the first and second end effectors make contact with the object to apply the first and second sets of pressures via respective regions of the first and second end effector. In some implementations, a contacted motion refers to motion of an end effector during which the end effector is in contact with the object.

Symmetric Technique

In some implementations, the coordinated body work can include a symmetric technique. The symmetric technique allows the same work to be performed on the left and right side of the body at substantially (e.g., within 1 second of each other, within 2 seconds of each other, etc.) the same time. A first end effector can apply a stroke at a first region (e.g., left side) of an object, and the second end effector can apply the stroke at a second region (e.g., right side) of the object at the same time, where the strokes are substantially identical (e.g., +/−20%) in shape/trajectory to one another, and/or mirror each other. In some implementations, the strokes mirror across the spine of a body. In some implementations, the strokes mirror relative to a muscle and/or anatomical landmark.

In some implementations, representations of the trajectories of the first end effector and/or second end effector are stored in barycentric space. In some instances, the mirrored strokes are represented in cartesian coordinates. For example, a plane may be defined using the axis of the spine and a z-axis (e.g., a vertical axis, such as the long axis of a leg of the support structure 101 of FIG. 1B) of the support structure to create a plane, where the strokes are mirrored relative to the plane. The mirrored strokes in cartesian coordinates are then remapped to barycentric coordinates using a body model (e.g., from a body scan) of an object. Alternatively or in addition, strokes can be mirrored in UV space, e.g., based on a two-dimensional (2D) map generated relative to a surface of a body.

In some instances, a first end effector of a first robotic arm (e.g., robotic arm 103A) can perform a first contacted motion across a first region of an object during a predefined period of time, while a second end effector of a second robotic arm (e.g., robotic arm 103B) can perform a second contacted motion across a second region of the object different than the first region of the object. The first contacted motion can substantially (e.g., within 1%, within 5%, within 10%, within 25%, within 50%, and/or the like) mirror the second contacted motion relative to a portion (e.g., spine, muscle, landmark, etc.) of the object. In some instances, the first and second end effectors make contact with the object to perform the first and second contacted motions via a region of the first and second end effector (e.g., region 304 in FIGS. 3A-3C).

Walking Compression Technique

In some implementations, the coordinated body work can include a walking compression technique. The walking compression technique can provide alternating compressions across a region of an object, resembling a walking pattern. For example, the first end effector and second end effector can be used to alternatively provide pressures, where the location of each pressure changes and progresses from a start location (e.g., left side of upper back) to an end location (e.g., right side of lower back). In some implementations, the walking compression technique can be used to warm up the back of a human (e.g., going from upper back and progressing towards the glutes). In some instances, the walking compression technique can be performed prior to a subsequent coordinated body work (e.g., pin and stretch, mother hand, symmetric).

In some implementations, a first end effector of a first robotic arm (e.g., robotic arm 103A) can apply a first set of pressures to a first region of an object during a first time period. Additionally, a second end effector of a second robotic arm (e.g., robotic arm 103B) can apply a second set of pressures to a second region of the object different from the first region of the object during the second time period. The second time period can have no overlap with the first time period, or overlap partially with the first time period (e.g., overlap includes the end of the first time period but not the beginning of the first time period). Additionally, the first end effector can apply a third set of pressures to a third region of the object different from the first region of the object during a third time period subsequent to the first time period. The third time period can have no overlap with the second time period, or overlap partially with the second time period (e.g., overlap includes the end of the second time period but not the beginning of the second time period). Additionally, the second end effector can apply a fourth set of pressures to a fourth region of the object different than the second region during a fourth time period subsequent to the second time period. The fourth time period can have no overlap with the third time period, or overlap partially with the third time period (e.g., overlap includes the end of the third time period but not the beginning of the third time period). In some instances, the first and second end effectors make contact with the object to apply the first, second, third, and/or fourth sets of pressures via a region of the first and second end effector (e.g., region 304 in FIGS. 3A-3C).

In addition to the pin and stretch, mother hand, symmetric, and walking compression techniques, the robot system can be used to perform any other type of coordinated body work. For example, asymmetrical effleurage can be performed. In some implementations, a first end effector (e.g., from robotic arm 103A) can apply a first contacted motion across a first region of an object during a first period of time, and a second end effector (e.g., from robotic arm 103B) can apply a second contacted motion across a second region of the object that substantially mirrors the first region about a portion (e.g., spine, muscle, anatomical landmark) of the object during a second period of time different than (e.g., after) the first period of time. For example, a first end effector can make contact with and go down a left side of a spine. Thereafter, the second end effector can make contact with and go down a right side of the spine. Such a process can be repeated any number of times. In some instances, the first and second end effectors make contact with the object to apply the first and second contacted motions via a region of the first and second end effector (e.g., region 304 in FIGS. 3A-3C).

In some implementations, an erector stretch can be performed. In some implementations, a first end effector (e.g., from robotic arm 103A) applies a first pressure to a first location of an object during a range of time. During a first sub-range of time included in the range of time, a second end effector (e.g., from robotic arm 103B) applies a second pressure to a second location of the object. During a second sub-range of time included in the range of time, the second end effector applies a third pressure to a third location of the object that is closer to the first location than the second location is to the first location (i.e., the first location is closer to the third location than the first location is to the second location). The second sub-range of time can be after the first sub-range of time. In some instances, the first and second end effectors make contact with the object to apply the first, second, and third pressures via a region of the first and second end effector (e.g., region 304 in FIGS. 3A-3C). As an example, the first end effector can apply a pressure(s) to a human's upper back. During that time, the second end effector can apply a pressure(s) to the human's lower back, then apply a pressure(s) to the human's middle back. In some instances, the second sub-range of time can be before the first sub-range of time. For example, the first end effector can apply a pressure(s) to a human's upper back. During that time, the second end effector can apply a pressure(s) to the human's middle back, then apply a pressure(s) to the human's lower back.

In some implementations, an end effector (e.g., end effector 111) contacts a region of an object using a first portion of the end effector. Thereafter, the end effector contacts the region and/or a different region using a second portion of the end effector different than the first portion. For example, after the end effector has begun applying pressure to a portion of a body, the end effector can rotate and/or rub along the object such that a different portion of the end effector is making contact with the body. In some implementations, after the end effector is applying compression to a region of an object, the end effector can rotate while maintaining contact with the object. In some implementations, after the end effector is applying compression to a region of an object, the end effector can rotate without maintaining contact with the object. In some instances, the end effector makes contact with the object to rotate and/or rub via any region(s) of the end effector.

In some instances, a first end effector (e.g., from robotic arm 103A) and second end effector (e.g., from robotic arm 103B) can perform repeated stripping along a muscle of a body. For example, the first and second end effectors can strip along a right erector of a human, each end effector moving a predetermined length (e.g., approximately five inches) at a time and moving down the body to gradually traverse the right erector. In some instances, a first end effector performs a first contacted motion across a first region of an object. Thereafter, a second end effector performs a second contacted motion across a second region of the object different than the first region of the object, where a portion of the first region intersects with a portion of the first region. Such a process can be repeated any number of times (e.g., until a muscle has been stripped). In some instances, the first and second end effectors make contact with the object to perform the first contacted motion and the second contacted motion via a region of the first and second end effector (e.g., region 304 in FIGS. 3A-3C).

In some instances, a first end effector (e.g., from robotic arm 103A) and second end effector (e.g., from robotic arm 103B) can be used to perform synchronized rocking motions or oscillations to an object. Where the object is a human, such rocking and/or oscillations can improve blood flow and muscle relations. The rocking and/or oscillations can be in any direction, such as up and down and/or left to right. For example, a first end effector can apply a first force to an object in a first direction. Thereafter, the second end effector can apply a second force to the object in a second direction different than the first direction (e.g., opposite from the first direction; after the first end effector has stopped applying the first force). Such a process can be repeated any number of times. In some instances, the first and second end effectors make contact with the object to apply the first and second forces via a region of the first and second end effector (e.g., region 304 in FIGS. 3A-3C).

In some instances, a first end effector (e.g., from robotic arm 103A) and second end effector (e.g., from robotic arm 103B) can be used to perform tapotement. For example, the first end effector can make a first contacted motion at a first region of the object while a second end effector does not make contact with the object. Thereafter, the second end effector can make a second contacted motion at a second region of the object different from the first region of the object while the first end effector does not make contact with the object. Such a process can be repeated any number of times. In some instances, the first and second end effectors make contact with the object to make the first and second contacted motions via a region of the first and second end effector (e.g., region 304 in FIGS. 3A-3C).

In some implementations, a first end effector (e.g., from robotic arm 103A) and second end effector (e.g., from robotic arm 103B) can massage the glutes and/or legs (e.g., upper legs, calves, etc.) of a human. The first and second end effectors can make contact with the glutes and/or legs via a region of the first and second end effector (e.g., regions 305 and/or 306 in FIGS. 3A-3C). In some implementations, a first end effector and second end effector can massage the shoulders of a human. The first and second end effectors can make contact with the shoulders via a region (e.g., region 301 of FIGS. 3A-3C) of the first and second end effector.

In an embodiment, an apparatus comprises: a support structure (e.g. support structure 101) configured to support an object; a first robotic arm (e.g., robotic arm 103A) coupled to the support structure, the first robotic arm including a first end effector (e.g., end effector 111) having a first shape; a second robotic arm (e.g., robotic arm 103B) coupled to the support structure, the second robotic arm separate from the first robotic arm and having a second shape that mirrors the first shape when observed from a common perspective. Alternatively or in addition, the first shape may be both rotated and mirrored, relative to the second shape, when viewed from a common perspective. At least one of the first end effector or the second end effector may be asymmetric about at least one two-dimensional plane thereof, and at least one processor operatively coupled to the first robotic arm and the second robotic arm, the at least one processor configured to: perform coordinated body work (e.g., massage) of the object using the first robotic arm and the second robotic arm.

In some embodiments, an apparatus comprises a first robotic arm (e.g., robotic arm 103A) including a first end effector (e.g., end effector 111) having a portion with a first shape, and a second robotic arm (e.g., robotic arm 103B) separate from the first robotic arm and including a second end effector, the second end effector having a portion with a second shape that substantially mirrors the first shape when observed from a common perspective. For example, the portion of the first end effector with the first shape may occupy between about 80% and about 99%, or between about 50% and about 90%, or between about 25% and about 75%, or between about 50% and 100%, or between about 75% and 100% of the surface of the first end effector, and similarly, the portion of the second end effector with the second shape may occupy between about 80% and about 99%, or between about 50% and about 90%, or between about 25% and about 75%, or between about 50% and 100%, or between about 75% and 100% of the surface of the second end effector.

In some embodiments, an apparatus comprises (1) a first end effector (e.g., end effector 111) having a first surface with a first shape and a second surface with a second shape, and (2) a second end effector having a first surface with a third shape that mirrors the first shape of the first end effector when observed from a common perspective, and a second surface with a fourth shape. In some such implementations, during operation of the apparatus, the first surface of the first end effector and the first surface of the second end effector are in contact with a body, and the second surface of the first end effector and the second surface of the second end effector are not in contact with the body.

In some implementations, performing the coordinated body work includes: sending a first signal to cause the first end effector to apply a first pressure to a first location on the object during a predefined period of time; and sending a second signal to cause the second end effector to apply a second pressure to a second location on the object different than the first location and during the predefined period of time, such that at least a portion of the first pressure opposes at least a portion of the second pressure within a common plane.

In some implementations, performing the coordinated body work includes: sending a first signal to cause, during a period of time, the first end effector to perform a first contacted motion across a first region of the object while applying a first set of at least one pressure to the object; and sending a second signal to cause, during the period of time, the second end effector to perform a second contacted motion across a second region of the object while applying a second set of at least one pressure to the object, each pressure from the second set of at least one pressure being greater than an associated co-occurring pressure from the first set of pressures.

In some implementations, performing the coordinated body work includes: sending a first signal to cause, during a predefined period of time, the first end effector to perform a first contacted motion across a first region of the object; and sending a second signal to cause, during the predefined period of time, the second end effector to perform a second contacted motion across a second region of the object different than the first region of the object, the first contacted motion substantially mirroring the second contacted motion relative to a portion of the object.

In some implementations, performing the coordinated body work includes: causing the first end effector to apply a first set of pressures to a first region of the object during a first time period; causing the second end effector to apply a second set of pressures to a second region of the object different from the first region of the object, during a second time period that overlaps with the first time period; causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period. In some implementations, when a maximum pressure value from the first set of pressures is applied to the first region of the object, and a second pressure value from the second set of pressures is applied to the second region of the object, the second pressure value being less than the maximum pressure value. In some implementations, when a maximum pressure value from the first set of pressures is applied to the first region of the object, the first end effector is maintained at a first position within the first region of the object, and when a minimum pressure value from the first set of pressures is applied to the first region of the object, the first end effector moves along the first region of the object.

In some implementations, performing the coordinated body work includes: sending a first signal to cause, during a first period of time, the first end effector to perform a first contacted motion across a first region of the object; and sending a second signal to cause, during a second period of time different than the first period of time, the second end effector to perform a second contacted motion across a second region of the object different than the first region of the object, the first region substantially mirroring the second region about a portion of the object.

In some implementations, performing the coordinated body work includes: sending a first signal to cause, during a range of time, the first end effector to apply a first pressure to a first location of the object; sending a second signal to cause, during a first sub-range of time included in the range of time, the second end effector to apply a second pressure to a second location of the object; and sending a third signal to cause, during a second sub-range of time included in the range of time different the first sub-range of time, the second end effector to apply a third pressure to a third location of the object, the third location being closer than the second location to the first location.

In some implementations, performing the coordinated body work includes: sending a first signal to cause, at a first time, the first end effector to contact a region of the object using a first portion of the first end effector; and sending a second signal to cause, at a second time different than the first time, the first end effector to contact the region of the object using a second portion of the first end effector different than the first portion.

In some implementations, performing the coordinated body work includes: causing the first end effector to apply compression to a region of the object at a first time; and subsequent to the first time, causing the first end effector to rotate while maintaining contact with the object.

In some implementations, the apparatus further includes: a third robotic arm coupled to the support structure and operatively coupled to the at least one processor, the third robotic arm being separate from the first robotic arm and the second robotic arm, the third robotic arm including a third end effector that is asymmetric about at least one two-dimensional plane that is perpendicular to an end effector plane of the third end effector. In some implementations, the apparatus further includes: a fourth robotic arm coupled to the support structure and operatively coupled to the at least one processor, the fourth robotic arm being separate from the first robotic arm and the second robotic arm, the fourth robotic arm including a fourth end effector that is asymmetric about at least one two-dimensional plane that is perpendicular to an end effector plane of the fourth end effector.

In some implementations, the support structure includes at least one track, and at least one of the first robotic arm or the second robotic arm is slidably coupled to the at least one track.

In some implementations, the first end effector is not symmetric about any two-dimensional plane that passes through a center of at least one first mounting flange associated with at least one of the first end effector or the first robotic arm, and the second end effector is not symmetric about any two-dimensional plane that passes through a center of at least one second mounting flange associated with at least one of the second end effector or the second robotic arm.

In some implementations, performing the coordinated body work includes: sending a first signal to cause, during a first period of time, the first end effector to perform a first contacted motion across a first region of the object; and sending a second signal to cause, during a second period of time after the first period of time, the second end effector to perform a second contacted motion across a second region of the object different than the first region of the object, a portion of the first region intersecting with a portion of the second region.

In some implementations, performing the coordinated body work includes: causing the first end effector to make a first contacted motion at a first region of the object during a first time period; causing the second end effector to not make contact with the object during the first period of time; causing the second end effector to make a second contacted motion at a second region of the object different from the first region of the object during a second time period after the first time period; causing the first end effector to not make contact with the object during the second period of time; causing the first end effector to make the first contacted motion at the first region of the object during a third time period after the second period of time; causing the second end effector to not make contact with the object during the third period of time; causing the second end effector to make the second contacted motion at the second region of the object during a fourth time period after the third period of time; and causing the first end effector to not make contact with the object during the fourth period of time.

In some implementations, performing the coordinated body work includes: causing the first end effector to apply a first force to the object in a first direction at a first time; causing the second end effector to apply a second force to the object in a second direction substantially opposite to the first direction at a second time after the first time; causing the first end effector to apply a third force to the object in the first direction at a third time after the second time; and causing the second end effector to apply a fourth force to the object in the second direction at a fourth time after the third time.

In an embodiment, a non-transitory, processor-readable medium stores code representing instructions executable by a processor to receive a signal representing an instruction to perform a massage; and send at least one signal to cause at least one of a first robotic arm (e.g., robotic arm 103A) of a robot system or a second robotic arm (e.g., robotic arm 103B) of the robot system to perform the massage on an object, the robot system including: a support structure (e.g., support structure 101); the first robotic arm, coupled to the support structure and including a first end effector having a first shape; and the second robotic arm coupled to the support structure, the second robotic arm separate from the first robotic arm and including a second end effector having a second shape that mirrors the first shape when observed from a common perspective. At least one of the first end effector or the second end effector is asymmetric about at least one two-dimensional plane that is perpendicular to an end effector plane of the at least one of the first end effector or the second end effector.

In some implementations, sending the at least one signal includes: sending a first signal to cause the first end effector to apply a first pressure to a first location on the object during a predefined period of time, and sending a second signal to cause the second end effector to apply a second pressure to a second location on the object different than the first location and during the predefined period of time, such that at least a portion of the first pressure opposes at least a portion of the second pressure within a common plane.

In some implementations, performing the massage includes: sending a first signal to cause, during a period of time, the first end effector to perform a first contacted motion across a first region of the object while applying a first set of pressures to the object; and sending a second signal to cause, during the period of time, the second end effector to perform a second contacted motion across a second region of the object while applying a second set of pressures to the object, each pressure from the second set of pressures being greater than an associated co-occurring pressure from the first set of pressures.

In some implementations, performing the massage includes: sending a first signal to cause, during a predefined period of time, the first end effector to perform a first contacted motion across a first region of the object; and sending a second signal to cause, during the predefined period of time, the second end effector to perform a second contacted motion across a second region of the object different than the first region of the object, the first contacted motion substantially mirroring the second contacted motion relative to a portion of the object.

In some implementations, performing the massage includes: causing the first end effector to apply a first set of pressures to a first region of the object during a first time period; causing the second end effector to apply a second set of pressures to a second region of the object different from the first region of the object, during a second time period that overlaps with the first time period; causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period.

In some implementations, performing the massage includes: sending a first signal to cause, during a first period of time, the first end effector to perform a first contacted motion across a first region of the object; and sending a second signal to cause, during a second period of time different than the first period of time, the second end effector to perform a second contacted motion across a second region of the object different than the first region of the object, the first region substantially mirroring the second region about a portion of the object.

In some implementations, performing the massage includes: sending a first signal to cause, during a range of time, the first end effector to apply a first pressure to a first location of the object; sending a second signal to cause, during a first sub-range of time included in the range of time, the second end effector to apply a second pressure to a second location of the object; and sending a third signal to cause, during a second sub-range of time included in the range of time different the first sub-range of time, the second end effector to apply a third pressure to a third location of the object, the third location being closer than the second location to the first location.

In some implementations, performing the massage includes: sending a first signal to cause, at a first time, the first end effector to contact a region of the object using a first portion of the first end effector; and sending a second signal to cause, at a second time different than the first time, the first end effector to contact the region of the object using a second portion of the first end effector different than the first portion.

In some implementations, the robot system further includes: a third robotic arm coupled to the support structure and operatively coupled to the at least one processor, the third robotic arm being separate from the first robotic arm and the second robotic arm, the third robotic arm including a third end effector that is asymmetric about at least one two-dimensional plane that is perpendicular to an end effector plane of the third end effector.

In some implementations, the support structure includes at least one track, and at least one of the first robotic arm or the second robotic arm is slidably coupled to the at least one track.

In an embodiment, a method, comprises: receiving, via at least one processor of a robotic system (e.g., robot system 100), a signal representing an instruction to perform a massage; and sending, via the at least one processor, at least one signal to cause a robotic arm (e.g., robotic arm 103A) of the robot system to perform the massage on an object, the robot system including: a support structure (e.g., support structure 101); and the robotic arm, coupled to the support structure and including an end effector that is asymmetric about at least one two-dimensional plane that is perpendicular to an end effector plane of the end effector.

In some implementations, the robotic arm is a first robotic arm and the end effector is a first end effector, the robot system further including a second robotic arm coupled to the support structure, the second robotic arm including a second end effector that is asymmetric about at least one two-dimensional plane that is perpendicular to an end effector plane of the second end effector, and wherein the sending the at least one signal further causes the second robotic arm to perform the massage. In some implementations, performing the massage includes: sending a first signal to cause the first end effector to apply a first pressure to a first location on the object during a predefined period of time; and sending a second signal to cause the second end effector to apply a second pressure to a second location on the object different than the first location and during the predefined period of time, such that at least a portion of the first pressure opposes at least a portion of the second pressure within a common plane. In some implementations, performing the massage includes: sending a first signal to cause, during a period of time, the first end effector to perform a first contacted motion across a first region of the object while applying a first set of pressures to the object; and sending a second signal to cause, during the period of time, the second end effector to perform a second contacted motion across a second region of the object while applying a second set of pressures to the object, each pressure from the second set of pressures being greater than an associated co-occurring pressure from the first set of pressures. In some implementations, performing the massage includes: sending a first signal to cause, during a predefined period of time, the first end effector to perform a first contacted motion across a first region of the object; and sending a second signal to cause, during the predefined period of time, the second end effector to perform a second contacted motion across a second region of the object different than the first region of the object, the first contacted motion substantially mirroring the second contacted motion relative to a portion of the object. In some implementations, performing the massage includes: causing the first end effector to apply a first set of pressures to a first region of the object during a first time period; causing the second end effector to apply a second set of pressures to a second region of the object different from the first region of the object, during a second time period that overlaps with the first time period; causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period. In some implementations, performing the massage includes: sending a first signal to cause, during a first period of time, the first end effector to perform a first contacted motion across a first region of the object; and sending a second signal to cause, during a second period of time different than the first period of time, the second end effector to perform a second contacted motion across a second region of the object different than the first region of the object, the first region substantially mirroring the second region about a portion of the object. In some implementations, performing the massage includes: sending a first signal to cause, during a range of time, the first end effector to apply a first pressure to a first location of the object; sending a second signal to cause, during a first sub-range of time included in the range of time, the second end effector to apply a second pressure to a second location of the object; and sending a third signal to cause, during a second sub-range of time included in the range of time different the first sub-range of time, the second end effector to apply a third pressure to a third location of the object, the third location being closer than the second location to the first location. In some implementations, performing the massage includes: sending a first signal to cause, at a first time, the first end effector to contact a region of the object using a first portion of the first end effector; and sending a second signal to cause, at a second time different than the first time, the first end effector to contact the region of the object using a second portion of the first end effector different than the first portion.

In some embodiments, an apparatus includes a support structure configured to support an object, a first robotic arm coupled to the support structure and including a first end effector, a second robotic arm coupled to the support structure, the second robotic arm separate from the first robotic arm and including a second end effector, and at least one processor operatively coupled to the first robotic arm and the second robotic arm. The at least one processor is configured to perform coordinated body work on the object using the first robotic arm and the second robotic arm. The coordinated body work includes sending a first signal to cause, during a predefined period of time, the first end effector to perform a first contacted motion across a first region of the object. The coordinated body work also includes sending a second signal to cause, during the predefined period of time, the second end effector to perform a second contacted motion across a second region of the object different than the first region of the object, the first contacted motion substantially mirroring the second contacted motion relative to a portion of the object.

In some implementations, at least one of the first end effector or the second end effector is asymmetric about at least one two-dimensional plane that is perpendicular to an end effector plane of the at least one of the first end effector or the second end effector.

In some implementations, the support structure includes at least one track, and at least one of the first robotic arm or the second robotic arm is slidably coupled to the at least one track.

In some implementations, at least one of: (1) the first end effector is not symmetric about any two-dimensional plane that passes through a center of at least one first mounting flange associated with at least one of the first end effector or the first robotic arm, or (2) the second end effector is not symmetric about any two-dimensional plane that passes through a center of at least one second mounting flange associated with at least one of the second end effector or the second robotic arm.

The modifications listed herein and other modifications can be made by those in the art without departing from the scope of the disclosure. Although subject matter has been described herein with reference to specific embodiments, the invention(s) is not limited to the above embodiments and the specific configurations shown in the drawings. For example, some components shown can be combined with each other as one embodiment, and/or a component can be divided into several subcomponents, and/or any other known or available component can be added. The processes are not limited to those shown in the examples. Those skilled in the art will appreciate that the invention(s) can be implemented in other ways without departing from the substantive features of the invention. For example, features and embodiments described above can be combined with and without each other. The present embodiments are therefore to be considered in all respects as illustrative and not restrictive. Other embodiments can be utilized and derived therefrom, such that structural and logical substitutions and changes can be made without departing from the scope of this disclosure. This Specification, therefore, is not to be taken in a limiting sense, along with the full range of equivalents to which such claims are entitled.

The following are further embodiments of an end effector for robotic massage.

Described herein are further embodiments of end effectors (also referred to herein as "touchpoints") for robotic massage. Embodiments of the end effector described herein affect the manner in which a robotic massage system interacts with a deformable body, such as a person.

Existing solutions for robotic massage may be overly simplified or overly complex. For example, existing massage guns may have simplistically shaped end effectors that are overly generalized and not effective for multiple types of massage. As another example, some existing robotic massage systems include end effectors that attempt to emulate a human hand. This can be complex and challenging to implement. For example, while having robotic "fingers" may have a high degree of configurability, they may also be more complex and difficult to control.

Embodiments of the end effector described herein provide an improvement over existing touchpoints by integrating multiple body parts (that would be used by a masseuse) into a unique end effector shape that is able to replicate many different ways to interact with a person.

In some embodiments, the touchpoint described herein is an asymmetric design that has multiple surfaces that correspond to different surfaces of a massage therapist's body (e.g., various parts of their hands or arms) that the massage therapist would use when performing massage.

Embodiments of the end effector described herein include various components/aspects/facets which will be described in further detail below, including, without limitation:
   External Shape
   Internal Structure
   Material Selection and Interaction of Selected Materials
   External Coating
   Heating and Sensing Elements Internal to the end effector The various components of the end effector are designed and selected to provide a comprehensive and effective massage experience. In various embodiments, the various components of the touchpoint are designed based on considerations such as, without limitation:
   Massage content and the massage tools needed to implement various types of massage strokes
   Therapeutic effect and comfort
   Variability between subjects
   Robotic limitations, such as minimally specified hardware and collision avoidance.

Robotic Massage System Overview

Figure 7:
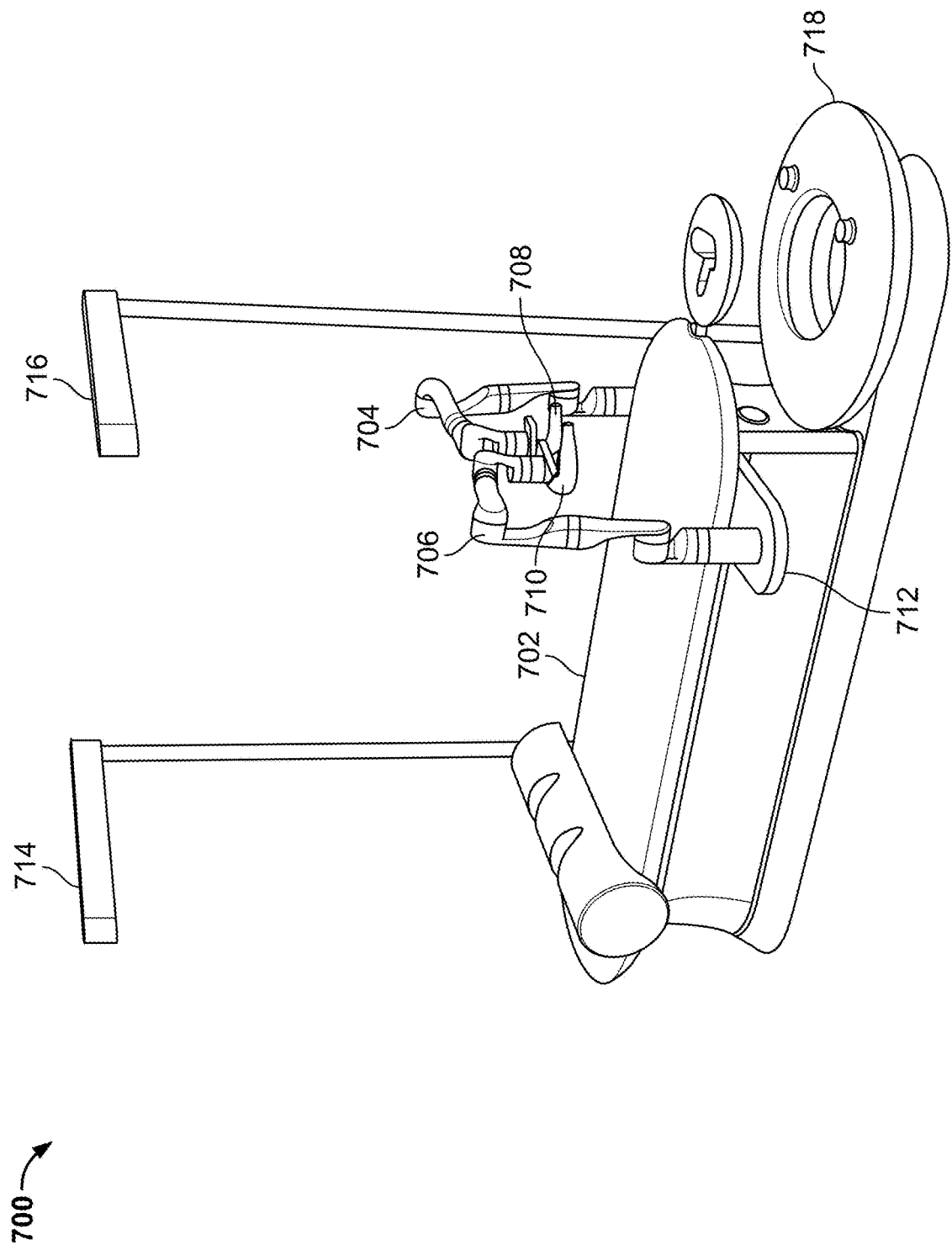
FIG. 7 illustrates an embodiment of a robotic massage system.

FIG. 7 illustrates an embodiment of a robotic massage system. In this example, robotic massage system 700 includes various components. For example, system 700 includes a bed or platform or table 702 that a participant or subject rests on. In this example, system 700 further includes two robotic arms 704 and 706, one on each side of the table. While an example robotic massage system with two robotic arms is shown in this example for illustrative purposes, the robotic massage system may be variously adapted to accommodate any other number of robotic arms, as appropriate. As shown in this example, the arm includes one or more segments or links that are interconnected by a set of joints. In some embodiments, there are one or more controllable motors or actuators at each of the joints, which allows the links to be moved, thereby allowing the robotic arms to be articulated. At the ends of each of the arms 704 and 706 are, respectively, end effectors 708 and 710 (also referred to herein as touchpoints). In some embodiments, the end effector is a removable device that is attached to a wrist of the robotic arm. The end effector makes contact with the deformable body of the person. As will be described in further detail below, the end effector is shaped for performing various massage techniques, such as pinning, rolling, stretching, grabbing, etc.

In this example, the bases of the robotic arms (that are on the ends opposite of the end effectors) are attached to a rail system. For example, the bases of the arms are pivotably attached to base 712. In this example, base 712 is connected to a linear rail system embedded within the bed. The rail system is a controllable system that allows the base 712 (and thus the arms) to translate linearly along the length of the bed 702. In some embodiments, there is a single base (e.g., plate) that both arms are connected to, and both arms move linearly together when the plate is moved along the linear rail. In other embodiments, the arms are independently translatable along the length of the bed/table. For example, each arm is attached or mounted to its own base plate, which in turn is attached to its own individual rail.

The combination of the controllable linear rail system, as well as the controllable motors in the robotic arms described in this example, allows the end effectors to be positioned to reach any part of the subject's body. In this way, the end effector may be positioned to perform a task such as making physical contact with specific points on a subject's body, where the robotic arm and end effector are controlled (e.g., in an automated or computerized manner) to provide a certain pressure at those targeted points on the subject's body.

In various embodiments, the hardware of the robotic massage system, such as the end effectors, robotic arms, and linear rail, are controlled by one or more controllers that send commands (e.g., torque commands) to actuators of the hardware (e.g., the robotic arms). Torque commands are one example type of interface for controlling a robot. Other types of interfaces may be utilized, as appropriate. In some embodiments, the controller is controllable via a computing device such as an embedded tablet and controls 718 (example of an input device for receiving user commands and presenting information) that a user may interact with (e.g., via graphical user interfaces displayed on the tablet, physical controls, voice commands, eye tracking, etc.). Other examples of input devices include, in various embodiments, joysticks, 3D mice, microphones, tablets/touchscreens, buttons, game controllers, handheld remotes, etc. In some embodiments, the hardware is controlled automatically by a networked computer system of the robotic massage system.

In this example, the robotic massage system also includes sensors housed above the table at 714 and 716. In some embodiments, the sensors include vision components situated above the table. In some embodiments, the vision components are utilized by the robotic massage system to generate a view of a subject's body, as well as a characterization of the tissue of the body. Examples of imagery generated by the sensors include depth cameras, thermographic imagery, visible light imagery, infrared imagery, 3D (three dimensional) range sensing, etc. In some embodiments, the overhead structures used to hold the sensors also include lights for lighting the participant's body.

Exterior Form of the End Effector

In some embodiments, the touchpoint described herein is a monolithic structure that includes multiple surfaces (also referred to herein as "tools" or "interaction regions"), where different surfaces of the touchpoint may be used to accomplish different massage purposes. For example, the touchpoint has an asymmetric shape that allows the same touchpoint to deliver various types of contact with a user, by orienting the end effector into a desired position using the robotic arm so that the appropriate surface on the end effector is in contact with the user. For example, the endpoint includes multiple surfaces (also referred to herein as "tools" for implementing different types of massages) that provide different massage effects based on the type of surface, the location of the tool on the end effector, and the angle of the tool. As one example, each surface emulates a different portion of a massage therapist's hand or arm. Based on how the robotic arm and end effector touchpoint are oriented, different surfaces of the touchpoint will engage with the patient or subject to create various different force or pressure profiles.

The combination of different tools on the same touchpoint allows the robotic massage system to provide a broad set of massage content (e.g., different types of massage strokes), and a broad set of ways of interacting with a person. Further, the tools and surfaces of the touchpoint are designed to provide broad sets of massage content and ways of interacting with a person in a condensed space.

In some embodiments, the placement of those tools takes into account robotic limitations. This provides a minimal-sized hardware, removing the need to have motors that create large amounts of force if not needed.

Embodiments of the end effector described herein include a 3-dimensional shape that is used as part of a robotic massage system. In some embodiments, two mirror-image touchpoints are mounted to the ends of robotic arms on either side of a person lying prone on a table. In some embodiments, each end effector embodies a number of segments throughout that mimic the feel or effect of different massage techniques delivered by a massage therapist.

In some embodiments, surfaces/tools of an end effector refer to different parts of the body. In some embodiments, there is a correlation or mapping between the different tools or surfaces of the end effector and a portion of the body that a massage therapist uses. For example, the segments correspond to various portions of a massage therapist's arm or hand.

The shape of the end point is not necessarily limited to mapping what a human therapist does. For example, even though the human hands are dexterous and can move in various angles, a human therapist may still be limited by the shapes and sizes of their hands and fingers.

While example mappings or correlations to massage therapist usages are described for illustrative purposes, the tools may be used for other massage purposes. For example, tilting over parts of the tool will result in certain surfaces being provided, allowing different types of massage strokes to be performed. For example, broader stripping with higher specificity can be provided. As another example, the different surfaces of the end effector map or correlate to different types of massage techniques (e.g., focused, broad, or pin-pointed compression, effleurage, cupping, broad stripping, etc.).

The various surfaces are designed to provide various types of functionality, such as with respect to strokes, with respect to force performance, etc.

In some embodiments, the end effector includes a solid inner skeleton shape, covered by a soft compressible material. In some embodiments, the skeleton's size and shape along with the thickness and shape of an outer soft material at each of the segments result in a touch that can be controlled through design. For example, the skeleton and outer surface can be shaped and sized to replicate a human-like touch mimicking the hand, knuckles, forearm, elbow, thumb, palm or a cupped hand.

Figure 8A:
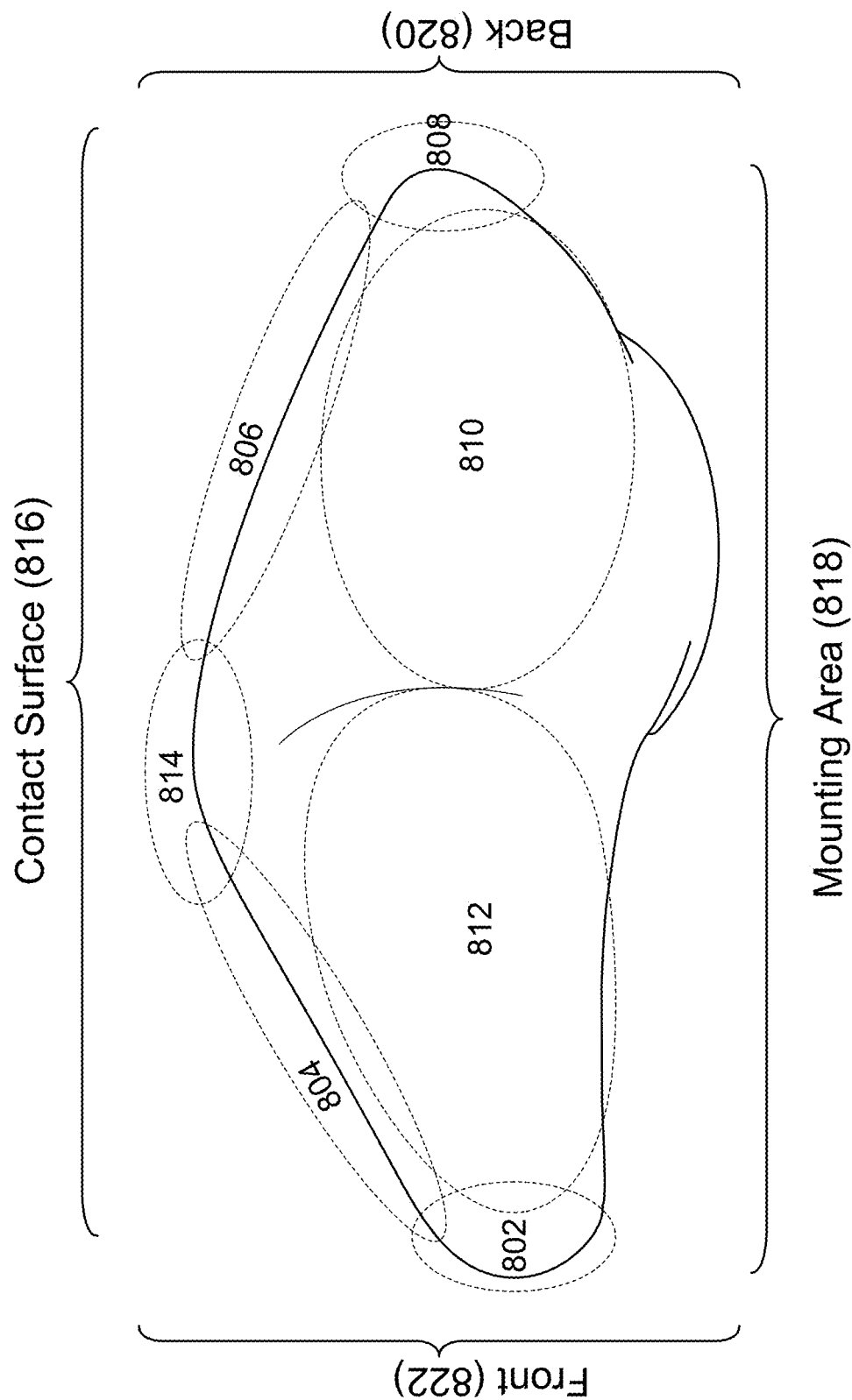
FIGS. 8A-8B illustrate embodiments of an end effector.

FIG. 8A illustrates an embodiment of an end effector. As shown in this example, the touchpoint includes seven different areas or segments, where each area corresponds to a part of an arm or hand of a massage therapist and/or a type of massage technique. While in this example, a touchpoint with seven tools is shown, the touchpoint may have any number of segments. In this example, a perspective view of the end effector is shown. For purposes of clarity, the portion of the end effector that contacts the user is referred to as the "contact surface" 816 of the touchpoint. In some embodiments, region 814 corresponds to the "top" of the contact surface of the end effector. The mounting area (also referred to herein as the "underside" or "bottom") of the end effector (which is where the end effector connects to a robotic arm) refers to the portion of the end effector shown at 818. The "back" of the end effector refers to the portion of the end effector shown at 820. The "front" of the end effector refers to the portion of the end effector shown at 822.

In this example, the end effector includes the following features/tools:

Focused Compression (Thumb) (802): In some embodiments, this region is also on a pointed-out portion of the end effector, where the pointing out is designed such that the thumb region is able to reach parts of the body such as the neck, without having other parts of the end effector or robotic arm (e.g., linkages) colliding with the user. In some embodiments, the thumb segment facilitates focused compression. In various embodiments, the thumb provides a focused area for trigger point compressions, upper trap work, cross-body work, etc.

The following are further embodiments of the focused compression segment. In some embodiments, the focused compression segment replicates the press of the thumb. It can be used in a direct downward force, or its sides can be used (allowing it, for example, to press against the side of a person's neck). In some embodiments, this segment is a long slender shape, with soft material that helps distribute pressure at the tip.

Blade (of Hand) (804): In some embodiments, the local surface of the blade portion of the tool has both flatter and sharper portions, where, for example, the blade portion has an edge. Depending on the angling of the tool (which may be adjusted by adjustment of the robotic arm) a different portion of the blade tool can be utilized and put in contact with the user's surface. For example, by angling or tilting the touchpoint over, the edge of the tool can be put in contact with the user, allowing it to be used to perform specific types of work, where, for example, because that edge is elongated, broader stripping can be performed while having high specificity. In various embodiments, the blade segment is a focused area that facilitates stripping on the next, stripping up the back, leg work, etc.

The following are further embodiments of the blade segment of the end effector. In some embodiments, this segment embodies a soft ridge, located, for example, along the top edge of the end effector, replicating the side of the hand from the base of the little finger to the wrist. This creates a long thin surface, and may be used, in various embodiments, for gentle stripping, a sliding motion, for applying pressure to the shoulder blades, etc. In some embodiments, the highest area of pressure along the length of the ridge mimics the side of the metacarpophalangeal joint of the little finger (the MP joint located at the base of the little finger), the point at which the proximal phalange meets the metacarpal bone.

Broad Stripping (Forearm and Forearm-to-Elbow) (806): In some embodiments, the forearm segment facilitates broad stripping and compression. This includes facilitating pin and stretch, horizontal motions along the legs, etc.).

In some embodiments, the broad stripping segment is formed by a ridge on the end effector that replicates a massage therapist's forearm from the wrist to the elbow. In some embodiments, this segment provides a longer surface to create a lower friction movement.

In some embodiments, in addition to replicating broad strokes, this segment may also be used in tandem with a second robot arm to create a pin-and-stretch movement, where a touchpoint of a robot arm on one side of the massage table steadies the body, while the broad stripping segment on the other side slides away in a broad stroke to stretch the body.

In some embodiments, the forearm ridge extends to the stripping (pinpointed compression/elbow) segment 808 (described below), to replicate a massage therapist's movement that starts with the forearm and ends with the elbow. In some embodiments, the end of the broad stripping segment (e.g., the end of the end effector that is near the pinpointed compression segment 808) incorporates a bump, to replicate the feel of the lateral and medial epicondyles that are at the end of the humerus (upper arm) and the styloid process of the radius and ulna bones of the forearm.

Stripping (Pinpointed Compression/Elbow) (808): In some embodiments, the elbow segment facilitates pinpointed compression. In some embodiments, the elbow segment provides a high-intensity area, facilitating, in various embodiments, high-intensity stripping, trigger point compressions, cross-fiber stretching, etc. In some embodiments, a far end of this region of the end effector includes a bump to replicate the bump at the end of a therapist's elbow.

In some embodiments, the stripping segment is designed to create a high-pressure point, simulating the touch or the press of a massage therapist's elbow. A direct press of the elbow results in concentrated pressure on the body exerted, for example, by the distal end of the ulna bone.

Effleurage (Palm) (810): In some embodiments, the palm provides a relaxation area. In various embodiments, the palm segment facilitates relaxing effleurage, transition strokes, mother hand, etc.

In some embodiments, the effleurage segment mimics the feel of a massage therapist's palm, including the touch of the array of eight carpal bones in the wrist. In some embodiments, the segment is a concave shape, resulting in most pressure being applied at the edges, less in the center of the segment. In the hand, pressure from the wrist bones is being made primarily by the pisiform bone (on the little finger side) and the trapezium (on the thumb side).

Cupping (Cupped Hand) (812): In some embodiments, the cupped hand tool is locally concave (while the general shape is convex). In some embodiments, the cupped hand portion of the tool is used as a support area, such as for asymmetric work. For example, suppose massage is to be performed on the legs. The concavity of the cupped hand portion of the tool allows the end effector to be braced around the leg to provide support when force is being applied in another direction (e.g., sideways). For example, the cupped hand provides support such as leg support, leg effleurage, etc.

As another example, the concavity of the cupped hand portion of the tool is beneficial to avoid collisions where the two legs are next to each other, and the end effector is to reach the inside or interior surface of the leg (e.g., side of leg facing the other leg).

In addition to providing bracing, the cupped hand tool is also used to perform massage content. For example, the exterior curvature is used for the legs to provide, for example, broad effleurage. With the concave shape, the cupping hand tool can provide broader contact with less force, without requiring deformation to make contact.

In some embodiments, the massage system's two robot arms can work in unison, with one arm steadying the body. The cupping segment can be used, for example, to steady the inner thigh while the second robot arm delivers the massage. In some embodiments, the cupping segment is curved to mimic a cupped hand, and in various embodiments is designed as a planar curve or a concave shape.

Broad Compression (Knuckles and Elbow) (814): In this example, the knuckle or "top" portion of the end effector is the highest force area that can be used (e.g., 200+ Newtons of pressure directly under the arm). The forearm and elbow portions are similarly designed to provide a high force given joint configurations of the robotic arm. In some embodiments, the knuckle segment facilitates broad compression. In some embodiments, the knuckle segment is a high-force area that facilitates power compressions, high-force stripping, etc.

In some embodiments, the knuckle segment, which mimics knuckles as well as fingertips, creates focused points of contact. In some embodiments, it replicates the touch of a massage therapist's closed hand, either a clenched fist or clenched fingers, or extended fingers with fingertips being the points of touch. In some embodiments, this segment of the touchpoint is designed to feel similar to the massage therapist's touch using the metacarpophalangeal joints (knuckles at the base of the fingers), the interphalangeal joints (joints between the fingers' bones), and fingertips. In some embodiments, this segment can also be used to mimic the touch of a massage therapist's elbow.

Figure 8B:
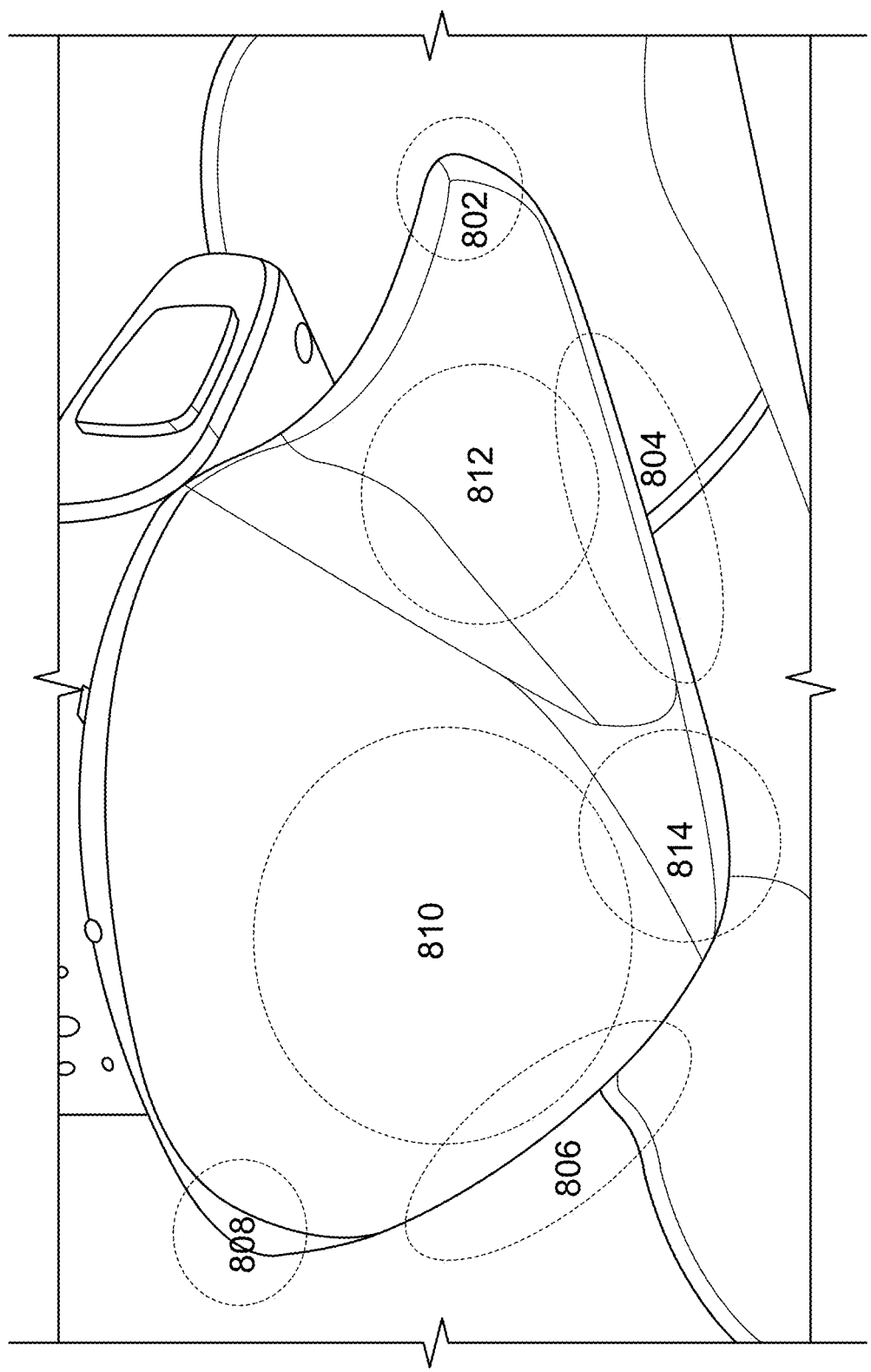

FIG. 8B illustrates an embodiment of an end effector. In this example, a perspective view of the touchpoint, as attached to an end of the robotic arm, is shown. In this example, the numbered regions correspond to the numbered regions described in conjunction with FIG. 8A.

Some massage motions may involve the use of multiple segments, such as transitioning from one segment to the next. For example, broad compressions may be supported by both the knuckles and elbow segments. Broad stripping may be facilitated by not only the forearm, but also transitioning from the forearm segment to the elbow segment.

For example, the various tools support different types of therapeutic or interaction events, such as focused compression (thumb), blade (side of hand), broad compression (knuckles, elbow), broad stripping (forearm, forearm to elbow), pinpointed compression (elbow), effleurage segment (palm), cupping (cupped hand), etc.

Exterior Material Selection

The following are embodiments of material selection for the exterior surface of the end effector. In some embodiments, the exterior of the end effector is a shell that surrounds an internal structure, further details of which are described below. As one example, exterior material is overmolded over an internal skeleton.

The following are example factors that are taken into consideration with respect to material selection:
  Biocompatibility of materials that are being used
  Longevity—how well materials handle, for example, shear forces
  Manufacturability—manufacturability of material while having a certain lifespan In various embodiments, determining material selection for feel (e.g., to feel similar to a human hand or to provide a luxurious experience or to provide a similar level of intensity) includes selecting material durometer, as well as the "give" of the material (e.g., elasticity, deformation properties, etc.). In some embodiments, give relates to the stiffness of the durometer. In some embodiments, the durometer/hardness for a material such as silicone provides an indirect metric for give. In some embodiments, give is a result of both the stiffness and the depth of the material—that is, how the contact surface deforms under a certain amount of force. The "give" of the material and the curvature of the surface play a factor in the feel that the touchpoint creates. For surfaces that cover a broader area, deeper amounts of silicone allow the surface to deform more and feel softer, as compared to other areas that have less depth of material (and less "give" as a result). The relationship between material depth and stiffness determine the relative "give."

Different materials may engage in various ways, and there may be various tradeoffs when selecting material(s) that cover the touchpoint, such as between firmness, luxuriousness of feel, thickness, durability, etc.

For example, the material will wear down over time. The thicker the material, the more stretch there is from the shear forces that are experienced by the material. In some embodiments, the area and durometer of the exterior material are selected based on durability. For example, durometer is accounted for with varying depth of material, where for a stiffer or higher durometer material, a greater depth of the material (e.g., silicone) may be used. For example, one tool may have a thinner material depth (e.g., 10 mm), while another tool may have a thicker material depth (e.g., 22.5 mm). In some embodiments, there is a minimum thickness in order to distribute the shear forces. This is due in part to the distribution of force across a large enough area of the internal skeleton so that the exterior material (e.g., silicone) is not peeled away from the skeleton.

One example of an external material for the end effector is silicone. As one example, silicone with a durometer in a range of 5A-50 is selected for the exterior material. Other examples of exterior materials include rubber, rubber foams, high density foam, flexible or elastic resins, PTFE or other fluoropolymers, or any biocompatible elastomer such as a polyurethane, as appropriate.

In some embodiments, the determination of the material and its durometer is based on performing pressure mapping. For example, the material is selected such that the pressure imparted via the material mimics the pressure profiles of massage therapists.

In some embodiments, the end effector is characterized by using a pressure map. Strokes similar to that performed by a therapist are performed using the appropriate or correlated tools on the end effector. The pressure profiles that are observed are mimicked to provide a similar distribution of pressure and intensity as compared to a human therapist. Such pressure and intensity profiling may also be used to determine the size and material selection of the various areas of the touchpoint.

In some embodiments, the same material is used across the entire end effector. For different portions (e.g., tools) of the end effector, different combinations of durometer/material thickness may be utilized. As one example, the same durometer of material is used around the entire end effector, but with different tools having different thicknesses (that is, as one example, the durometer is the same for all tools, but the thickness may vary between tools).

For example, varying the thickness of the material provides different effects. Keeping the same durometer for the entire shape provides for ease of manufacture. Different exterior material thicknesses, in conjunction with the structure of the internal skeleton, provide a therapeutic effect desired given the shape (of a tool) for a single durometer. In some embodiments, the durometer is selected for durability of the touchpoint (with a bias towards durability with respect to therapeutic content).

In some embodiments, durability of the end effector is determined based on the selected durometer of the exterior material. Providing a therapeutic benefit for therapeutic content is determined by thickness and also internal structure, which impacts how the material will compress or relax as the end effector interacts with the subject's body.

In some embodiments, the specification of the material (e.g., material selection, durometer, and/or thickness) is determined based on the properties of the internal structure (e.g., skeleton) of the end effector.

As described above, the thickness of the exterior material is varied in some embodiments depending on the tool. For example, thin or medium thickness of the focused compression section (e.g., thumb) may allow for more versatility based on the robot arm pressure being applied. The thickness within an individual segment may also vary. As one example, as part of the effleurage segment (e.g., palm), a thicker silicone may be used generally, while the portion of the palm emulating carpal bones of the outer edge of the wrist (which provide the most pressure) has a thinner amount of silicone at the outer edges so that they may be felt.

FIG. 9A illustrates an embodiment of exterior material thickness of an end effector. In this example, a cross-section of an end effector is shown. In this example, the cross-section illustrates different thicknesses for different portions or segments of the end effector, as well as varying thickness within a single tool.

In this example, a silicone coating (example of selected exterior material, as described above) is shown at 902. As shown in this example, there is a varying thickness to the exterior silicone across the end effector (that is, the exterior material is not of uniform thickness around the end effector). The thickness may vary between tools, to allow operation in different manners. For example, the material may be thinner for the tools corresponding to the knuckle or the blade. For the palm portion, more (e.g., thicker) material is used to provide a softer feel. A greater thickness of material tends to provide a softer, more luxurious feel, while less material (lower thickness) tends to provide a higher intensity (e.g., greater, more direct transfer of force, with less buffering) to provide an added type of therapeutic effect. The thickness may also vary within an individual tool, an example of which is described in further detail below.

As shown above, different tools have corresponding depths (which may vary within an individual tool as well). For example, there may be a range of different millimeters of depth (e.g., between 1 mm-50 mm) relative to the exterior surface of the endpoint (including the material), where there may be greater depth for areas such as the palm. For other areas, such as the knuckle or blade, the depth may be lower (corresponding to thinner material). This allows for a greater specificity of force to be transferred (as there is less cushioning from the exterior material and more interaction with the more rigid internal structure). Care should be taken with respect to the amount of thickness of the exterior material, as having too low thickness may reduce the durability of the material, where it may wear faster and rip because the material is too thin.

The following is another example of determining material thickness for a given tool based on pressure mapping. For a given tool, the pressure map for various depths is determined. This profile of pressure versus depth is then compared to the pressures observed or measured for human therapists. A depth (which in turn determines material thickness) is then determined based on matching to the pressures applied by a human therapist.

As one example, referring to the example of FIG. 9A, consider the palm area 810. In this example, the exterior side of the palm surface is convex, and has an outward curvature. The inner side of the exterior surface of the palm sits in a depression formed by the inner skeleton 904 (further details of which are described below). When this portion of the palm is contacted against a subject's body, the exterior portion of the silicone material will deform inwards towards the interior of the end effector, flattening the protruding curvature until there is a more even, broader surface.

The pressure mapping is used to determine an amount of applied pressure (to the user's surface) given an amount of material thickness. The material thickness, where it is, and its uniformity may then be determined based on matching that area's pressure to the pressure applied by a human therapist. Within a tool, the pressure that is applied is designed to be relatively uniform to match what a human therapist would do.

By varying exterior material thickness (in conjunction with the shape of the more rigid internal skeleton), the engagement or pressure profile of the surface is not completely uniform across the entirety of the overall surface of the end effector. This facilitates providing both relaxation and increased muscle engagement. This variation within the material thickness of the tool also changes engagement of the end effector with the user when performing strokes that have both directionality and/or varying pressure.

For example, suppose that the blade portion of the tool is being utilized. At a beginning of a stroke, when pushing of the end effector is initially commencing, a relatively flat portion of the tool is being used, resulting in a uniform pressure profile initially across that area of the tool. As the tool is pushed down further, the silicone will deform across the surface, resulting in a varying pressure profile on the actual body, depending on how much the end effector is pushed down, which causes engagement of the muscle in different ways. In this way, the same tool may be used to feel both broad and light, as well as higher force and specific.

The varying pressure profile for the tool also allows for the exterior material to be better pushed. For example, consider stripping strokes down the back. When stripping is being performed, it would be desirable if the end effector is pulling the muscle, and dragging it, as the extension of the muscle provides a release of the muscle, which increases blood flow, and will provide a therapeutic benefit to the subject.

If the end effector were completely flat, when pushing down, this would result in sliding, and a lower level of friction. In some embodiments, the variation in the surface of the tool takes into account the friction on the surface of a garment that the user wears when performing massage. Further details of such a garment, as well as friction compensation/management, are described below.

By allowing variability, the material can be caused to bunch in a manner similar to the way in which the hand does, where when the masseuse pushes down with their hand, their tissue will bunch up about their bones. The exterior material will bunch up against portions of the inner structure. For example, the inner structure may have an overall global shape with localized variations such as cut-outs, protuberances, etc. in particular areas to facilitate bunching of material.

Friction Management

In some embodiments, the end effector is designed to manage friction, such as to provide, as the end effector slides or moves across the subject's body, a desired coefficient of friction (or for the coefficient of friction to be within a range). A certain amount of friction is desired, to create a certain amount of slip on the body at all times throughout a massage. For example, a coefficient of friction of zero, which is no friction, would result in no actual engagement of muscles, where dragging and pulling of the end effector against the user's body would not occur. Too high of a coefficient of friction however will cause irritation or bunching up of the subject's surface.

The following are various embodiments of management of friction between the exterior surface of an end effector and the body.

While an exterior material such as silicone provides flexibility, in some embodiments, the properties of the exterior material are augmented to provide a desired range of coefficient of friction. For example, an overwrap may be used to reduce friction when sliding stroke movements are being implemented.

Covering

As one example, a cover is applied to the end effector when performing a massage. In some embodiments, the cover is disposable. As one example, a vinyl cover is placed over the touchpoint. LDPE (low-density polyethylene) material and fabric are other examples of coverings that may be applied. The covering provides the desired coefficient of friction.

Coating/Wrapping

In some embodiments, the end effector is coated or wrapped with another material as part of the manufacturing process. For example, an LDPE plastic film, TPU (thermoplastic polyurethane), or a paralene film is wrapped over the end effector. The wrapping may involve applying multiple pieces of wrapping to the end effector. This results in an additional discrete surface forming over the silicone, where the wrapping provides the desired coefficient of friction.

Treating/Doping

In some embodiments, the exterior material is doped or treated with another material that causes the exterior surface of the end effector to have a desired coefficient of friction when in contact with the subject.

For example, the endpoint is dipped or infused with another material to cause the surface properties of the silicone to change. As one example, silicone is injected or impregnated with another material to change its properties. This causes the properties of the upper layer of the silicone exterior to be changed via introduction of another chemical compound. Examples of compounds used to dope silicone include, in various embodiments, tungsten for radiopacity, peroxide catalyst additives for higher consistency in manufacturing, cross-linking by condensation using PDMS (polydimethylsiloxane), excess saline and tin for improved sealant properties, or combined with phenyl groups for its low friction properties.

Lubricant

As another example, a consumable such as a lubricant or oil is applied to the user and/or the end effector. As one example, the touchpoint includes attachments such as an aerosolizer and sprayer, as well as a reservoir containing a lubricant. The lubricant is aerosolized and sprayed onto the body to provide a lubricated version of the massage. As the robotic arms move along the body, the lubricant is sprayed over the user's body, which is then distributed and spread out. In some embodiments, implementing a stroke includes a step of applying lubrication to the person and distributing it, before resuming regular massage content.

As another example, lubricant is applied to the end effector. For example, the robotic system includes a reservoir of lubricant that an end effector is dipped in. In some embodiments, the lubricant is heated in the reservoir. As another example, the lubricant is sprayed onto the end effector.

As the lubricant may dry or be absorbed (which would affect the amount of friction between the end effector and the subject's surface), in some embodiments it is re-applied, where massage plans are adapted based on the reduction in lubricant over time. Lubricant may also be re-applied as the subject's body absorbs lubricant (where there may be variation between people in the rate at which their bodies absorb lubricant).

Figure 9B:
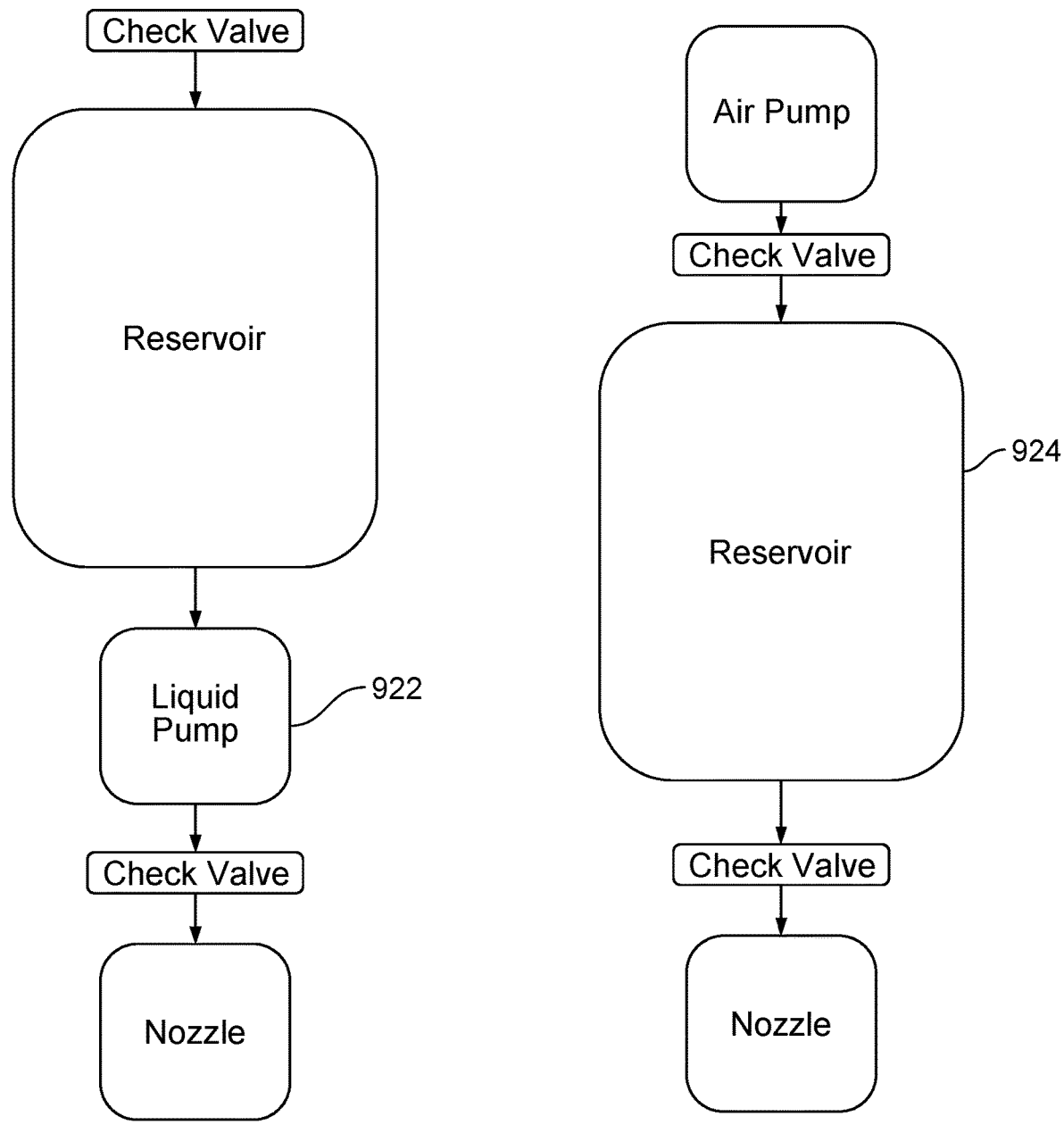
FIG. 9B illustrates embodiments of a variable lubricant sprayer architecture.

FIG. 9B illustrates embodiments of a variable lubricant sprayer architecture. In the example of FIG. 9B, two example sprayer architectures are shown. In some embodiments, the variable architecture supports swapping of pumps. In some embodiments, the pump architecture is swappable. For example, the architecture may be swapped between a liquid pump 922 versus an air pump 924. In some embodiments, the variable sprayer architecture includes swappable nozzle heads. In some embodiments, different spray nozzle heads provide different types of outlets, such as different numbers of outlets, different outlet shapes, etc. The different types of spray nozzle heads may be used to support various types of lubricant atomization.

Garment

The coefficient of friction is dependent on both the end effector's surface, as well as the user's body. There is variation between people, such as different amounts of hair on the bodies, which can result in different amounts of friction between the end effector and different users.

In some embodiments, to provide a more predictable or controlled experience, as part of the massage, the user wears a shirt/leggings or other type of controlled massage clothing or garment. The controlled garment provides a normalized or standardized surface that the robotic massage system interacts with, removing variation across user surfaces.

The controlled garment assists in normalizing the amount of friction that the endpoint experiences with respect to the subject. For example, the use of a shirt removes hair that the end effector could catch on. Further, if a lubricant is used as described above, the use of the garment also allows a predictable lubricant absorption rate (where the skin of different users may absorb lubricant at different rates). Coverings and coatings described above may be selected for controlled garments, providing greater consistency across individuals, as they now effectively have the same "skin" from the perspective of the end effector. In some embodiments, rather than performing lubrication, a coating or film is on the end effector, which is paired with a controlled clothing. This controls for the variations across users' skin to control for the overall experience, where the variability in the surface among subjects is eliminated (as both the properties of the end effector surface, as well as the surface of the subject that the end effector interacts with, are controlled). Examples of materials that a garment (e.g., shirt) is made of include polyester, elastane, nylon, etc. In some embodiments, the garment is a blend of materials with different percentages/ratios of individual materials in the blend. In some embodiments, the coefficient of friction between the garment and the end effector is adjusted by varying the material selection and composition of the garment and/or the exterior material of the end effector (which may also be wrapped, lubricated, etc.).

In some embodiments, the user is fully enclothed in a garment. In some embodiments, the user is partially covered by the garment(s). For example, the user may be mostly clothed, except for areas such as the neck. In this case, a hybridized friction management for the massage may be performed, where differing amounts of lubricant are applied based on where the user is or is not covered by garments. Other embodiments of garments include hooded clothing (e.g., to cover regions such as the neck), body suits, specialized socks, multi-piece garments, etc.

Interior Structure

In some embodiments, the end effector includes an internal structure that exterior materials (such as that described above) are molded over.

Figure 10A:
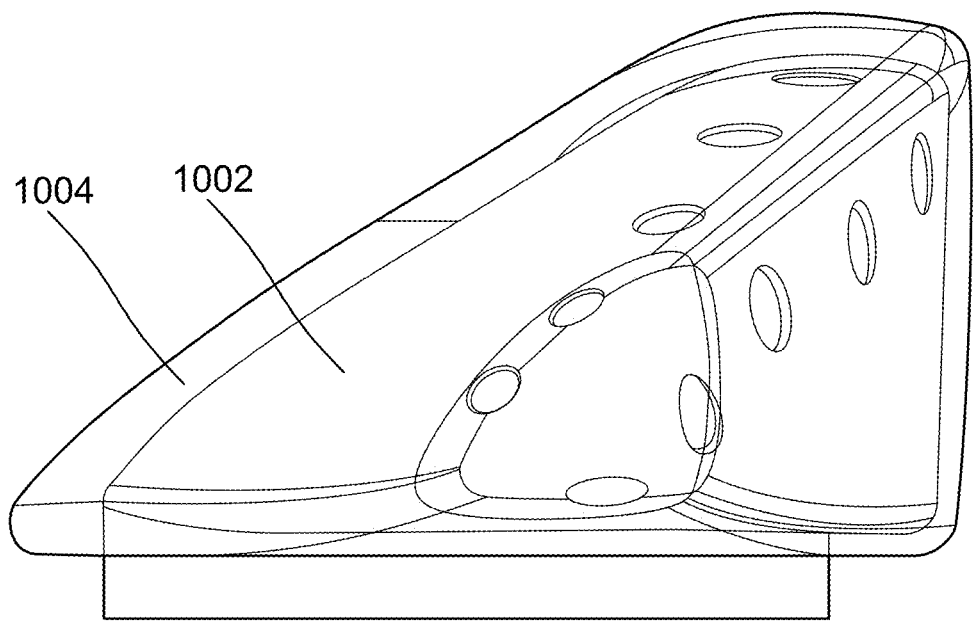
FIGS. 10A and 10B illustrate embodiments of views of an end effector.
Figure 10B:
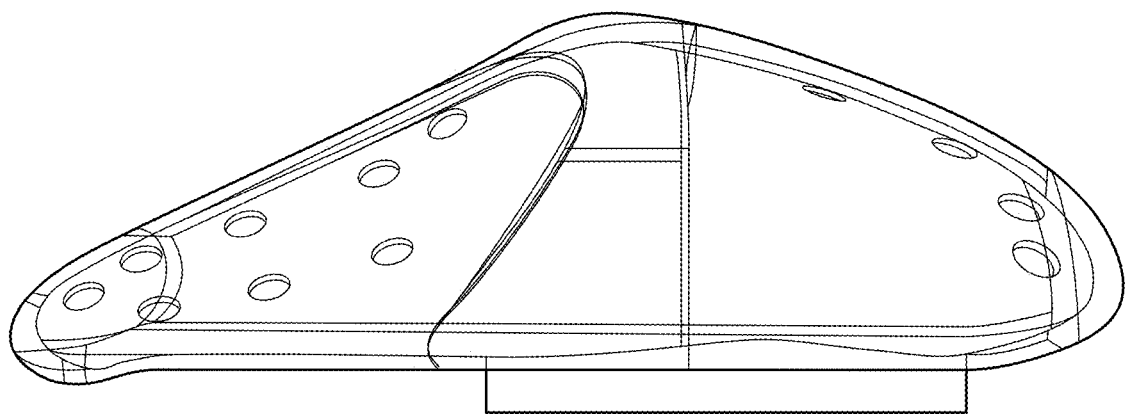

FIGS. 10A and 10B illustrate embodiments of an internal structure of an end effector. In some embodiments, the end effector includes an internal structure 1002, referred to herein as an internal "skeleton" of the end effector. As one example, the inner structure is a rigid, skeletal-type structure that provides support for the exterior material (1004).

Different perspective views of an end effector are shown in the examples of FIGS. 10A and 10B. In the example of FIG. 10A, a view from the "front" of the end effector is shown. In FIG. 10B, a side profile of the end effector is shown.

The internal skeleton structure may be made from various materials. In various embodiments, the internal structure is created from a 3D (three dimensional) printed plastic, aluminum, casted material, etc. In some embodiments, the material used for the internal structure is determined based on thermal properties, where in some embodiments, the touchpoint includes heating elements, further details of which are described below.

In some embodiments, the internal structure is smooth or flat. In other embodiments, the internal structure is a variable skeleton, where the surfaces of the skeleton are not necessarily smooth or flat, but may have various ridges, protuberances, lips, gaps, etc., which impact how the exterior material will compress or relax depending on how the end effector is being put in contact with the subject's body.

In some embodiments, the internal skeleton is dynamically adjustable. For example, actuators are placed inside the skeleton that cause various portions of the skeleton to change, allowing the shape (globally and/or locally) of the end effector to be dynamically changed. For example, the actuated interior skeleton may be configured to change the pressure profiles of the end effector.

In some embodiments, the interior structure or skeleton is designed in conjunction with the amount of material thickness across its surface. For example, the skeleton is designed with concavities and ridges to determine where there should be more or less material.

Figure 10C:
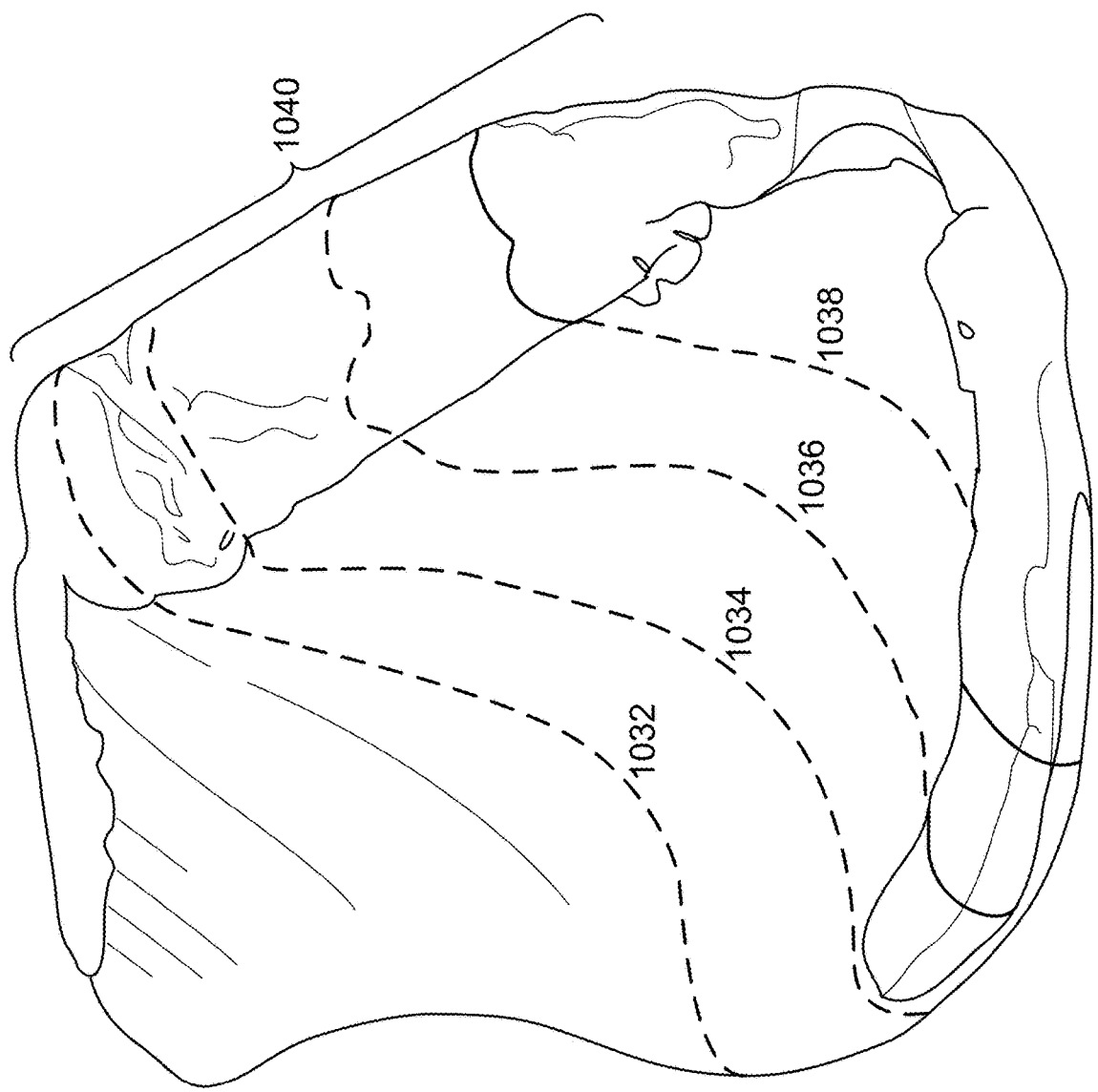
FIG. 10C illustrates an embodiment of a topography of an internal structure of an end effector.

FIG. 10C illustrates an embodiment of a topography of an internal structure of an end effector. In some embodiments, negative space is introduced in the skeleton where thicker material is to be used. Contours of the interior skeleton of the palm tool are shown (contour lines 1032, 1034, 1036, and 1038) in this example, where the local region of the internal structure corresponding to the palm is concave, allowing for a relatively higher degree (and depth) of exterior material thickness, which provides more support, a more luxurious feel, etc. As one example, as the global surface of the end effector has various local regions for different types of tools, the global inner structure also has local skeleton regions that correspond to the tools described above (e.g., knuckle skeleton, palm skeleton, elbow skeleton, etc.).

On more therapeutic surfaces that provide, for example, higher force compressions and stripping, the skeleton is more pronounced (e.g., with ridge 1040 of the inner skeleton) to provide a higher level of engagement with tissue as the end effector moves along the body.

As described above, the amount of exterior material to be used varies depending on the tool type. In some embodiments, the palm and the cupped hand tools have a relatively thicker amount of material, where the thumb, knuckle, and elbow are relatively thinner. In some embodiments, the inner skeleton is shaped (e.g., with various local topographies) to accommodate for the desired varying exterior material thickness. For example, to allow for thicker material, the corresponding portion of the inner skeleton is made more concave, where concavity corresponds to depth.

In some embodiments, the interfaces between two tools are also designed to account for transitions between two tools. For example, at transition points between surfaces, the skeleton is designed so that when the end effector is rotated by the arm to transition from one surface to the next, the rotation will cause the material to be bunched up, providing a softer space. This provides increased engagement to hook into muscles, similar to as what would occur when a human therapist uses their bones. This provides a more bone-based skeleton approach.

By allowing variability of the material thickness, in conjunction with coordinated shaping of the internal structure, the material can be caused to bunch in a manner similar to the way in which the hand does, where when a therapist pushes down with their hand, their tissue will bunch up about their bones. Having cut outs or gaps along portions of the inner skeleton will cause the exterior material (e.g., silicone) to bunch up against portions of the inner structure.

For example, the inner structure includes a protuberance or hook (e.g., formed by placing various ridges and concavities in the inner structure), where pushing the end effector into the body will cause the material in front of the ridge to compress and bunch up the material—that is, the specificity or shaping of detail portions of the inner skeleton allows the inner structure to push into the material, and into the user's tissue. As one example, a Y-shaped portion of the inner structure will cause exterior material to be bunched up when the end effector is pushed along a person's body. In some embodiments, a Y-shape or L-shape with a pocket is used to implement the portion of the inner skeleton corresponding to the knuckle. This allows for more focused pressure to be created, as well as to emulate grabbing by a bone. In some embodiments, an L-shaped structure located towards the elbow side of the end effector allows motions to be performed that are similar to that of driving with the of the palm of the CMC (carpometacarpal) joint.

That is, what is felt by the user is a function of the force transferred through both the internal structure of the end effector and the exterior material (which will have a certain durometer and thickness).

Figure 10D:
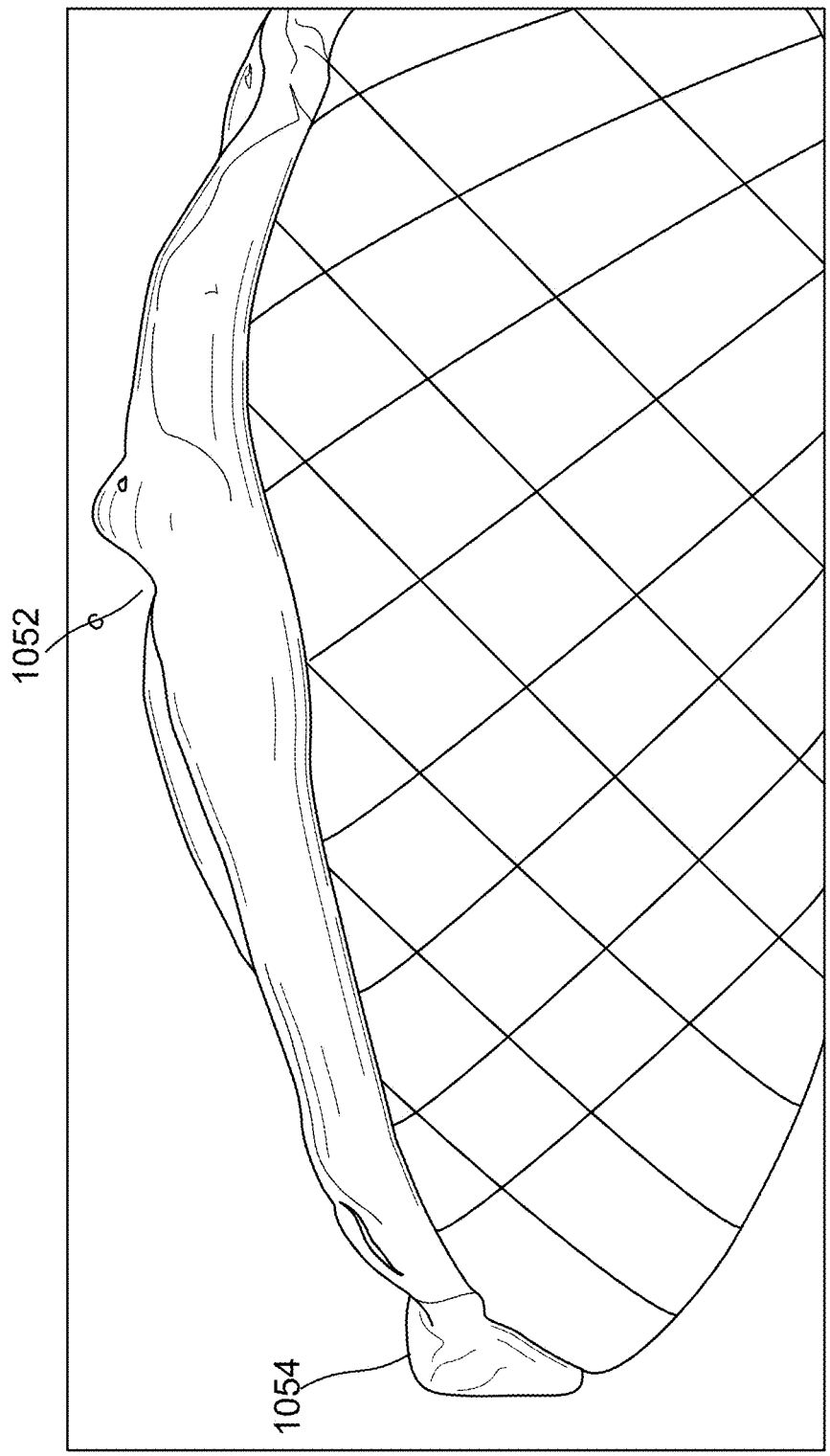
FIG. 10D illustrates an embodiment of shaping of an internal structure of an end effector.

FIG. 10D illustrates an embodiment of shaping of an internal structure of an end effector. As described above, the shape of the internal structure will cause the exterior material to compress or stretch or relax in various ways when manipulating the end effector (e.g., moving the tool relative to a person's body, transitioning between tools, etc.). In this example, a gap 1052 is introduced between two surfaces/tools (e.g., between the knuckle and forearm tools), so that when the end effector is rolled, a ridge is disengaged. For example, when forearm stripping is performed, the ridge is not engaged. In some embodiments, the ridge at the base of the palm creates variability in traction/grabbing of effleurage strokes.

In some embodiments, a similar gap is placed at the "back" of the end effector at elbow tool location 1054. This will allow the elbow to have increased grip for stripping strokes without requiring as much angular difference on the surface. The variable skeleton described herein allows a smooth outward shape and form (which is based on the exterior material), while allowing for various pressure profiles based on the compression or relaxation of the material relative to the inner structure (which may have various concavities, convexities, protuberances, ridges, gaps, lips, etc. that affect how the exterior material compresses or relaxes).

Mounting of the End Effector

The example of FIG. 8B illustrates an embodiment of an end effector mounted on a robotic arm. In some embodiments, the end effector is rigidly linked to an end of the arm. In other embodiments, the end effector is rotatably attached to the last link of the arm. For example, there is a motor at the end of the arm that controllably rotates the orientation of the end effector.

In some embodiments, the "underside" or "bottom" of the touchpoint (mounting area) includes a plate or other connector that rigidly connects the touchpoint to an end of a robotic arm. In this example, the touchpoint's position relative to the arm is fixed (although it may be rotated about an axis). Additional degrees of freedom for adjusting the position and orientation of the touchpoint may be introduced by introducing more links of the robotic arm.

In some embodiments, due to the asymmetry of the end effector, there are different end effector variants for the left and right arms. For example, the left end effector and the right end effector are mirrors of each other when mounted on the arms.

In some embodiments, each end effector has a specific mounting interface or mounting pattern (e.g., robotic flange mounting pattern) so that it cannot be mounted incorrectly to the wrong arm, and so that it cannot be mounted in the wrong orientation on an arm. For example, in some embodiments, the mount is asymmetrical. The specific mounting pattern ensures that an end effector is attached to the appropriate arm in the correct orientation.

In some embodiments, the mounting position (where the end effector mounts to the last link of a robotic arm) is centered towards an end (e.g., "front" or "back") of the endpoint. In some embodiments, the asymmetrical mounting position reduces collisions.

As described above, in some embodiments, the end effector is connected to an end of an arm via a mounting adapter. In some embodiments, the mounting adapter includes a mounting pattern that forces an asymmetric and specific mounting configuration to prevent incorrect mounting of the end effector.

In some embodiments, the mounting adapter includes a flange. In some embodiments, electric connections (further details and embodiments of which are described below) come through the bottom of the flange. In some embodiments, the use of such a mounting adapter facilitates switching out of the touchpoint in the field.

Figure 8C:
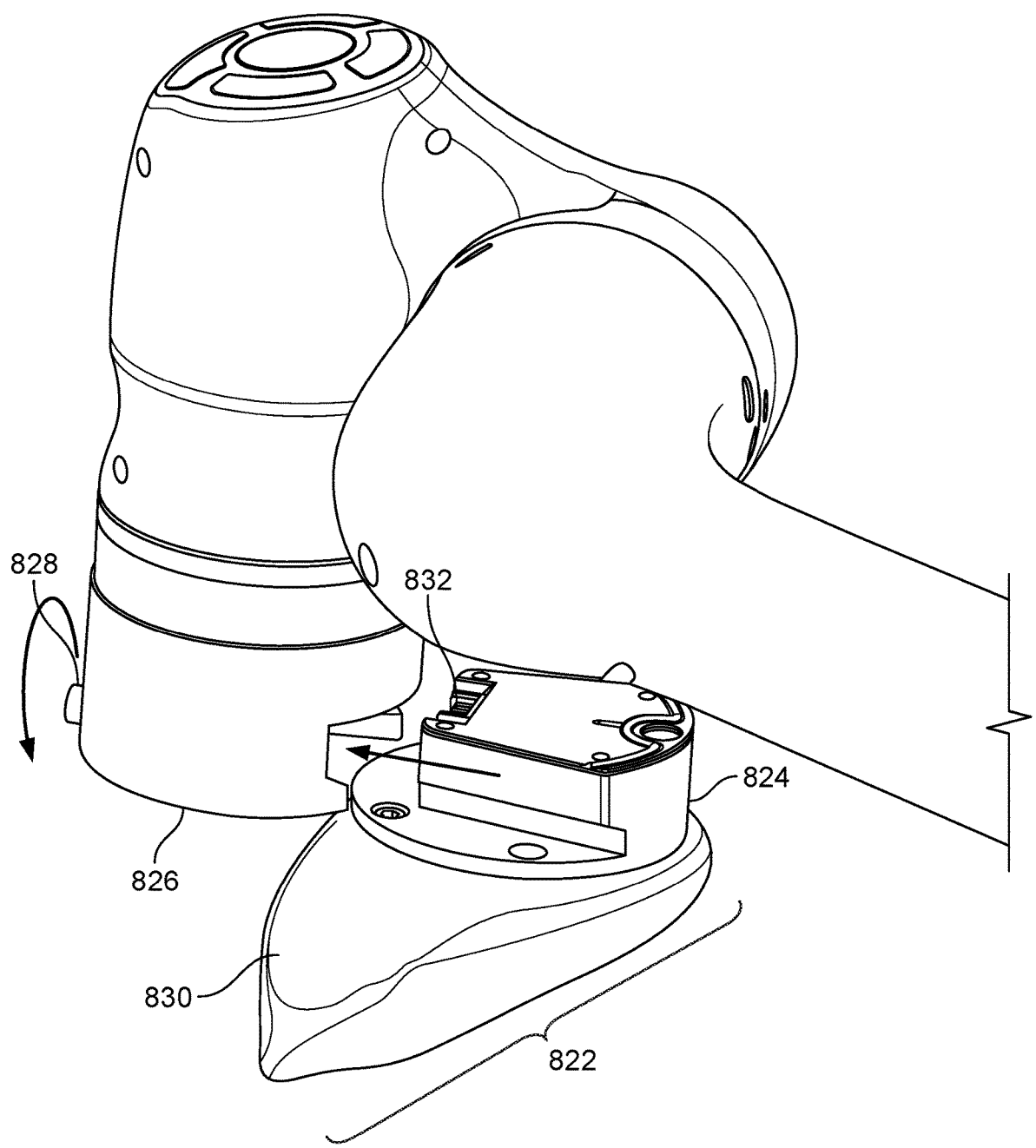
FIG. 8C illustrates an embodiment of an end effector mounting mechanism.

FIG. 8C illustrates an embodiment of an end effector mounting mechanism. In this example, mounting or attachment of an end effector to a robot arm is shown. In the example of FIG. 8C, an end effector 822 is shown. In this example, the end effector includes a mounting portion 824. Mounting portion 824 includes channels that slot into a receiving portion 826 of a robotic arm. The receiving portion 826 includes flanges in this example. When the mounting portion 824 of the end effector 822 is pushed into the end of the flange of receiving portion 826 of the arm, the mounting portion 824 slots into the receiving portion 826, resulting in a type of press fit. To secure the end effector to the arm, the receiving portion 826 includes a screw 828. As one example, mount 824 includes a threaded insert that receives the screw 828, causing the screw to be pulled in when it is turned or tightened. After inserting of the end effector, turning of the screw secures the end effector to the arm. This results in a rigid mount between the end effector and the arm with a single connection. In this example, the screw is used to lock in the dovetail that forms when slotting the mounting portion 824 into the receiving portion 826. Unscrewing or loosening the screw 828 releases the end effector, allowing the end effector to be slid out and removed.

In some embodiments, to prevent the screw 828 from falling out when the end effector is not attached, the receiving portion 826 includes a mounted piece of metal that holds or locks the screw in place. As shown in this example, to mount the end effector, mounting portion 824 of the end effector is slid into the receiving portion 826 of the arm. The screw 828 is tightened to secure the end effector to the arm. To remove or release the end effector, the screw is unscrewed. The locking or holding mechanism attached to the screw prevents the screw from falling out of receiving portion 826. In some embodiments, actuated or automated locking is performed. For example, motors or other actuators are used to secure the end effector to the arm. As one example, a motor is used to drive the screw. Other examples of securing mechanisms include cam mechanisms to lock the end effector to the arm.

In the example of FIG. 8C, end effector 822 also includes electrical connector 832. When the end effector is inserted into the slot of arm receiving portion 826, the electrical connector is also slid in. The electrical connector provides an electrical connection between the arm and the end effector, facilitating communications between the robotic system and components of the end effector such as the heating elements, electrical components, etc. which, for example, are embedded in portion 824 of the end effector. In some embodiments, receiving portion 826 includes a receptor or receptacle for connecting or coming in contact with electrical connector 832.

In some embodiments, the end effector mounting mechanism is configured to connect to a specific arm (e.g., left arm or right arm). For example, the insertion interface of the end effector determines which arm an end effector can insert into. As one example, the mounting portion 824 is shaped to be inserted into a specific arm. Another example insertion interface for determining which arm the end effector is able to mount to is the electrical connector. In some embodiments, the electrical connector is shaped or constructed to be unique to a specific arm. For example, the shape of electrical connector 832 dictates whether the end effector attaches to the right arm or the left arm (such as in the example two arm system shown in FIG. 7). This prevents the end effector from being attached to an incorrect arm, and ensures that an end effector is only attachable to an appropriate arm. As one example, the receiving portion 826 of the arm includes a corresponding piece that an appropriately shaped end effector electrical connector would slot into. If the end effector's electrical connector is not compatible with the receptacle in the arm's receiving portion 826 (e.g., because a user is attempting to mount an end effector to the wrong arm), then the end effector is prevented from being slotted in completely. This further results in a gap that prevents the screw 828 from being able to reach the threaded insert in mounting portion 824 (preventing the end effector from being locked to the arm). Further, the end effector is not able to form an electrical connection to the arm. This allows control of which arm (or arms) the end effector is able to connect to.

In some embodiments, the end effector 822 is constructed as a single piece or consumable. At its end of life, the entire end effector is swapped out with a new end effector. In other embodiments, the end effector is modular, where sub-portions may be substituted out or replaced. For example, interaction portion 830 of the end effector is swappable (e.g., to replace a worn-down piece with a new piece or a different shaped piece).

As described above, the end effector 822 includes electrical connector 832 that facilitates an electrical connection between the robotic system and the end effector. In some embodiments, an electrical connection between the robotic system and the end effector is required before a massage is allowed to commence. For example, the robotic system prevents or prohibits a massage from initiating if an electrical connection is not established between the robotic system and the end effector.

In some embodiments, the end effector includes an electronics board (e.g., printed circuit board (PCB)) that is used to control various elements of the end effector (e.g., heating elements, sensors, etc.). In some embodiments, when the end effector is connected, connectivity to the electronics board is verified. In some embodiments, a registration process is performed. As one example, an end effector is associated with one or more identifiers, such as a serial number, model identifier, etc. For example, the registration process involves the robotic system obtaining a hardware identifier of the end effector (e.g., by the end effector automatically pushing or providing the hardware information, or the robotic system pulling such hardware information by requesting it from the end effector) and recording such as information to identify or determine what end effector is attached to a given arm.

One example of hardware information includes a model number or an end effector version identifier. For example, suppose that there are multiple versions of end effectors that can be attached to the arm (e.g., different tools with different purposes). When a particular end effector is mounted, the version of the attached end effector is registered with the robotic massage system. This allows the robotic massage system to be aware of, or otherwise determine, the type of the end effector that is attached to a robotic arm. In some embodiments, the version information is used to determine what massage content is to be performed. For example, different massage content may involve the use of different corresponding types of end effectors. As one example, registering and determining of what type or version of end effector is attached is used by the robotic massage system to prevent the performing of a massage using an inappropriate type of end effector.

In some embodiments, when switching out different end effectors, when the electrical connection is formed (e.g., after the end effector has been slid into place, and the electrical connector 832 is coupled to the corresponding receptor in the receiving portion 826 of the arm), the registration process is performed in response so that the robotic massage system is able to determine what end effector is connected to the robotic arm.

Minimizing Strain on the Robotic Arm

As described above, in various embodiments, a robotic arm of the robotic massage system is composed of a series of links that are interconnected at joints. The joints act as pivot points for the robotic arm. The joints may be powered with motors or actuators that allow various portions of the arm to rotate about various axes. For example, the motors at the various joints allow the arm various degrees of freedom. An end effector is attached to an end of the robotic arm (e.g., via an attachment). In some embodiments, the end effector is coupled to a joint. In other embodiments, the end effector is coupled to an end of a link (e.g., via an attachment). The combination of the joints, links, and motors allows the arm to be manipulated into various positions that allow the end effector to make contact with various portions of the subject's body, as well as perform various types of massage work.

The amount of force applied by the end effector to the subject is a function of the configuration of the arms and the various actuators that are operating. For example, the motors of the arm are sent torque control commands, where the forces imparted by the motors are transmitted in part along the arm to the end effector. The forces provided by the motors cause, for example, the end effector to be pushed or pulled along the user's body (depending on the stroke being applied). Due to the forces being applied, various portions (e.g., joints and/or links) of the arm may experience varying amounts of forces and strain (as force is transmitted from the actuators, through the links and joints, etc.). For example, various levers may result based on how the various segments of the arms are oriented relative to each other when the arm is in a certain configuration (e.g., to implement a massage stroke). That is, the various torque applied by the motors of the arm may result in forces that can put strain on various portions of the arm (e.g., due to the creation of levers based on how the various links and joints of the arm are positioned).

For different strokes, the linkages are arranged in various configurations, and varying amounts of force are applied by the motors in order to implement stroke trajectories (e.g., to be able to move the end effector along a path on the user's body). The amount or portion of force that is translated or transferred or delivered from a motor (compared to what is being applied by the motor) to the end effector will depend on the configuration of the linkages and angles between the linkages (e.g., joint configuration). That is, based on the configuration of the linkages, varying amounts of force will be applied on joints as torque (versus being linear) if, for example, two linkages are at angles to each other. The amount of strain on a joint depends on the linkages around the joint, where the motor(s) are, and how forces applied by the motors are being transmitted along the arm.

That is, using a tool of the end effector involves placing or positioning the tool at a location on the user's body, and providing a force at that location. Implementing a stroke involves using the motors to change the position of the end effector (to follow a stroke trajectory) and applying force (to provide a therapeutic effect). Positioning of the tool at a location on the user's body involves manipulating the robot arm into certain arm/joint configurations. The motors in the arm are used to apply forces that are transmitted through the tool (which is attached to the end of the arm) to the user to provide the desired therapeutic effect. As described above, when applying a force, there will be various amounts of torque on the various joints of the arm. Depending on the configuration of the arm, the relative torque on a joint will vary. High amounts of torque will strain the arm. If the relative torque on a joint is small, then a large amount of force can be applied at that point without straining the robot arm. From a joint configuration and motor sizing perspective, given the same motor size, more force could be applied on an area if the relative torque is small, as compared to if the arm is in a configuration in which the relative torque on the joint would be large. That is, the configuration of the joints of the arm will determine whether the joints are being strained or reaching a mechanical limit.

In some embodiments, where on the end effector a given tool or interaction region is located or oriented is determined based on the forces to be applied when using the given tool, as well as the joint configurations that the arm will go through to implement strokes utilizing that tool. For example, the "palm" tool is used to perform effleurage techniques, which require less force as compared to tools used for compression strokes or stripping, which need more force. In some embodiments, the location or placement of a tool for use in applying high force strokes is such that the corresponding joint configurations (in order to place the tool properly or cause it to move along the stroke trajectory) minimize strain on joints (as the forces involved and being applied are larger). For example, the "knuckle" region is an example of a high force interaction region that is oriented with respect to the mounting interface to transmit force from the robot arm in a mechanically advantaged direction, such as when performing stripping, as shown in the example of FIG. 11B. While the use of other surfaces (e.g., effleurage surface) may require the arm to be in less desirable joint configurations, the relatively less amount of force being applied reduces joint strain as an issue, as will be described in further detail in conjunction with the example of FIG. 11B.

In some embodiments, the shape of the end effector (e.g., placement of different tools) is designed to take into account the amount of strain on joints given the tool/surface of the end effector that is to be used. For example, with respect to a given tool or surface, the given tool is designed for certain types of strokes to provide desired effects in terms of strokes, as well as provide a certain amount of force performance. As one example, based on the placement of the various tools on the end effector, and the manner in which the end effector is mounted on the arm, the "knuckle" or "top" portion 814 of the end effector surface is the highest force area that can be used in some embodiments (up to 200+ Newtons of pressure directly under the arm, in some embodiments). The force performance of a tool (e.g., the amount of force that can be applied to the user via that surface) is also a function of the joint configurations that the arm would have when the given surface or tool of the end effector is being used. Other high force areas (given joint configurations) include the elbow or forearm regions.

As described above, the overall shape of the tool is made up of different tools or surfaces. The placement of location of a given tool on the end effector is determined based on a variety of factors. In some embodiments, the location of a given tool on the end effector is determined based on:

The amount of force to be applied by the end effector to the user. This may vary for different types of tools and the types of strokes to be performed using the tools. For example, for an effleurage, the amount of force applied by the robotic arm may be in the range of 60 to 80 Newtons of force, versus for compressions, where the amount of force applied by the robotic arm may be upwards of 200 Newtons of force.

The regions of the body that the given tool will contact. This is based on the types of trajectories that the given tool will traverse, which will in turn involve the arm being manipulated (by using its actuators/motors) into various configurations.

The use of a tool surface of the end effector involves being able to, throughout a stroke, have the given tool of the end effector be able to maintain contact with the user throughout a trajectory of the stroke, while at the same time providing a desired amount of force throughout the stroke (along its trajectory) to provide a therapeutic effect.

The location of a given tool on the end effector will impact how the linkages of the arm will need to be arranged in order for the given tool to reach all of the parts of the user's body along the stroke trajectory.

The amount of force that can be transmitted from the various arm motors to the end effector and applied to the user is a function of the amount of force provided by the motors, and the relative arrangement of the linkages through which the motor forces are transmitted. Over the course of the stroke, the configuration (relative arrangement of linkages) of the arm will change in order to move the end effector along the stroke trajectory. For example, the robotic massage system is configured such that the majority of the time the end effector is applying force, it is pushing, rather than pulling. For example, to "push" the end effector (e.g., down the back), force is applied from behind the touchpoint. In some embodiments, the force is applied depending on the direction that the end effector is moving in. For example, higher force is applied when the end effector is pushing (e.g., down the length of the back), and lighter when the end effector is being pulled (e.g., dragged pulled back up the length of the back). This similarly applies for other tools or strokes, such as stripping using the elbow portion of the end effector.

As described above, depending on the configuration of the arm, the amount of force being transmitted will cause varying amounts of strain on different portions of the arm. In some embodiments, tools which typically require large amounts of force are placed on the end effector such that, given the required range of motion of the arm for the stroke trajectories involving the tools, the relative arrangement of the links is such that the amount of strain is minimized, given the motor forces being applied.

Considering the location of tools on the end effector in conjunction with the types of strokes to be performed, the joint configurations of the arm when using that tool, as well as the forces that will be applied not only at the end effector tool, but also at various points along the arm has various benefits, such as being able to control motor sizes. For example, given the same motor size, more force can be applied without reaching joint strain limits.

As described above, based on the purpose of the tools, the amount of force being applied by the robotic arm will vary. For example, some tools, such as the palm, are typically used in situations that require less force than tools used for other purposes such as compression strokes or stripping, which need more force being applied. In some embodiments, the position of a certain tool on the end effector is determined based on the amount of force to be applied when using a tool, as well as the amount of strain that would be put on joints of the arm if that tool were being used, which is dependent on the joint configuration of the arm when the tool is used.

For example, the use of a certain tool will involve the last link of the arm being tilted in certain ways. The amount of strain on the joint connected to that link will vary depending on the amount of tilting. This is due to the direction of the force being applied to the last link. If the last link is in line with the direction of the force being applied, then there will be less strain on the joint (as the force being applied would be a direct force instead of a torque). However, if the joint is angled, then a portion of the force being applied is not in line with the last link, but will be a torque that places strain on the joint.

In some embodiments, when higher forces are to be applied, then the joint configurations are designed to be in a more favorable location in order to apply that higher force while minimizing the amount of strain on the joint.

Figure 11A:
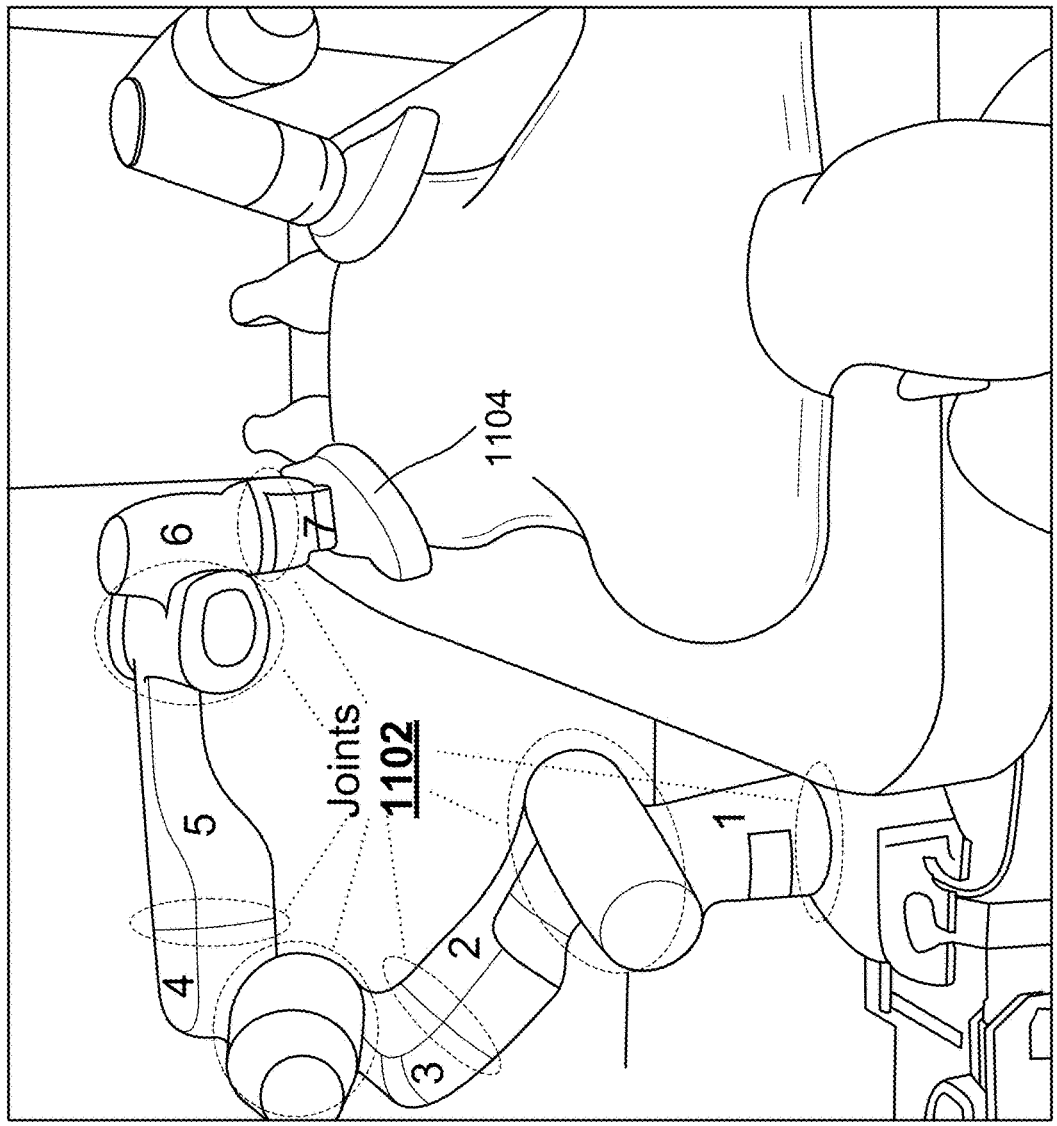
FIG. 11A illustrates an embodiment of a robotic arm.

FIG. 11A illustrates an embodiment of a robotic arm. In this example, a robotic arm with seven degrees of freedom is shown. In this example, the robotic arm has seven joints 1102, where there is a motor at each joint to allow rotation about an axis (resulting in seven degrees of freedom). In this example, the joints are interconnected by links, where there is also a link (link 7) between the last joint on the arm and the end effector 1104.

FIG. 11B illustrates an embodiment of implementing robotic strokes using an end effector. In this example, the robotic arm is controlled to "push" the end effector 1152 down the subject's back in order to perform stripping. In this example, subsequent to performing the stripping, the robotic arm is controlled in reverse to cause the end effector to be dragged or "pulled" back up the user's body to implement an effleurage stroke.

Different strokes require different amounts of force. For example, stripping and compression strokes typically require more force than strokes such as effleurage. The stripping stroke, which in some embodiments involves the use of the blade portion of the end effector is a stroke that requires relatively more force as compared to the effleurage stroke (which in some embodiments involves the use of the palm portion of the end effector). In some embodiments, to account for the higher amount of force needed by the stroke, and the use of the blade portion of the end effector, the stroke is implemented by configuring the arm to implement the stripping stroke by applying force and pushing, where the force exerted by the end effector comes from "behind," by the arm pushing the end effector. By implementing such higher force strokes by controlling the arm to push the end effector along the subject, the strain on the arm is reduced.

Dragging of the end effector along the subject's body can cause strain on the last links of the arm (e.g., links 5, 6, and 7, as shown at 1154 in the example of FIG. 11B). In some embodiments, in order to reduce strain on the arm, dragging of the end effector is limited to those strokes such as effleurage that are lighter in force, while higher force strokes are implemented by controlling the arm to push the end effector.

As described above, in some embodiments, use of the end effectors is configured such that the end effector is typically being pushed by the arm, such that the end effector is applying force. Performing stripping is one example of a stroke in which pushing of the end effector down the user's body is performed. In some embodiments, a stroke also involves pulling the end effector up the person's body. An example of such a stroke is an effleurage stroke as described above, which may be performed by pulling an end effector back up a user's back, after having performed stripping by pushing the end effector down the person's back. In some embodiments, pushing of the end effector is performed with higher force, while motions up the body (or where the end effector is dragged by the arm), such as the effleurage are lighter in force. This also reduces the amount of strain on joints. That is, motions that would result in the arm being in joint configurations that would have higher torque and joint strain are limited to those that require less force to reduce the overall amount of strain.

Collision Avoidance

As described above, in various embodiments, the end effector has multiple surfaces, which are also referred to herein as segments or tools. In some embodiments, the various faces and features of the end effector are angled in certain ways to avoid a number of types of collisions, such as:

Between two end effectors on the two arms when performing coordinated strokes involving multiple arms, such as those described above Unintended contact between a tool of the end effector that is not in use, and a part of the user's body.

Between the end effector and a part of the robotic arm that the end effector is attached to.

Collisions relate in part to the variability between people. Such collisions are avoided based on the design of the end effector. For example, the various tools of the end effector have various curvatures, convexities, and concavities (where the curvatures are in three dimensions) so that end effectors avoid colliding with each other during certain strokes, or prevent a part of the end effector that should not be touching the user from making unintended contact with the subject.

In some embodiments, to avoid collisions, the touchpoint is designed or configured with steeper or smaller bend radii between segments (e.g., when transitioning from one segment/tool/face of the end point to an adjacent segment/tool/face).

The location of the segments or tools on the end effector are also structured to prevent the aforementioned collisions. Some of the segments on the touchpoint are locally concave surfaces. For example, the cupping segment is concave for support, such as for asymmetric massages.

In some embodiments, the angles of the individual tools are determined such that when tilted downwards, or on an edge, such as in the configuration of FIG. 11B (where there is a large mass to the side that the endpoint is directly mounted onto), links of the arm do not drag on the user's back. For example, the angle of the tool is limited to prevent a portion of the arm from causing drag. This is an example of another type of collision that is prevented, where the end effector is shaped such that use of any specific tool does not result in the arm coming in contact with the person's body (that is, only the desired tool of the end effector is what comes in contact with the person).

In some embodiments, the shape and size of the end effector and its tools take into account deformation of the body. For example, the end effector is designed so that there is a limited amount or no overhang of the robot arm beyond the boundaries of the touchpoint, even if the touchpoint has sunken into the user's body (due to their tissue being deformable).

For example, when the touchpoint is pushing on the subject's body, the body deforms, creating space. An adjacent part of the body (e.g., surrounding the main point of contact of the touchpoint with the body) may also "spring" back up, grabbing onto a part of the end effector and causing drag on the touchpoint.

In some embodiments, the touchpoint is designed in consideration of where the various linkages of the arm are so as to ensure that a linkage of the arm does not cause an unwanted collision with the user's body and, for example, cause drag. That is, in some embodiments, link limits are determined to prevent collision with the body.

For example, in order for a portion of the tool to be utilized across an entire stroke, the linkages of the arm will be adjusted in configurations that may vary over the course of the stroke, in order to maintain contact of a particular portion of the end effector with the user's body according to the stroke. The surface of the tool (e.g., angles and area) is determined also to prevent the arm linkages from having to be positioned in ways (e.g., bent at various angles) that would cause unintended collisions between some portion of the arm and the user.

In some embodiments, the tools are placed in positions that are optimal to avoid both collisions and hardware limitations, while still being able to have sufficient torque to provide the desired amount of force.

The following is an example of avoiding collisions between end effectors during coordinated strokes. As described above, in some embodiments, the robotic massage system includes multiple robotic arms, where performing a coordinated stroke involves the use of both robotic arms.

One example of a coordinated stroke involves performing a symmetric technique, further examples of which are described above. An example of such a symmetric technique is an effleurage stroke.

Figure 12:
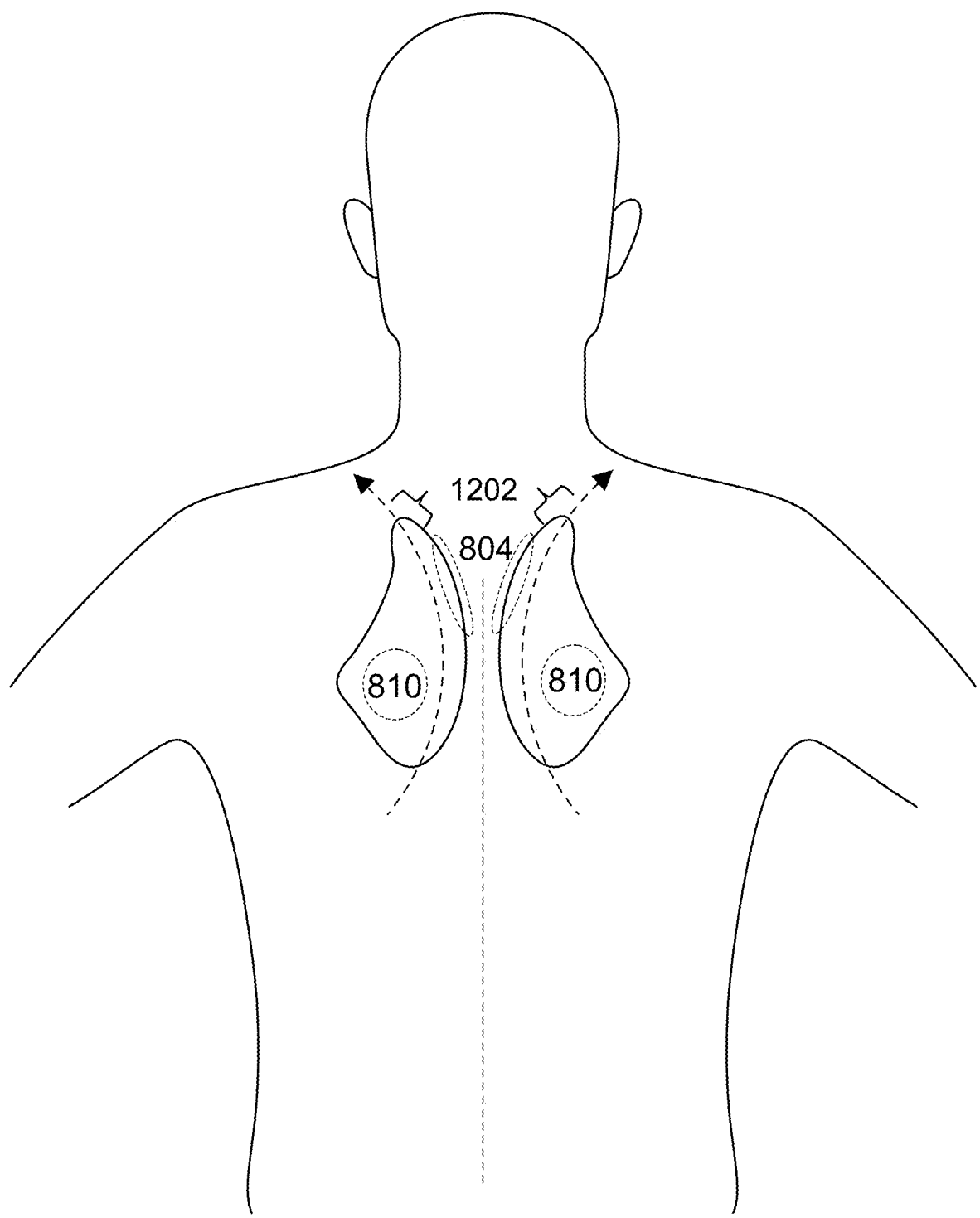
FIG. 12 illustrates an embodiment of performing a symmetric massage stroke.

FIG. 12 illustrates an embodiment of performing a symmetric massage stroke. In this example of an effleurage stroke, the two end effectors have a mirrored trajectory, where the trajectory causes the end effectors to move inwards towards the center of the back, before flaring outwards. Care should be taken to avoid collisions, such as where the end effectors of the two robotic arms collide when they move towards each other.

As described above, in some embodiments, the tools or surfaces of the touchpoint are designed to avoid such collisions. As one example, the surfaces of the touchpoint are angled or curved in specific ways.

For example, as shown in FIG. 12, the front portions 1202 of the end effectors are not straight, but are bent back. In this way, when the end effectors come inward towards each other, they avoid crossing the center plane and colliding with each other. That is, based on the angles and curvatures of the surfaces of the end effector, crossing of the center plane and colliding of the two end effectors is avoided when using, for example, a palm region of the end effector for such symmetric work.

Further, as shown in this example, the blade segments 804 of the end effectors are angled back so that when the end effector is oriented such that the palm portion of the end effector (810, on the surface of the end effector touching the subject) is pushing down on the person, the blade segment lifts away, and also does not protrude as far forward.

This is beneficial in regions of the body with more significant curvatures, such as the glutes, so that the thumb portion of the touchpoint does not run into the person's body. Rather, the blade portion will rise up and twist away, gradually moving over rises in the body. For example, the curvatures will cause various segments of the touchpoint to turn away depending on how the end effector is oriented.

The curving away of the various segments of the end effector also prevents unintended use of tools (that should not be in contact with, or applying force to, the subject's body). For example, if the forearm tool is being utilized, then the palm portion is not unintentionally used, as, due to its curvature, it will not come in contact with the person's body. As another example, due to the curvature of the cupped hand area, when the palm segment is being utilized, the cupped hand area is not unintentionally used. Based on the shape and curvatures of the different segments, when the touchpoint is oriented for use of one of the segments, this will cause the other segments to be turned away from where contact is being made with the body. This prevents unintended collisions with the body. In some embodiments, the shape of the end effector, and the curvatures of the various segments of the touchpoint are determined based on stroke trajectories, determining where the end effector crosses the spine, the behavior of the end effector when in concave portions of the body, etc. Variations between people are also taken into consideration.

As described above, the end effector includes various shapes and tools that engage with the subject in various ways. As shown in the above examples, the shape of the end effectors is determined to minimize the likelihood of collisions. This is an example of mechanical or hardware collision prevention. In other embodiments, recorded stroke types are also used to minimize collisions. For example, strokes are designed to prevent collision between two end effectors. As another example, software is programmed to prevent collisions. For example, the system is configured to track or monitor the position of the end effectors, as well as the shape/configuration of the arms, and use such information to prevent the end effectors or arms from colliding.

As shown in the examples described herein, the endpoint is asymmetric in both its shape, as well as its mounting position. That is, there is not a singular axis that a plane could be drawn through that would result in symmetric portions of the touchpoint. In some embodiments, the end effector is designed with such asymmetry to avoid the collisions described above, such as when working close to the spine.

Figure 13:
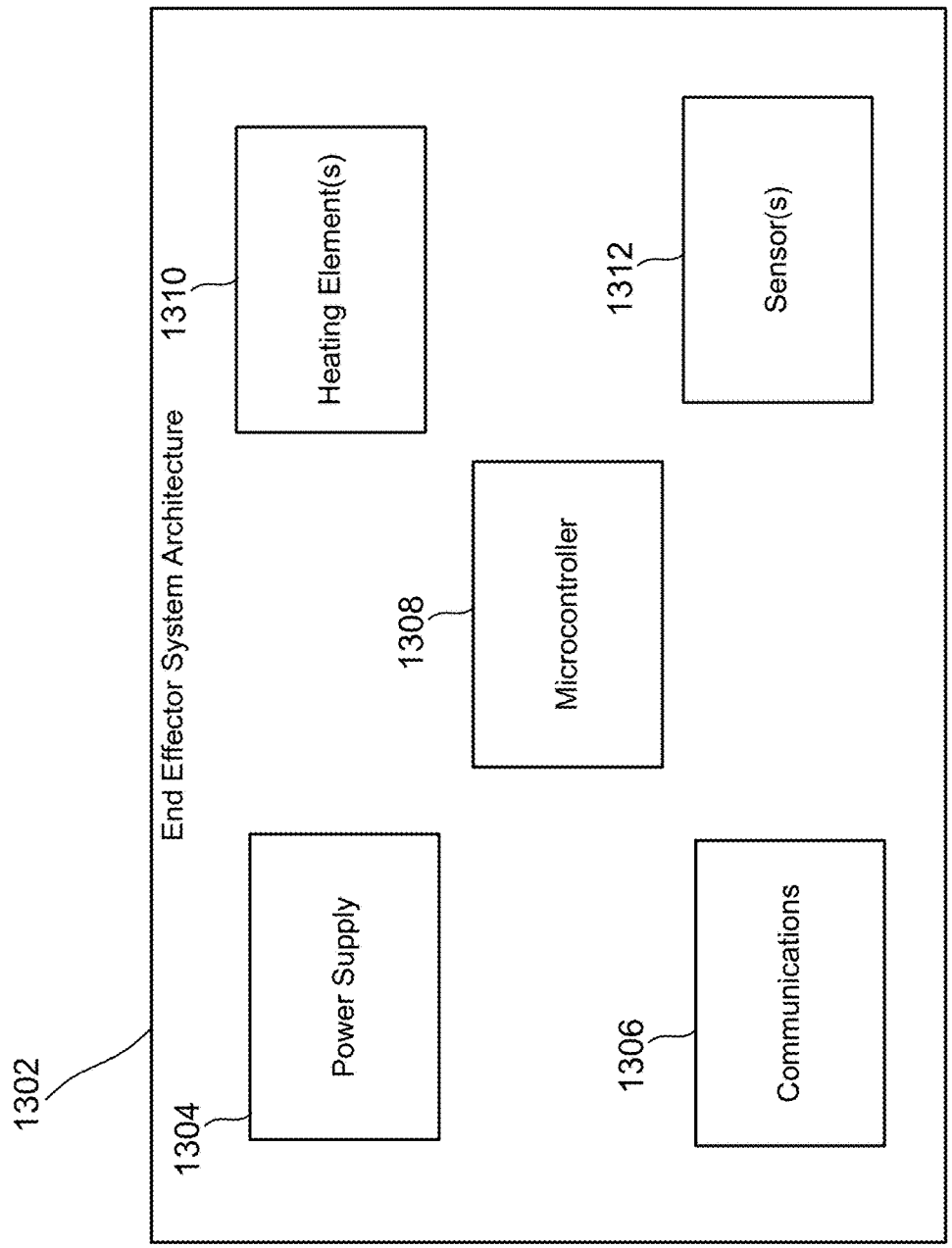
FIG. 13 illustrates an embodiment of a system architecture of an end effector.

In various embodiments, an end effector includes various componentry for facilitating robotic massage. FIG. 13 illustrates an embodiment of a system architecture of an end effector. In this example, the end effector architecture 1302 includes a power supply 1304, communications 1306, microcontroller 1308, heating element(s) 1310, and sensor(s) 1312. Further details and embodiments of such components of the end effector are described below.

Heating

In some embodiments, the touchpoint includes heating elements (e.g., heating elements 1310) within the end effector.

Figure 14:
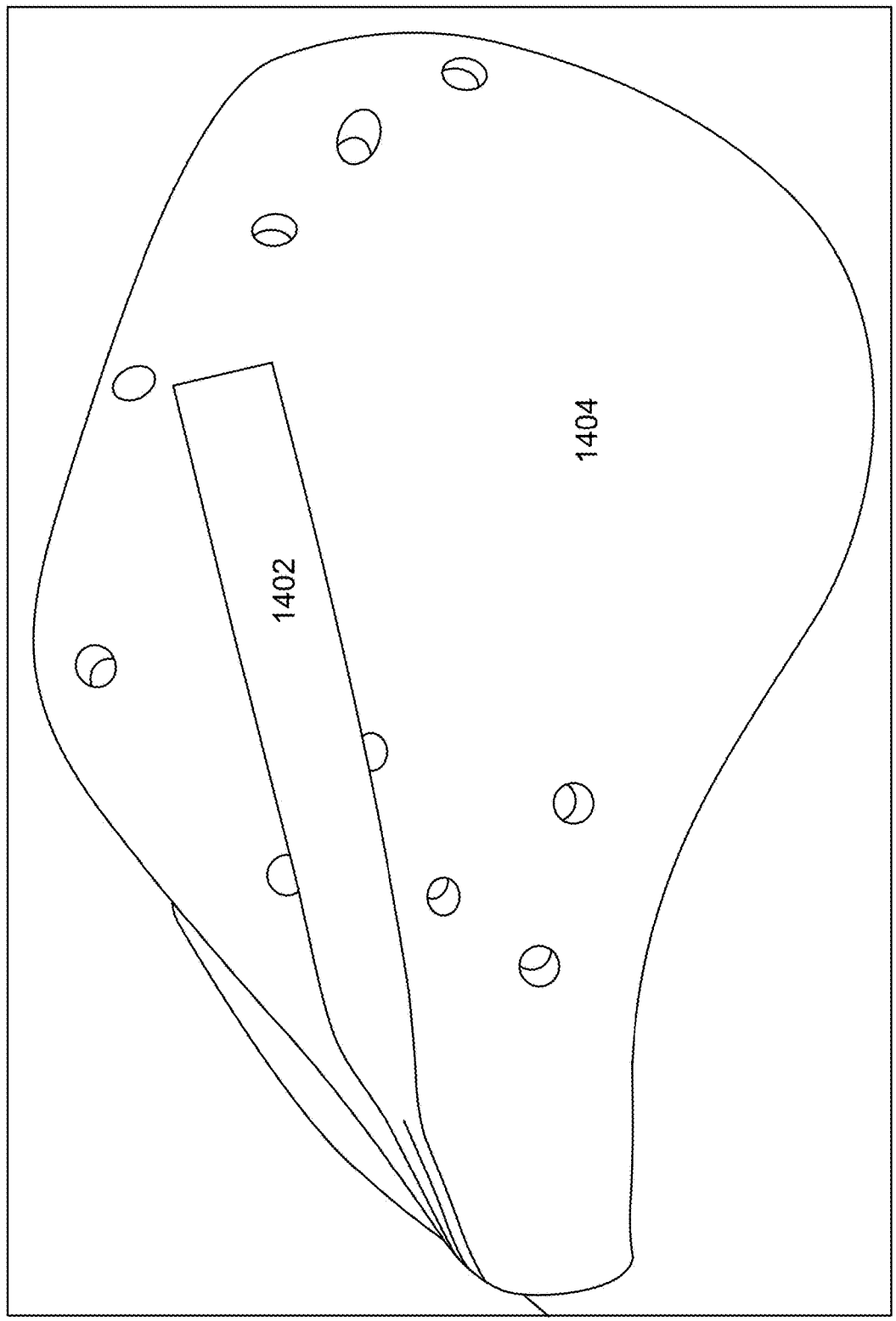
FIG. 14 illustrates an embodiment of heating elements of an end effector.

FIG. 14 illustrates an embodiment of heating elements of an end effector. One example of heating elements are heating strips, such as ceramic heating strips. In some embodiments, the heating elements include ohmic heating elements. In some embodiments, the heating elements include individual heaters that are attached to or adjacent to the interior skeleton, where the heat from the heating elements is distributed. Based on the material of the skeleton, the skeleton also helps to distribute the heat.

In some embodiments, the heating elements are on the exterior of the skeleton, where, for example, the heating elements are in or adjacent to the silicone surface. In the example of FIG. 14, a heating element strip 1402 on a plastic inner skeleton 1404 is shown. In other embodiments, the heating elements are in the interior of the skeleton.

With respect to placement of the heating elements, there may be various trade-offs. For example, placing the heating elements between the exterior material and the skeleton, rather than inside the skeleton, would prevent the heating elements from heating up components such as a microcontroller that is inside the skeleton. On the other hand, placing the heating elements between the exterior material and the skeleton may cause the heating elements to be more vulnerable to shear forces and wear.

In some embodiments, to promote more uniform or even spreading of heating of the end effector, the interior skeletal structure is made from a thermally conductive material such as aluminum. This is in contrast to using a less thermally conductive material such as plastic. For example, with a less thermally conductive material, hotspots will form where the surface of the end effector is warmed directly above the heating elements, and cool when moving away from the heating elements. In some embodiments, with a metallic skeleton for heat distribution, the heating elements are mounted next to the skeleton. Examples of materials that may be used for the skeleton include aluminum and Ultem.

In some embodiments, the internal structure includes passthrough holes or recesses for the placing of heating elements, temperature sensors, etc. In some embodiments, the exterior material is thermally conductive. For example, thermally conductive silicone is used for the exterior material to promote spreading of heat throughout surface of the end effector.

As described above, mounting of the end effector results in an electrical connection between the robotic massage system and the end effector (via a robotic arm). In some embodiments, the heating elements of the end effector are manually turned on/off (and are not, for example, automatically turned on when the end effector is mounted).

Sensors

In some embodiments, the end effector includes sensors (e.g., sensors 1312) for collecting various measurements.

As one example, the end effector includes sensors for measuring force/pressure. One example of such a sensor is a force torque sensor. Another example sensor is a camera, where the images captured by the camera sensor are evaluated to detect contact. Other examples of sensors include capacitive sensors for contact areas, piezoelectric force sensors, etc. In some embodiments, a force-sensitive skin is applied around the skeleton, where the force-sensitive skin is used to measure pressure. The application of the end effector to the user may then be dynamically updated based on the measured pressure or force feedback. For example, if a certain amount of force were expected, the measured amount of force applied to a person may be used as feedback to determine an adjustment to the motors of the arm so that the applied force matches the expected force. The following is another example of determining pressure or force of the end effector. A set of cameras or other optical sensors is placed inside of the touchpoint. The cameras monitor the surface of the touchpoint. Through a specialized material or coating, models are built around deformation to determine an area that is in contact with the surface. The arms of the system provide the force that is being applied. The pressure being applied or engaged may then be determined from the force provided by the arms and the area in contact with the surface. For example, how the material is engaging, bunching, grabbing, gripping, etc. is determined. As another example, a pressure mat or capacitive sensing may be used.

By determining the area of the surface in contact with the user, the amount of pressure can be determined (not only force, where in some embodiments the force desired is assumed to be the force being applied). This allows for pressure-based control and engagement.

As another example, the interior of the touchpoint includes ultrasonic sensors for determining ultrasound measurements. This allows ultrasound for diagnostics, such as determining information about the person's muscles during the course of the massage.

In some embodiments, the end effector includes temperature sensors such as thermocouples to determine the temperature of the end effector. In some embodiments, such measurements are used to determine heating (or more generally, temperature control) of the end effector (e.g., using the heating elements described above).

In some embodiments, the end effector includes sensors to perform muscle sensing, including sensing muscle tension in order to quantify the impacts of a massage. Described herein are various embodiments of muscle sensing, including muscle sensing using ultrasound, pressure, bioimpedance, and electromyography.

Ultrasound-Based Muscle Sensing

As one example, the end effector is configured to include ultrasound sensors. Measurements captured and provided by the ultrasound sensors are analyzed to evaluate tissue stiffness throughout the user's body. In some embodiments, the ultrasound sensors are combined with a load cell, allowing for force measurements to be taken with each ultrasound measurement (e.g., ultrasound video frame). Tissue features may then be measured and calculated from the analysis of the ultrasound measurements.

In some embodiments, the ultrasound sensors are used to perform ultrasound elastography to evaluate the stiffness of human tissue. In various embodiments, this includes performing strain elastography, supersonic shear wave elastography, etc. The use of ultrasound sensors in an end effector that is coupled to a robotic arm provides various benefits. For example, the repeatability offered by the use of robotic arms to control the position of the end effector (and the ultrasound sensors embedded within) allow for consistent probe angle, probe positioning, pressure, and patient posture.

Pressure-Based Muscle Sensing

The following are embodiments of pressure sensing. In some embodiments, the end effector includes sensors configured to perform resistive sensing. As one example, forces applied to the silicone or exterior material of the end effector are detected by mounting force-sensitive resistors below the silicone. Multiple force-sensitive resistors may be utilized. For example, force sensitive resistors are embedded under the silicone material. Data collected from the resistive sensors is then used to perform pressure sensing.

The following is an example of evaluating pressure readings to determine pressure-based muscle sensing. Sensor output is averaged for unloaded muscles. Sensor output for loaded muscles is determined. Percentage change between those changes is plotted. The changes in observed loading patterns across sensors are used to determine when muscle stiffness changes.

One example implementation of a pressure sensor includes a piezoresistive strain gauge that includes an adjustable sensor tip. In some embodiments, the pressure sensor includes a geometry that pushes into the muscle, similarly to palpation. As another example implementation, pressure sensing includes a strain gauge, amplifier, and a rigid probe geometry.

As another example, pressure sensing is implemented using inductive sensing. For example, forces applied to the silicone of the end effector are detected by embedding a metal target within the end effector. The displacement of the metal target is measured with inductive sensors mounted below the silicone.

As another example implementation, pressure is sensed using a load cell. For example, reaction forces during massage are detected by mounting a load cell at the base of the end effector. With the use of a load cell, muscle stiffness is repeatably detectable.

Bioimpedance Analysis

As another example, muscle sensing is performed using bioimpedance analysis (also referred to as electrical impedance myography). In some embodiments, electrodes are mounted on the end effector. Data gathered from the electrodes is used to identify frequencies of interest and perform bioimpedance analysis. As one example, strips of adhesive-backed copper taped are placed on the touchpoint as electrodes. In some embodiments, both outer electrodes and inner electrodes are included in the end effector. For example, a bioimpedance platform is used to drive the outer electrodes (e.g., for electrical stimulation) and gather data at the inner electrodes. In another embodiment, conductive silicone is used (to replace the metal electrodes). In some embodiments, a conductive lubricant is applied (to the end effector and/or the subject) to improve the efficacy and quality of the bioimpedance analysis.

Multi-frequency bioimpedance analysis may be used to indicate a variety of tissue states. For example, collected data is used to assist in controlling for spurious changes caused by massage. Contracted muscle density causes changes in center frequency (where, for example, center frequency is the frequency at which the reactance is highest). In some embodiments, changes in center frequency are used to create signals that are measurable at a single frequency. In some embodiments, if multiple frequencies are to be identified, parallel signal generation is performed.

Electromyography

As another example, muscle sensing is performed using electromyography. For example, electromyography is used to detect contracted muscles by detecting the electrical impulses of nerves associated with muscle activity. The electrical impulses may be detected using metal electrodes included in/on the end effector. For example, adhesive-backed copper tape placed or mounted on the end effector may be used as electrodes. In some embodiments, a conductive silicone on the exterior of the end effector is used to detect the electrical impulses of nerves. As one example implementation, the end effector includes a differential amplifier with inputs directly connected to the skin. The end effector includes detection electrodes in contact with the muscle of interest. In some embodiments, the end effector includes a reference electrode in contact with electrically unrelated tissue. For example, a reference electrode is included that includes a stable connection to electrically neutral tissue (e.g., a bony location on the subject). This may include placement of a reference electrode separate from the end effector. In some embodiments, a conductive lubricant is also used to improve the quality of data collection.

Microcontroller

In some embodiments, the end effector includes an (embedded) microcontroller (e.g., microcontroller 1308). In some embodiments, the microcontroller is configured to communicate with the rest of the robotic massage system.

As one example, the microcontroller facilitates communications with the robotic massage system so that the robotic massage system is able to confirm or verify that there is an end effector attached to the system. For example, the end effector is able to be identified (e.g., with a unique hardware identifier). The microcontroller is also used to identify whether the end effector is on the left arm or the right arm. The microcontroller is also configured to provide the system with other information about the end effector, such as its version number.

In some embodiments, encryption is also included in the microcontroller to ensure that a permitted end effector is attached. In some embodiments, encryption and verification are performed to ensure that a massage is not performed without the appropriate touchpoint.

In some embodiments, the microcontroller communicates with an odometer that keeps track of the number of hours that a given end effector has been in use. This allows for the system to be notified of when the end effector should be replaced (e.g., due to its lifetime approaching).

In some embodiments, the microcontroller is programmed with firmware to execute the various functions of the end effector. This includes facilitating communications with the robotic massage system, as well as controlling or taking inputs from various components such as the heating elements, sensors, etc. described above.

Communications

In some embodiments, the end effector includes various electrical and mechanical interfaces (e.g., included in communications 1306) to connect the end effector to the rest of the robotic massage system. In some embodiments, the electrical interfaces are within the robotic flange (to which the end effector is mounted) so that any wiring is hidden internally of the arm. In other embodiments, wiring is run on the exterior of the end effector to the arm.

As described above, the microcontroller is configured to communicate with the rest of the robotic massage system. Communication is wired and/or wireless. Examples of communications interfaces include a CAN (Controller Area Network) interface, RS485, USB (Universal Serial Bus), etc. As another example, the communications interface is implemented using ethernet that is passed through an arm to the end effector. The use of an interface such as ethernet would allow a large amount of information to be transferred, as well as the connection of various sensors, such as ultrasound, etc.

Figure 15A:
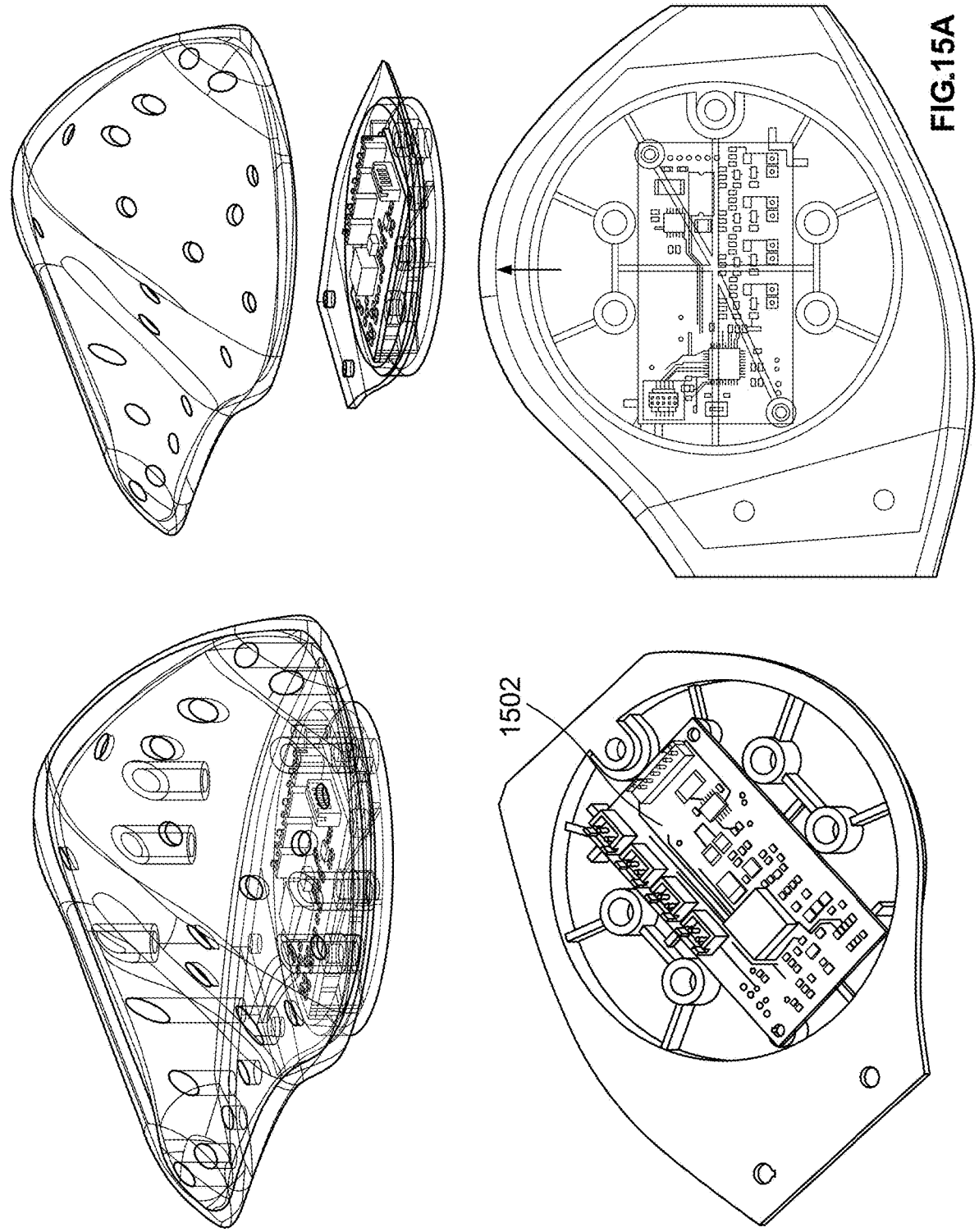
FIG. 15A illustrates various perspective views of portions of an end effector.

In some embodiments, the various electrical components described above are included in a PCB (printed circuit board). In some embodiments, the PCB is located near the flange, with terminals as interfaces into/out of the end effector. FIG. 15A illustrates various perspective views of portions of an end effector. In some embodiments, the end effector further includes a power supply to power the various components of the end effector. Examples of a printed circuit board carrying such componentry are shown in this example at 1502.

In some embodiments, the end effector includes various electrical and mechanical interfaces to connect the end effector to the rest of the robotic massage system. FIG. 15B illustrates embodiments of end effector exits. For example, programming header and power exits are shown at 1522. An example of a central power exit for flex cable is shown at 1524. In various embodiments, the exits also include exits for ribbon cables, which in some embodiments connect to the PCB described above. An example of two mold halves of the end effector is shown at 1526. A side profile view of the end effector is shown at 1528.

Figure 16:
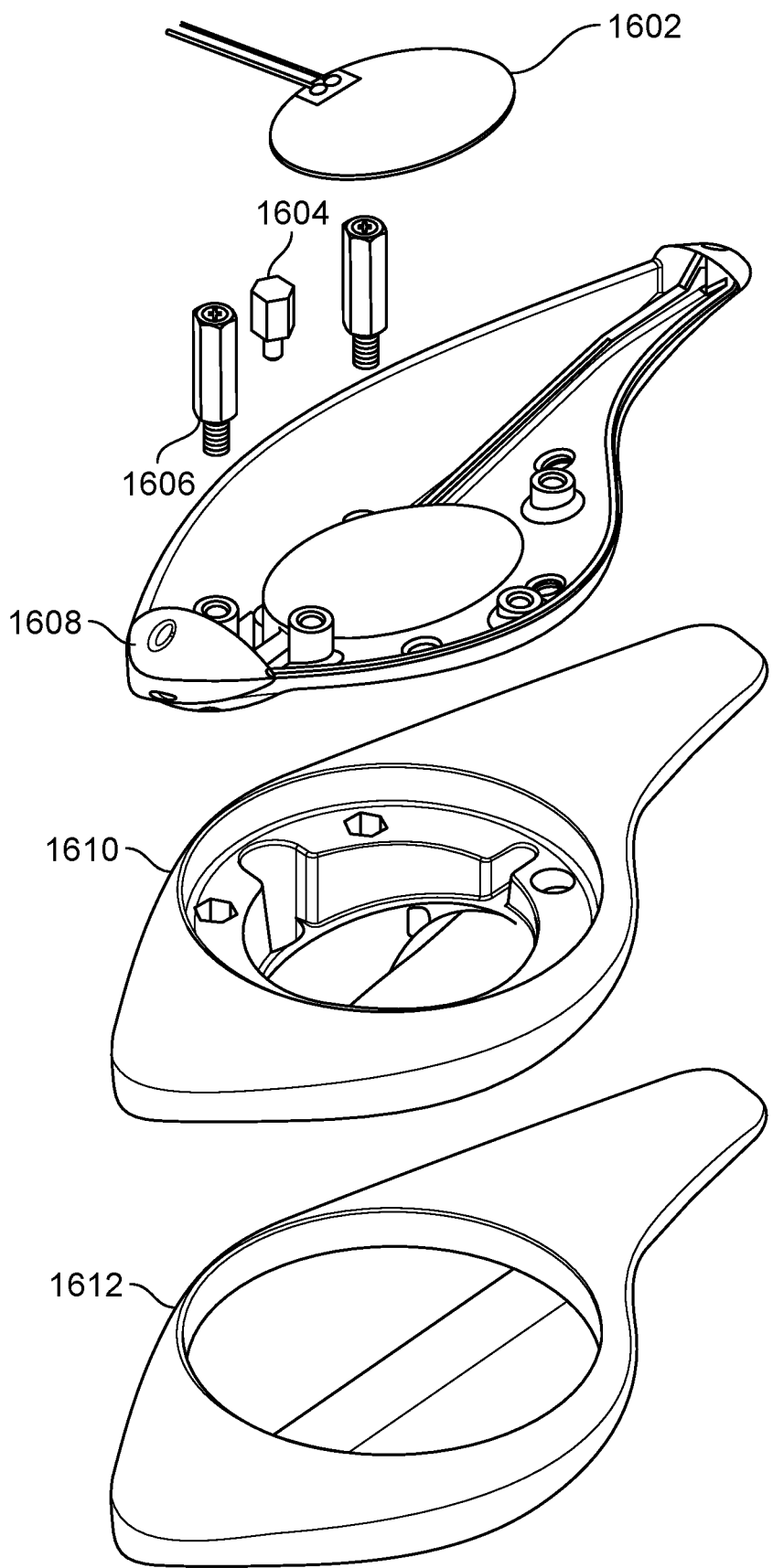
FIG. 16 illustrates an exploded-view diagram of an embodiment of an end effector.

FIG. 16 illustrates an exploded-view diagram of an embodiment of an end effector. In this example, components of an end effector are shown. In the example of FIG. 16, the end effector shown includes heater 1602, thermistor 1604, stand-off 1606 (two of which are shown in this example), skeleton 1608, silicone exterior material 1610, and skin 1612.

Examples of skin 1612 includes various materials such as those described above, including LDPE, vinyl, etc. Other examples of skins applied to the end effector include wraps. One example technique for applying the skin or wrap includes heat shrinking or thermoforming the wrap material around the end effector. In other embodiments, the skin 1612 is a cover that is put over the end effector. For example, the cover is washable, disposable, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A massage robot arm end effector, comprising:
    a mounting interface of the massage robot arm end effector that is attachable to a robot arm, wherein attaching the massage robot arm end effector to the robot arm comprises inserting of the mounting interface into a slot of a receiving portion of the robot arm, wherein the receiving portion of the robot arm comprises a screw, wherein the mounting interface of the massage robot arm end effector comprises a threaded insert, and wherein securing of the massage robot arm end effector to the robot arm is facilitated at least in part by turning the screw of the receiving portion of the robot arm about an axis along which the mounting interface of the massage robot arm end effector slots into the receiving portion of the robot arm, wherein the axis about which the screw is turned is perpendicular to an axis passing through the receiving portion of the robot arm and the mounting interface of the massage robot arm end effector;
    a surface distal from the mounting interface having a variable curvature that comprises a plurality of interaction regions that have different shapes;
    a shell with varying material thickness for different interaction regions;
    an internal skeleton that supports the shell and over which the shell is molded, wherein the internal skeleton comprises a rigid structure that is shaped with local concavities or convexities to accommodate the varying material thickness for the different interaction regions; and
    one or more heating elements placed on the internal skeleton and between the shell and the internal skeleton.

2. The massage robot arm end effector of claim 1, wherein the massage robot arm end effector is asymmetric.

3. The massage robot arm end effector of claim 1, wherein the shell is deformable.

4. The massage robot arm end effector of claim 1, wherein the shell is of a uniform durometer.

5. The massage robot arm end effector of claim 1, wherein at least two portions of the shell are of different durometers.

6. The massage robot arm end effector of claim 1, wherein the shell comprises silicone.

7. The massage robot arm end effector of claim 1, wherein a material of the shell is doped.

8. The massage robot arm end effector of claim 1, wherein a material of the shell is coated.

9. The massage robot arm end effector of claim 1, further comprising a covering over the shell.

10. The massage robot arm end effector of claim 1, wherein the massage robot arm end effector is globally convex to avoid collisions.

11. The massage robot arm end effector of claim 10, wherein at least one of the plurality of interaction regions is locally concave.

12. The massage robot arm end effector of claim 1, wherein at least one interaction region comprises a high force region oriented with respect to the mounting interface to transmit force from the robot arm in a mechanically advantaged direction.

13. The massage robot arm end effector of claim 1, further comprising a sensing element.

14. The massage robot arm end effector of claim 1, further comprising a microcontroller.

15. The massage robot arm end effector of claim 1, wherein the mounting interface is asymmetric.

16. The massage robot arm end effector of claim 1, wherein the massage robot arm end effector comprises an electrical connector, and wherein inserting of the mounting interface into the slot of the receiving portion of the robot arm facilitates an electrical connection between the end effector and the robot arm.

\* \* \* \* \*